United States Patent [19]

Inoue et al.

[11] Patent Number: 5,043,745

[45] Date of Patent: Aug. 27, 1991

[54] LIGHT INTENSITY CONTROL APPARATUS

[75] Inventors: Takahiro Inoue, Yokohama; Hiroyuki Takeda, Fukushima; Masahiro Goto, Kawasaki; Koichi Hiroshima, Yokohama; Yukihide Ushio, Tokyo, all of Japan

[73] Assignee: Canon Kabushiki Kaisha, Tokyo, Japan

[21] Appl. No.: 403,393

[22] Filed: Sep. 6, 1989

[30] Foreign Application Priority Data

| Sep. 6, 1988 | [JP] | Japan | 63-221350 |
| Oct. 4, 1988 | [JP] | Japan | 63-250272 |
| Oct. 4, 1988 | [JP] | Japan | 63-250273 |
| Oct. 4, 1988 | [JP] | Japan | 63-250274 |
| Oct. 4, 1988 | [JP] | Japan | 63-250275 |
| Oct. 4, 1988 | [JP] | Japan | 63-250276 |

[51] Int. Cl.$^5$ .............................................. G01D 9/42
[52] U.S. Cl. ......................................... 346/108; 372/29
[58] Field of Search ................. 346/108, 107 L, 76 L, 346/160; 358/296, 300, 298, 302; 372/29, 31

[56] References Cited

U.S. PATENT DOCUMENTS

| 4,201,994 | 5/1980 | Hoshito | 346/108 |
| 4,443,695 | 4/1984 | Kitamura | 346/160 |
| 4,695,714 | 9/1987 | Kimizuka | 250/205 |
| 4,814,791 | 3/1990 | Ohara | 346/108 |
| 4,890,288 | 12/1989 | Inuyama | 372/31 |
| 4,935,615 | 6/1990 | Eiichi | 250/205 |

FOREIGN PATENT DOCUMENTS

| 0165060 | 12/1985 | European Pat. Off. |
| 3605320 | 8/1986 | Fed. Rep. of Germany |
| 57-005187 | 1/1982 | Japan |
| 62-146062 | 6/1987 | Japan |

Primary Examiner—Mark J. Reinhart
Attorney, Agent, or Firm—Fitzpatrick, Cella, Harper & Scinto

[57] ABSTRACT

A light intensity control apparatus includes a beam generation unit for generating a beam for image recording, a detection unit for detecting a light intensity of the beam generated by the beam generation unit, and a control unit for controlling the light intensity of the beam generated by the beam generating unit on the basis of the detection output from the detection unit. The control unit causes the detection unit to execute a monitor operation of the light intensity of the beam during an image recording period by the beam, and changes, during a non-image recording period, a light intensity control value of the beam on the basis of the light intensity of the beam monitored during the image recording period.

17 Claims, 54 Drawing Sheets

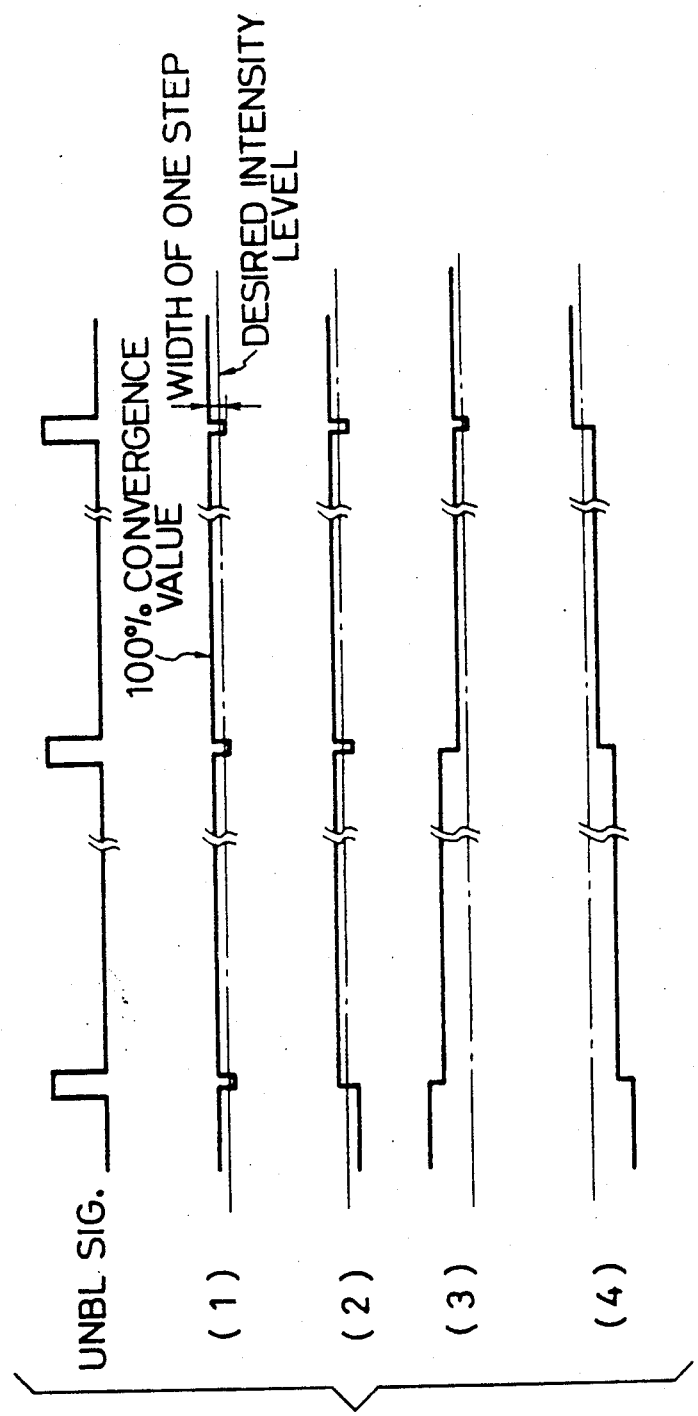

LIGHT INTENSITY CONTROL APPARATUS

BACKGROUND OF THE INVENTION (1) Field of the Invention

The present invention relates to a light intensity control apparatus for controlling a light intensity of a light-emitting element and, more particularly, to a light intensity control apparatus suitably used for an optical printer or the like.

(2) Related Background Art

As laser light intensity control in a conventional laser beam printer, an APC (Auto Power Control) scheme is used, and is employed in most of the existing laser beam printers.

In the APC scheme, a laser beam is emitted and is received by a light-receiving element. The light intensity of the received laser beam is photo-electrically converted into an electrical amount. The electrical amount is compared with a predetermined reference value. As a result of comparison, if a decrease in laser light intensity is detected, control is made so that a laser drive current is increased to increase a light intensity; otherwise, the laser drive current is decreased to decrease a light intensity. This control will be referred to as Laser APC hereinafter.

In the recent laser beam printers, the Laser APC is executed at the beginning of printing and at a paper interval during a printing operation. The paper interval means a non-image region offset from an image forming region on a drum in a rotating direction of a drum (sub-scan direction of the laser).

In this scheme, more specifically, an APC-START request is issued from a central processing unit of the laser beam printer at the paper interval, so that the Laser APC is executed once.

When the APC-START request is issued, the laser drive current is temporarily cleared to 0 mA, and is then gradually increased stepwise. In this case, an electrical amount from the light-receiving element is compared with a predetermined value in each step. When the electrical amount from the light-receiving element coincides with the predetermined value, an increase in laser drive current is stopped, a forcible emission of the laser is canceled, and the value is held until the next APC-START request is issued. Therefore, in this scheme, the light intensity of the laser is increased stepwise, and when a predetermined light intensity is reached, the laser is deenergized. Therefore, the laser is continously turned on to scan several lines to several tens of lines on a photosensitive drum. The Laser APC by this scheme will be referred to as paper interval continuous Laser APC hereinafter.

In another Laser APC scheme, when raster scan of a laser scans a region other than a photosensitive drum surface, the Laser APC is executed. Note that a scan region by the raster scan and other than the photosensitive drum surface, i.e., a region offset from an image forming region on the drum in the axial direction of the drum (main scan direction of the laser) will be referred to as a non-drum region hereinafter.

Image formation of the laser beam printer is executed in units of lines by raster scan. Each line is established as an image by outputting image data in synchronism with a horizontal sync signal (to be referred to as a beam detect (BD) signal hereinafter).

In order to obtain a BD signal, the laser beam printer turns on the laser at line intervals (a laser turn-on instruction signal will be referred to as an unblanking (UNBL) signal hereinafter).

The Laser APC is executed on the non-drum region in synchronism with the UNBL signals generated at the line intervals. This scheme will be referred to as non-drum region Laser APC.

With the above-mentioned Laser APC schemes, the laser is controlled to always have a stable laser light intensity during execution of image formation, thus improving image quality.

More specifically, a laser is gradually degraded during use, and then stops emission. Although the degree of degradation varies depending on individual lasers, each laser will be dead sooner or later, and light intensity control by the Laser APC is disabled. When the Laser APC is disabled and a predetermined light intensity cannot be obtained, it is determined that the laser is dead and replaced.

However, in the paper interval continuous Laser APC, since a laser beam is always radiated on the photosensitive drum during execution of the Laser APC, a developing agent (to be referred to as a toner hereinafter) is undesirably attached to the radiated portion. As a result, when a transfer device is of a dielectric belt type or a transfer roller type which is brought into contact with the photosensitive drum or approaches very close to it, the toner attached to the photosensitive drum is attached to the transfer device.

There is no problem if the circumferential length of the dielectric belt or transfer roller is the same as that of the photosensitive drum. However, they normally have the different circumferential lengths. Therefore, when the first paper interval continuous Laser APC is executed, even if a laser radiation position is located at the paper interval, it often returns to a transfer point during image formation. Thus, the lower surface of a print sheet is contaminated.

When a double-side printing operation is performed, contamination of the lower surface of the print sheet causes a decisive drawback.

Even if a print sequence is executed or the arrangement of the transfer device is modified so that an interval of a toner portion attached to the transfer device by the paper interval continuous Laser APC must return to the paper interval of a print sheet, a condition for realizing this considerably restricts the printing operation or increases cost.

The laser beam printer is normally controlled by an external image forming apparatus which outputs an image, and executes a printing operation. However, the image forming apparatus does not unilaterally output an instruction command to the laser beam printer but must output image data in synchronism with a BD signal output from the laser beam printer in units of lines when an image is printed.

Therefore, for the laser beam printer, the BD signal is an important signal for the image forming apparatus. When the image forming apparatus causes the laser beam printer to execute a printing operation, it often uses one pulse of a BD signal per line as a coefficient of a counter in vertical control. Although the BD signal is indispensable during image printing, if the BD signal is output at the paper interval, it is convenient for the next print control, and control of the laser beam printer can be facilitated.

However, since the current laser beam printer temporarily clears and rises a laser light intensity to execute paper interval continuous Laser APC, light emission of the laser is interrupted. During execution of the paper interval continuous Laser APC, the BD signal cannot be detected, and a BD signal count at the paper interval cannot be guaranteed. For this reason, the image forming apparatus must control timings using, e.g., a timer at the paper interval, resulting in complicated control.

In a method of executing the Laser APC on the non-drum region, since a time corresponding to the non-drum region is about 100 μs to 200 μs in a normal laser beam printer, it is impossible in view of time to perform similar control to the above-mentioned paper interval continuous Laser APC during this time period. Even if an IC capable of performing ultra high-speed processing is used, this results in a considerable increase in cost, and is not practical. Therefore, for one non-drum region, control including light intensity measurement, comparison, and light intensity correction corresponding to one step in the paper interval continuous Laser APC can only be performed. Therefore, in order to control the light intensity to a predetermined value by this Laser APC, a period of several lines to several tens of lines is required. When correction is restarted from a level of several % to several tens of % of a predetermined light intensity, an image density is decreased during several lines to several tens of lines until the predetermined light intensity is reached, and density nonuniformity occurs, thus degrading image quality.

Even if control is made to perform light intensity control for one step during one non-drum region, when a resolution per step is rough, a density varies in units of lines due to a difference in light intensity before and after correction, and density nonuniformity becomes conspicuous.

A resolution per step will be briefly described below.

A laser light intensity is normally controlled by a laser drive current amount. The laser drive current is determined by a voltage regulating circuit controlled by an output voltage of a D/A converter. More specifically, the resolution of the D/A converter determines the resolution of the laser light intensity. In general, since a maximum drive current of a semiconductor laser is set at 120 mA, a current of 140 mA is considered as a maximum setup value taking variations of circuit constants into account. When the laser begins to emit light, it emits light at a light intensity determined by a slope efficiency mW/mA indicating a change in light intensity per unit current. However, the slope efficiency varies depending on individual lasers, and has a margin of about 0.1 to 0.6 mW/mA.

Therefore, if a 10-bit D/A converter, i.e., having a resolution of 1,023 steps is used, a current value per step is:

140 mA ÷ 1,023 steps ≈ 0.137 mA/step

Therefore, 0.137 mA/step × 0.6 mW/mA = 0.082 mW/step

However, in the laser beam printer, since a minimum value of an available laser light intensity is about 1 mW, then (0.082 mW/step ÷ 1 mW) × 100 = 8.2%/step Therefore, a variation rate of the light intensity per step is 8.2%.

In the laser beam printer, the variation rate causing density nonuniformity is generally 5%. Therefore, when the Laser APC is executed every page, density nonuniformity in a page does not occur. However, if the Laser APC is executed every line, density nonuniformity occurs.

As described above, the non-drum region Laser APC has a serious problem of a limited processing time, and a degree of stability of light intensity correction, and is not established yet as a control method which can be employed by the laser beam printer.

As described above, in the non-drum region Laser APC, since the non-drum region is detected on the basis of the UNBL signal, the BD signal for obtaining a proper pulse timing of the UNBL signal is an indispensable condition.

However, this BD signal is generated when a laser beam is radiated on a light-receiving element. When a laser beam rises, it starts from the state of a light intensity of 0, and the UNBL signal cannot be obtained. Therefore, control at a rise time of the non-drum region Laser APC on the basis of the UNBL signal cannot be executed.

When the control at the rise time of the Laser APC is performed in a continuous emission state regardless of the UNBL signal, a laser beam is radiated on an image forming region of the photosensitive drum surface, as described above, and the lower surface of a print sheet is contaminated.

A drive current at which the laser can emit light is set, and can be started from this value to rise a light intensity to a desired value at the non-drum region. However, since a threshold current Ith of the presently used laser has a margin of 20 mA to 60 mA due to variations in characteristics, a uniform setup value cannot be determined.

If the setup vallue is set at the threshold current Ith of 160 mA, when a calculation is made to have an average value of the slope efficiency η of 0.3 mW/mA, the light intensity for a laser having the threshold current Ith = 20 mA is given by:

(60 mA − threshold current(MIN)) × η(TYP) =

(60 mA − 20 mA) × 0.3 mW/mA = 12 mW

Since the present rated light intensity is 5 mW, some lasers must start the Laser APC while exceeding the rated value, and may be broken.

Therefore, a preferable setup value cannot be determined. If a laser to be used is limited to use a uniform setup value, the cost of the apparatus is considerably increased.

As described above, an image recording apparatus which forms and visualizes an electrostatic latent image on a photosensitive drum by a light beam radiated from a semiconductor light-emitting element, e.g., a laser has been proposed.

In the apparatus of this type, in order to suppress a variation in light output due to heat dissipation of a semiconductor light-emitting element, or the like, so-called APC is performed parallel to image recording processing, such that a light output of the semiconductor light-emitting element is received by a photosensor, e.g., a photodiode, and a laser drive current is controlled to obtain a constant light output.

In an LED printer using an LED array as semiconductor light-emitting elements, similar APC is performed.

The APC is normally performed once per page printing, i.e., between two adjacent pages.

In particular, in a continuous printing mode, a light-emitting operation for the APC is performed between two adjacent images to be printed. In this case, in the LED printer or the laser beam printer, since a surface portion of a photosensitive drum irradiated with a laser beam for, e.g., several msec (non-image forming region which does not normally serve as an image forming region) is developed in solid black, an extra toner as a developing agent is consumed by processing in addition to normal image recording processing. The developed toner on the photosensitive drum is directly recovered by a cleaner without being transferred onto a recording medium such as a recording sheet.

Therefore, in a cartridge type developing unit, a developing capacity and a recovery volume are determined in consideration of unnecessary toner consumption or a toner recovery capacity by the APC. However, when the developing unit is rendered compact to meet recent demand for a compact apparatus, the developing capacity and recovery volume disturb compactness of the apparatus.

The conventional cleaner device is arranged to be able to recover a residual toner which is not transferred onto a sheet. In development caused by APC exposure, the developed toner is directly recovered by the cleaner without being transferred onto a sheet. Therefore, a recovery load of the cleaner is large, and a cleaning error tends to occur.

When a transfer process is realized by a roller or belt transfer scheme, a roller or belt is in contact with the photosensitive drum. Thus, the roller or belt is contaminated with a toner on a non-paper portion (i.e., a region developed for the APC).

The present applicant proposed apparatuses for controlling light intensities of light-emitting elements in U.S. Pat. No. 4,201,994, U.S. Pat. No. 4,443,695, U.S. Ser. No. 087,707 (filed Aug. 21, 1987) and U.S. Ser. No. 232,168 (filed Aug. 15, 1988). However, a further improvement has been demanded.

SUMMARY OF THE INVENTION

It is an object of the present invention to eliminate the above-mentioned drawbacks.

It is another object of the present invention to improve a light intensity control apparatus.

It is still another object of the present invention to provide a light intensity control apparatus which can obtain a stable output light intensity.

It is still another object of the present invention to provide a light intensity control apparatus with a simple arrangement.

It is still another object of the present invention to provide a light intensity control apparatus which can obtain a desired light intensity within a short period of time.

It is still another object of the present invention to provide a light intensity control apparatus which can obtain a high-quality reproduction image.

It is still another object of the present invention to provide a light intensity control apparatus suitably applied to a recording apparatus.

It is still another object of the present invention to provide a light intensity control apparatus which can efficiently control a light intensity.

It is still another object of the present invention to provide a light intensity control apparatus which can accurately control a light intensity.

It is still another object of the present invention to provide a light intensity control apparatus which can perform light intensity control with high reliability.

It is still another object of the present invention to provide a light intensity control apparatus which can prevent degradation of an image.

It is still another object of the present invention to provide a light intensity control apparatus which can correct a light intensity without interfering with an increase in processing speed of image forming processing, and can prevent a paper sheet from being contaminated or density nonuniformity in a page.

It is still another object of the present invention to provide a light intensity control apparatus which restricts light intensity adjustment processing of a light-emitting element in an image recording operation to supress consumption of a developing agent, and can greatly reduce a developing agent recovery amount.

The above and other objects of the present invention will be apparent from the following description of the preferred embodiments and appended claims taken in conjunction with the accompanying drawings.

BRIEF DESCRIPTION OF THE DRAWINGS

FIG. 3I is a flow chart showing an APC-03 routine in the detailed operation of the first embodiment;

FIGS. 2A and 12B are a flow chart showing an APC-05 routine in the second embodiment;

FIG. 24 is a chart for explaining a state wherein a laser light intensity is converged to a 100% convergence value in the tenth embodiment;

DETAILED DESCRIPTION OF THE PREFERRED EMBODIMENTS

The preferred embodiments of the present invention will be described hereinafter with reference to the accompanying drawings.

FIRST EMBODIMENT

Prior to the description of the embodiment, contents are shown below:
(1) Description of Basic Circuit
   (1-a) Arrangement of Basic Circuit
   (1-b) Operation of Basic Circuit
   (1-c) Modification of Basic Circuit
(2) Description of Detailed Control
   (2-a) UNBL Signal and UNBL Interrupt
   (2-b) Configurations of Memories and Flags
   (2-c) Timer
   (2-d) Identification of Continuous Laser ON State
   (2-e) Program Control
   (2-f) IDLE Routine
   (2-g) APC-START Routine
   (2-h) APC-TABLE Call
   (2-i) APC-01 Routine
   (2-j) APC-02 Routine
   (2-k) APC-03 Routine
   (2-l) APC-04 Routine
   (2-m) Rise from Threshold Current Ith
   (2-n) UNBL Error Processing
   (2-o) Laser Life Warning
   (2-p) APC-RDY
   (2-q) Overflow/Underflow Processing
   (2-r) APC-05 Routine
(1)

Description of Basic Circuit (1-a) Arrangement of Basic Circuit

Figure 1A:
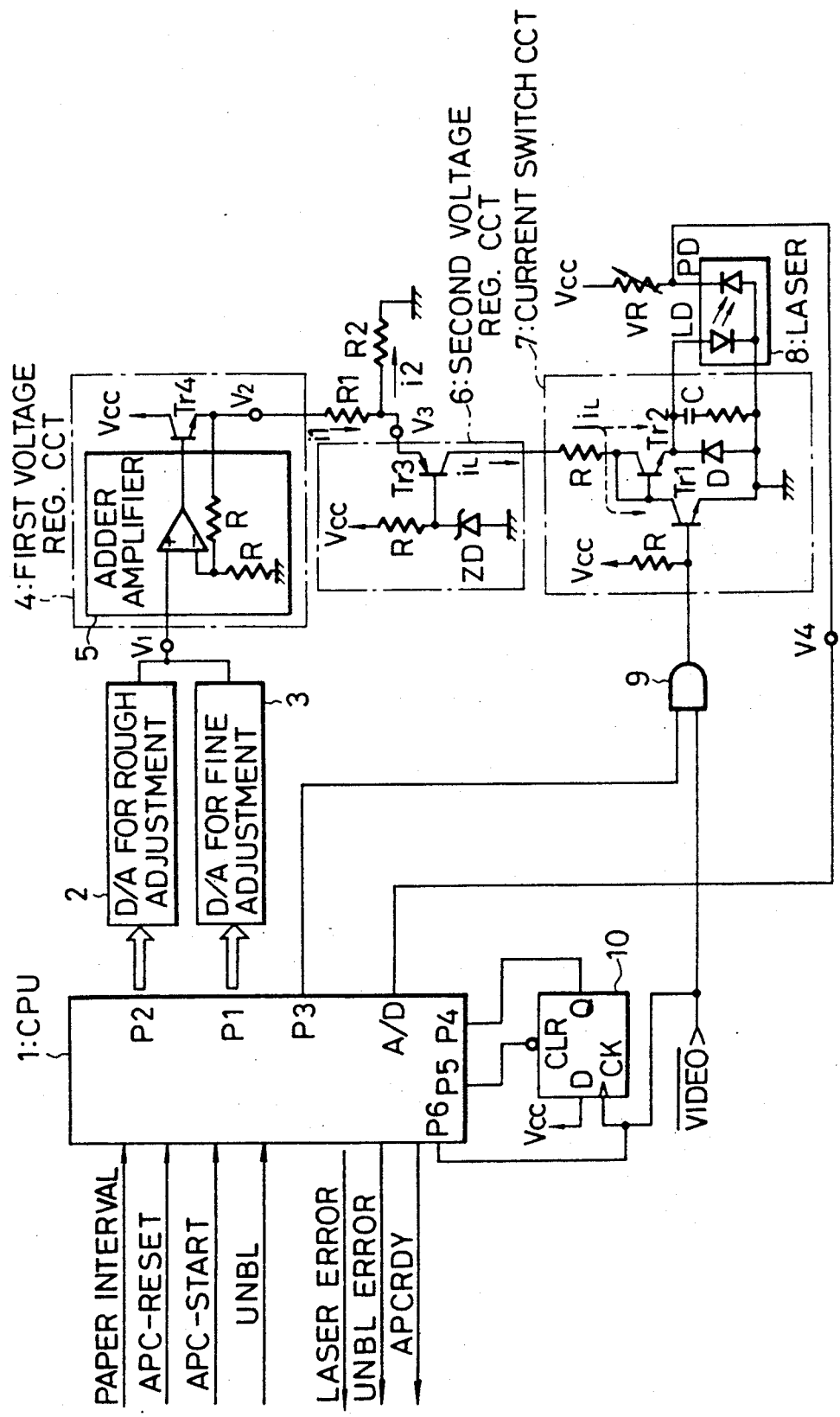
FIG. 1A is a diagram showing a basic circuit of a laser beam printer according to a first embodiment of the present invention.

FIG. 1A is a circuit diagram showing a basic arrangement of a laser beam printer according to an embodiment of the present invention.

The laser beam printer comprises a CPU 1, D/A converters 2 and 3, voltage regulating circuits 4 and 6, a current switch circuit 7, a laser 8, and AND gate 9, and a D flip-flop 10.

The CPU 1 controls the overall apparatus of this embodiment, and incorporates an A/D converter for converting an external analog input to digital data.

The D/A converters 2 and 3 are connected to ports P2 and P1 of the CPU 1, respectively, and adjust an output light intensity of the laser 8 on the basis of data supplied from these ports P2 and P1. The D/A converter 2 is used for rough adjustment, and the D/A converter 3 is used for fine adjustment.

Note that when the CPU 1 incorporates D/A converters, these external D/A converters 2 and 3 can be omitted.

The first voltage regulating circuit 4 comprises an adder amplifier 5 for amplifying a sum voltage $V_1$ of output voltages from the D/A converters 2 and 3 respectively for rough and fine adjustment, and the like, and outputs a regulated voltage $V_2$. That is, the output voltage $V_2$ varies in accordance with data values supplied from the ports P2 and P1 of the CPU 1 to the D/A converters 2 and 3.

The second voltage regulating circuit 6 outputs an output voltage $V_3$ determined by a Zener diode ZD. In this embodiment, the output voltage $V_3$ is a fixed voltage. However, the D/A converters may be similarly arranged to vary the output voltage $V_3$ under the control of the CPU 1.

The current switch circuit 7 switches whether or not a laser drive current $i_L$ determined by the output voltages $V_2$ and $V_3$ of the voltage regulating circuits 4 and 6 and resistors $R_1$ and $R_2$, and determines an ON/OFF state in accordance with an output state of the AND gate 9. More specifically, if the output from the AND gate 9 is at "LOW" level, the circuit 7 supplies the laser drive current $i_L$ to the laser 8; otherwise, supplies the laser drive current $i_L$ to an input-side transistor $TR_1$.

The laser 8 incorporates a laser diode LD and a PIN photodiode PD as a light-receiving element. Light emitted from the laser diode LD is received by the PIN photodiode PD, and supplies a voltage $V_4$ determined by a variable resistor VR to the input terminal of the A/D converter of the CPU 1. Note that the light-receiving element may be externally arranged.

The AND gate 9 has an open-collector structure and is of a 2-input type for receiving a video signal ($\overline{VIDEO}$) supplied from an external host controller and an output signal from a port P3 of the CPU 1.

The D flip-flop 10 receives the video signal at its clock input terminal. The D input terminal of the flip-flop 10 is pulled up. The clear input terminal and the Q output terminal of the flip-flop 10 are connected to ports P5 and P4 of the CPU 1.

(1-b) Operation of Basic Circuit

The CPU 1 is controlled by control signals sent from the controller.

The control signals include:

(A) APC-RESET Signal

When the APC-RESET signal goes to TRUE level, an APC operation is not executed, and a laser power is maintained in a 0-mW state. Thus, the apparatus of this embodiment is set in a reset state.

The APC-RESET signal of this embodiment goes to FALSE level when the printing operation is started, and goes to TRUE level when the printing operation ends. However, even during the printing operation, when failures, e.g., jam, door open, scanner malfunction, and the like occur, the APC-RESET signal immediately goes to TRUE level.

(B) APC-START Signal

The APC-START signal is a timing signal, and the APC operation is started at the leading edge when this signal goes to TRUE level. More specifically, when the APC-START signal is received after the APC-RESET signal goes to FALSE level, the APC operation is continued to obtain a predetermined output power of the laser 8. In this embodiment, when the APC-START signal is received again, the APC operation so far is stopped, and a new APC operation is started.

Note that when the APC-START signal is received during the APC operation, the APC-START signal may be ignored until the APC operation is reset by the APC-RESET signal. When the APC operation is restarted, it may be started from an intermediate state.

In this embodiment, the APC-START signal can be received only when the APC-RESET signal goes to FALSE level. The APC-START signal is ignored as long as the APC-RESET signal is at TRUE level.

In this embodiment, the scanner is rotated during only the printing operation. Therefore, the laser is not turned on before scanner rotation reaches steady rotation. For this reason, the APC-START signal will not go to TRUE level before the APC-RESET signal goes to FALSE level and scanner rotation reaches steady rotation.

(C) UNBL (Unblanking) Signal

The UNBL signal is an indispensable signal for generating a beam detect (BD) signal especially in the laser beam printer. The UNBL signal turns the laser on to detect the BD signal of the next line at the end of each line during raster scan. After the BD signal is detected, the UNBL signal goes to FALSE level at a predetermined timing, and a laser ON operation for detecting the BD signal is completed.

The controller takes synchronization based on the BD signal, and outputs the video signal after the lapse of a predetermined period of time.

More specifically, the UNBL signal is set at TRUE level for a predetermined period of time in order to generate the BD signal, and turns the laser on during the TRUE period. If no BD signal is detected during this period, a BD error occurs. In order to continuously emit the laser until the BD signal is detected, the UNBL signal is kept at TRUE level. When the BD error continues over a predetermined period of time, a BD failure is detected, and the laser beam printer interrupts the printing operation. At the same time, the UNBL signal is set at FALSE level to stop laser emission for detecting the BD signal.

The TRUE period of the UNBL signal corresponds to a region other than one defined from the scan end portion to the scan start portion of the photosensitive drum of a raster scan region, i.e., a region (non-drum region) where a line scanned by a polygonal mirror falls outside a drum region.

(D) Paper Interval Signal

This signal indicates an interval between adjacent print sheets during the printing operation by the laser beam printer, and has different timings according to sizes of paper sheets to be subjected to printing. Note that when the paper interval signal is at TRUE level, it indicates a paper interval.

(E) Other Signals

In addition to the above-mentioned control signals, drum sensitivity data for switching an APC target value in accordance with the sensitivity of a photosensitivity drum used and for executing the APC at a light intensity suitable for the drum sensitivity may be input.

The laser beam printer outputs the following signals in response to the above-mentioned input control signals.

(A) Laser Error Signal

This signal informs a laser failure or the like to the controller.

(B) UNBL Error Signal

This signal informs that no UNBL signal is input.

(C) APC-RDY Signal

This signal indicates that the APC operation is ready.

Note that these control signals are merely examples, and the present invention is not limited to these signals upon execution of the APC operation.

The laser drive current $i_L$ will be described below.

A maximum drive current of a semiconductor laser is normally about 120 mA. Thus, a laser driver must be designed to have a chip light intensity value (TYP) of about 140 mA in consideration of variation and deviation of circuit constants in order to assure 120 mA. On the other hand, the laser beam printer is required to have stability of a laser light intensity of ±5% with respect to a target value. A laser used in the laser beam printer must cover a light intensity having a slope efficiency of a maximum of 0.6 mW/mA in terms of ratings. A laser light intensity used in the laser beam printer is a minimum of about 1 mW.

Therefore, in order to maintain a variation in light intensity within 5%, (1 mW)×0.05)/0.6 mW/mA ≈ 0.0083 mA
140 mA/0.083 mA ≈ 1,687 steps More specifically, a current amount per step to assure 5% is 0.083 mA, and 1,687 steps are required.

For this purpose, if the 1,687 steps are covered by one D/A converter, 11 bits are necessary. However, the 11-bit D/A converter cannot actually execute the above processing in consideration of a resolution.

A light intensity up to a predetermined rate is roughly adjusted with respect to a target light intensity, and a light intensity exceeding the predetermined rate is finely adjusted, so that the number of bits of a D/A converter can be decreased, and a versatile D/A converter can be used.

In this embodiment, the rough adjustment D/A converter 2 and the fine adjustment D/A converter 3 share the processing. More specifically, the D/A converter 2 is set to be 0.5 mA/step, and the D/A converter 3 is set to be 0.05 mA/step. Thus, (0.5 mA/step × 255 bits) + (0.05 mA/step × 255 bits) =

127.5 mA + 12.75 mA = 140.25 mA (0.05 mA × 0.6 mW/mA)/1 mW = 0.03 = 3%

More specifically, in order to share processing by the rough and fine adjustment D/A converters 2 and 3 and to keep a maximum drive current of 140 mA and light intensity stability of 5% or less, 8-bit D/A converters can be used.

Note that this does not mean that the 8-bit D/A converters must be used.

For these reasons, in the basic circuit of this embodiment, the 8-bit D/A converters 2 and 3 for rough and fine adjustment are used to adjust a laser light intensity.

An arrangement for determining the laser drive current $i_L$ will be described below.

The laser drive current $i_L$ is determined by the sum of the output voltages from the D/A converters 2 and 3. That is, the current $i_L$ is proportional to data values from the CPU 1 to the D/A converters 2 and 3.

More specifically, the output voltages $V_1$ of the D/A converters 2 and 3 are multiplied with a constant, and become the output voltage $V_2$ of the first voltage regulating circuit 4. On the other hand, the second voltage regulating circuit 6 outputs the fixed output voltage $V_3$. Therefore, currents $i_1$ and $i_2$ flowing through the resistors $R_1$ and $R_2$ are respectively given by:

$$i_1 = (V_2 - V_3)/R_1$$

$$i_2 = V_3/R_2$$

Thus, $R_1$, $R_2$, $V_1$, and $V_2$ are set to obtain $i_1 = i_2$ when data values input to the D/A converters 2 and 3 are "00H". When the output voltage $V_2$ of the first voltage regulating circuit 4 is increased by the D/A converters 2 and 3, the relationship $i_1 > i_2$ is established, and a current corresponding to a difference $(i_1 - i_2)$ flows through the current switch circuit 7. The difference current serves as the laser drive current $i_L$. Therefore, the laser drive current $i_L$ is given by:

$$i_L = \{(V_2 - V_3)/R_1\} - V_3/R_2$$

Since $V_3$, $R_1$, and $R_2$ are fixed values, the laser drive current $i_L$ is determined by the output voltage $V_2$ of the first voltage regulating circuit 4. The data values at the ports P1 and P2 of the CPU 1 which are supplied to the D/A converters 2 and 3 are controlled, so that the laser drive current $i_L$ corresponding to the data values can be obtained.

The schematic control operation of the Laser APC will be briefly described below. Note that this operation will be described in more detail later.

When the APC-RESET signal goes to FALSE level, the scanner rotation reaches steady rotation, and the APC-START signal goes to TRUE level, the APC operation is started with reference to the leading edge of the APC-START signal.

The CPU 1 initializes data values at the ports P2 and P1 to be supplied to the D/A converters 2 and 3. Data for initialization is not limited to zero-cleared data, as will be described later.

The CPU 1 sets the port P3 at "LOW" level to set a state wherein the laser drive current $i_L$ flows through the laser diode LD (to be referred to as a laser ON state hereinafter; a state wherein the laser drive current $i_L$ does not flow the laser diode LD will be referred to as a laser OFF state hereinafter). The output voltage $V_2$ of the first voltage regulating circuit 4 is increased from the laser ON state.

Initially, since the laser drive current $i_L$ is smaller than a threshold current Ith inherent to the laser 8, the laser 8 does not emit light even in the laser ON state. Therefore, an input voltage to the A/D converter input terminal of the CPU 1 is $V_{CC}$. When the laser drive current $i_L$ is further increased, the laser 8 begins to emit light, and the input voltage to the A/D converter input terminal of the CPU 1 is decreased from $V_{CC}$. In order to increase the output voltage $V_2$ of the first voltage regulating circuit 4 until the input voltage reaches a desired value, the CPU 1 increments the data values of the ports P2 and P3 output to the D/A converters 2 and 3.

Various methods of incrementing the output data values may be employed.

For example, the output data values are simultaneously incremented by several steps by one operation of the rough adjustment D/A converter 2 up to the threshold current Ith at which the laser 8 begins to emit light. When the current $i_L$ has reached the threshold current Ith, the data values may be incremented by one step by the rough adjustment D/A converter 2 up to 90% of the next light intensity target value, and thereafter, may be incremented by the fine adjustment D/A converter 3 for remaining 10%.

Alternatively, for example, the drive current is raised by the rough adjustment D/A converter 2 up to 70% of the target value, and data values at that time are stored. The drive current is raised by the rough adjustment D/A converter 2 up to 80% of the target value, and is then raised by the fine adjustment D/A converter 3 for remaining 20%. The next APC operation can be started from stored data values for 70%.

Alternatively, previous data values of the rough and fine adjustment D/A converters are peak-held, and the peak-held data values may be increased/decreased for the next APC operation.

Figure 2:
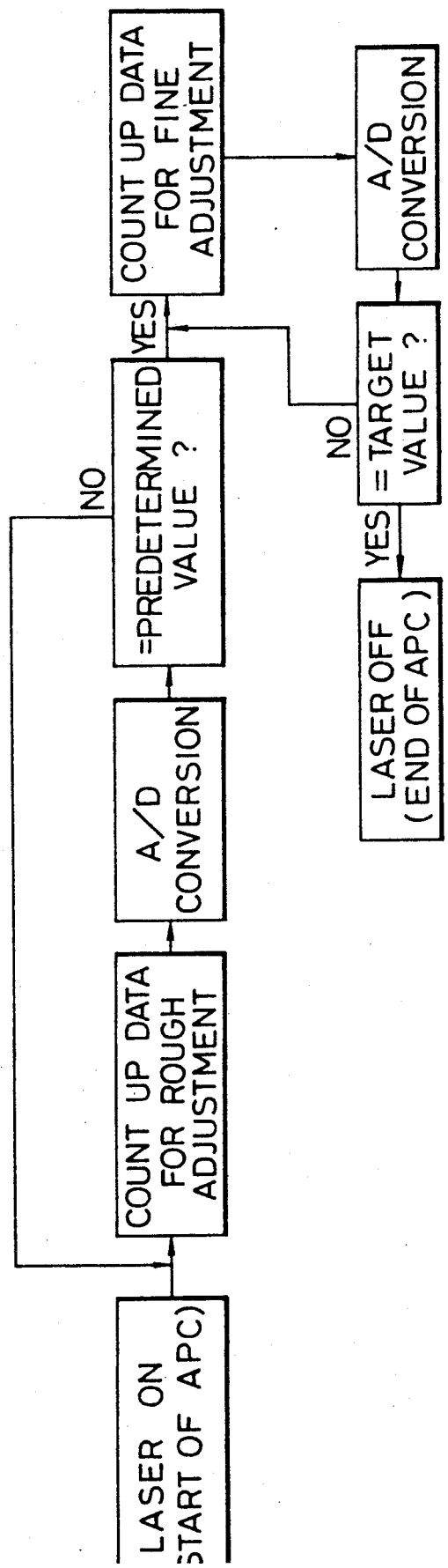
FIG. 2 is a schematic block diagram of a light intensity control operation according to the first embodiment.

In this embodiment, as a detailed sequence for raising the laser intensity to a desired target value by the D/A converters 2 and 3, various methods may be employed. Basically, the sequence is as shown in FIG. 2. In order to increase a speed of the APC operation, the above-mentioned modifications may be effectively made.

(1-c) Modification of Basic Circuit

The basic circuit shown in FIG. 1A is merely an example, and the present invention is not limited to this.

Figure 1B:
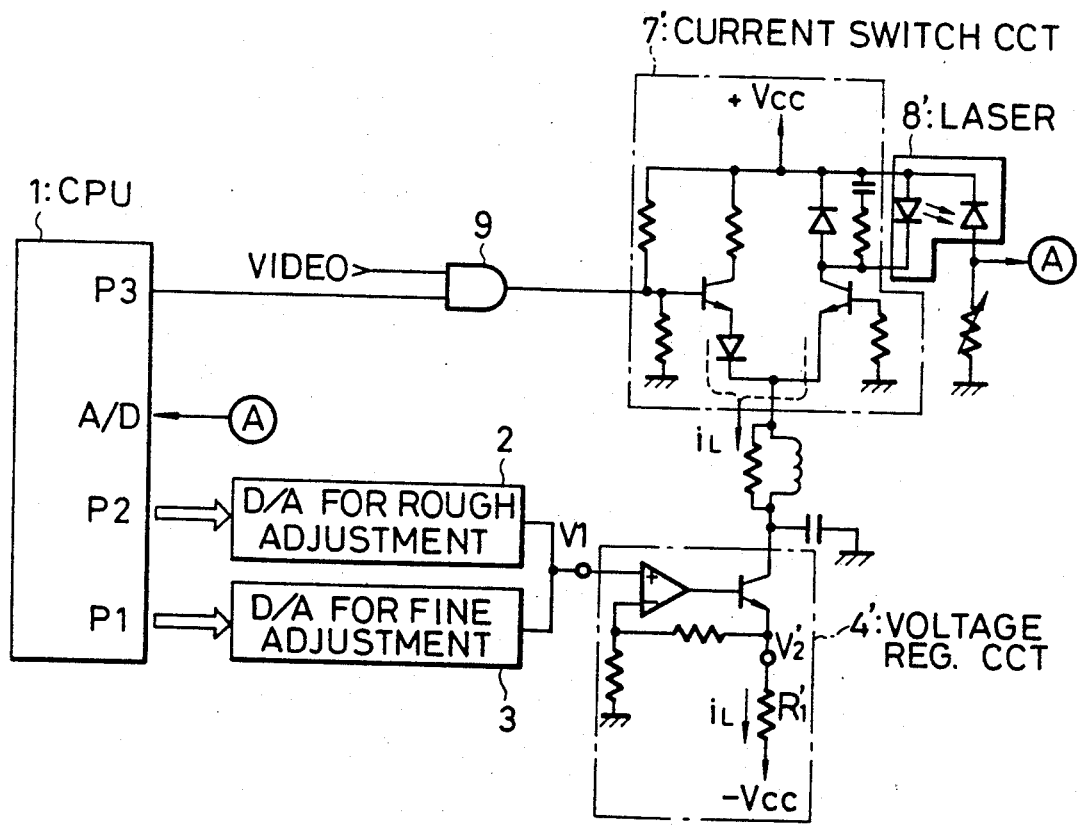
FIG. 1B is a circuit diagram showing a modification of the basic circuit shown in FIG. 1A.

FIG. 1B is a circuit diagram showing a modification of the basic circuit. The same reference numerals in FIG. 1B denote the same parts as in the basic circuit shown in FIG. 1A, and a detailed description thereof will be omitted.

In this modification, an output voltage $V_4'$ from a voltage regulating circuit 4' is determined by data values sent from the CPU 1 to the D/A converters 2 and 3 in the same manner as in the basic circuit shown in FIG. 1A. The laser drive current $i_L$ is determined by:

$$i_L = \{V_2' - (-V_{CC})\}/R_1'$$

A current switch circuit 7' determines in accordance with the output from the AND gate 9 whether or not the laser drive current $i_L$ is supplied to a laser 8.

(2)

Description of Detailed Control

FIGS. 3A to 3K are flow charts showing control operations of the laser beam printer of this embodiment.

Figure 3A:
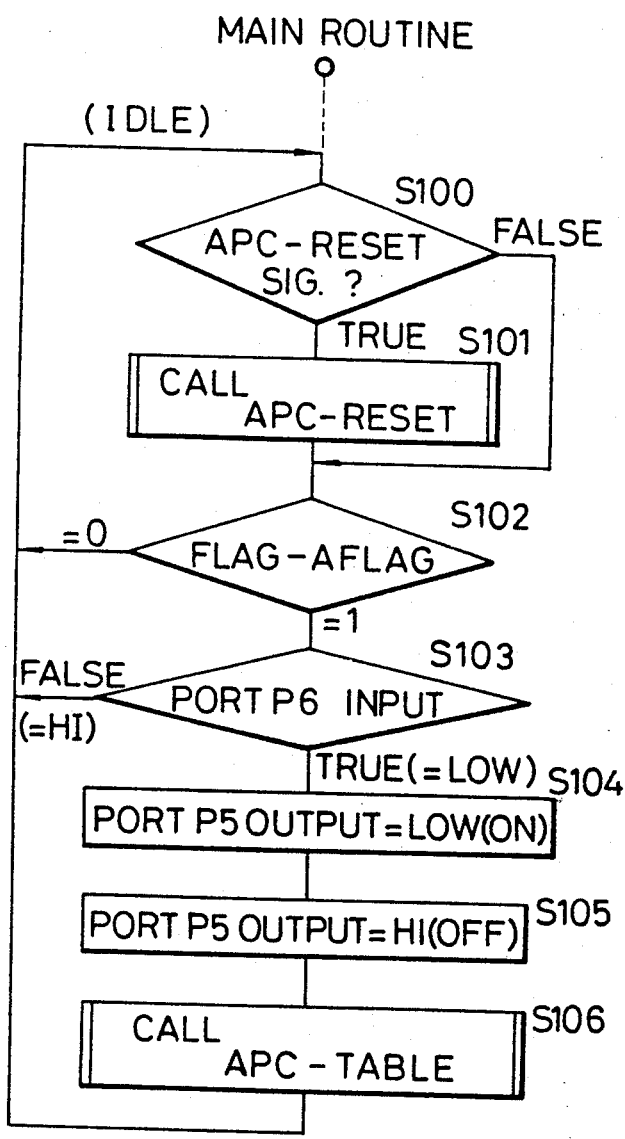
FIG. 3A is a flow chart showing a main routine of a detailed operation of the first embodiment.

FIG. 3A shows a main routine. When a power switch is turned on, a predetermined initialization routine is executed, and thereafter, the control enters an IDLE routine. During execution of the initialization, an APC-RESET routine is executed.

Prior to a description of the detailed control, the basic arrangement will be complementarily explained below.

(2-a) UNBL Signal and UNBL Interrupt

The UNBL signal has already been briefly described above. The UNBL signal in the laser beam printer of this embodiment will be described below.

In this embodiment, the UNBL signal is input to an external interrupt terminal of the CPU 1. An interrupt request is issued in response to the leading edge of the UNBL signal, and the control enters the UNBL interrupt routine shown in FIG. 3C.

The UNBL signal is synthesized with the video signal by the AND gate 9. More specifically, the video signal is output as an image signal during raster scan of the laser beam and during a period corresponding to the photosensitive drum region, and is output as the UNBL signal for forcibly setting the laser ON state for a region other than the photosensitive drum region.

The UNBL signal is kept at TRUE level until the BD signal is obtained. When the BD signal is obtained, the UNBL signal immediately goes to FALSE level. The UNBL signal is set at TRUE level slightly before a predetermined timing at which the next BD signal is to be obtained. More specifically, in a state wherein the BD signal is normally input, the UNBL signal goes to TRUE level for a predetermined period of time in a predetermined cycle. Although the TRUE cycle and period of the UNBL signal vary depending on laser beam printers and their resolutions, the cycle is about 700 $\mu$s to 2 ms and the period is about 100 $\mu$s for a high-speed printer.

However, when the BD signal cannot be obtained due to an abnormality, e.g., laser destruction, a failure of a scanner motor, or the like, the UNBL signal is kept at TRUE level until the BD signal is obtained. When the TRUE period continues over the predetermined period of time, a BD detection failure is determined, and the UNBL signal goes to FALSE level.

A BD signal generator (not shown) can detect a level lower than a minimum photosensitive light intensity level of the photosensitive drum to generate the BD signal. When the laser begins to emit light, the UNBL signal becomes a pulse signal having the above-mentioned cycle and pulse width (TRUE period). Contrary to this, the UNBL signal is kept at TRUE level until the laser begins to emit light.

The UNBL interrupt of the CPU 1 by the UNBL signal is basically executed using the leading edge of the UNBL signal as a trigger, as has been described above. In response to the first UNBL signal at which the laser does not emit light yet, the CPU 1 tries to enter the first UNBL interrupt. However, this interrupt is canceled by the APC-START routine or the like shown in FIG. 3E. Therefore, the UNBL interrupt of the CPU 1 is actually executed after the laser emits light and the UNBL signal becomes a pulse signal. No UNBL interrupt is made before the laser emits light.

(2-b) Configurations of Memories and Flags

In order to execute the Laser APC of this embodiment, the following memories are prepared.

(A) D Output Data Memory

This memory stores data (to be referred to as D output data hereinafter) for causing the rough adjustment D/A converter to perform its operation to obtain a desired intensity value in a rough adjustment process by the rough adjustment D/A converter 2.

(B) D Hold Data Memory

When a desired intensity value is obtained based on the D output data in the rough adjustment process by the rough adjustment D/A converter 2, this memory stores data at this time (to be referred to as D hold data hereinafter).

(C) R Output Data Memory

This memory stores data (to be referred to as R output data hereinafter) for causing the fine adjustment D/A converter 3 to perform its operation so as to obtain a desired intensity value in a fine adjustment process by the fine adjustment D/A converter (D) R Hold Data Memory When a desired intensity value is obtained based on the R output data in the fine adjustment process by the fine adjustment D/A converter 3, this memory stores data at this time (to be referred to as R hold data hereinafter).

Principal flags will be described below.

(A) UNBL-IN Flag

This flag is set to be "1" when the UNBL signal is received.

(B) FLAG-A Flag

This flag is set to be "1" when data values in the rough adjustment process by the rough adjustment D/A converter 2 are determined. In this embodiment, a time until the UNBL-IN flag is set is defined as a rise time of the Laser APC. Note that the present invention is not particularly limited to this definition when the Laser APC is carried out.

(C) TABLE-NO Flag

Figure 3B:
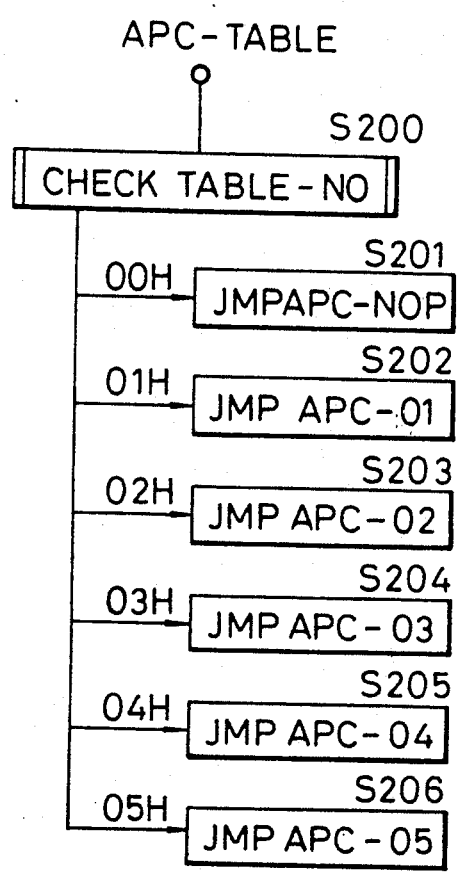
FIG. 3B is a flow chart of an APC-TABLE call routine in the detailed operation of the first embodiment.

This flag is a selection control flag for causing the control to skip to APC-NOP and APC-01 to APC-05 routines (to be generally referred to as APC routines hereinafter) in the APC-TABLE routine shown in FIG. 3B. More specifically, when the APC-TABLE routine is called, one of programs of the APC routine in the APC-TABLE routine is selected based on the TABLE-NO flag, and is executed. Note that for the APC-01 to APC-04 routines, when an execution condition of each program is satisfied, the control advances to the next program. More specifically, the control transits like APC-01→APC-02→APC-03 .... When the control advances to the APC-05 routine, the APC-05 routine is kept executed. As will be described above, when data overflows or underflows while the R output data is compared and calculated, the control is returned to the APC-02 routine and advances up to the APC-05 routine to re-execute the programs.

(2-c) Timer

Figure 3C:
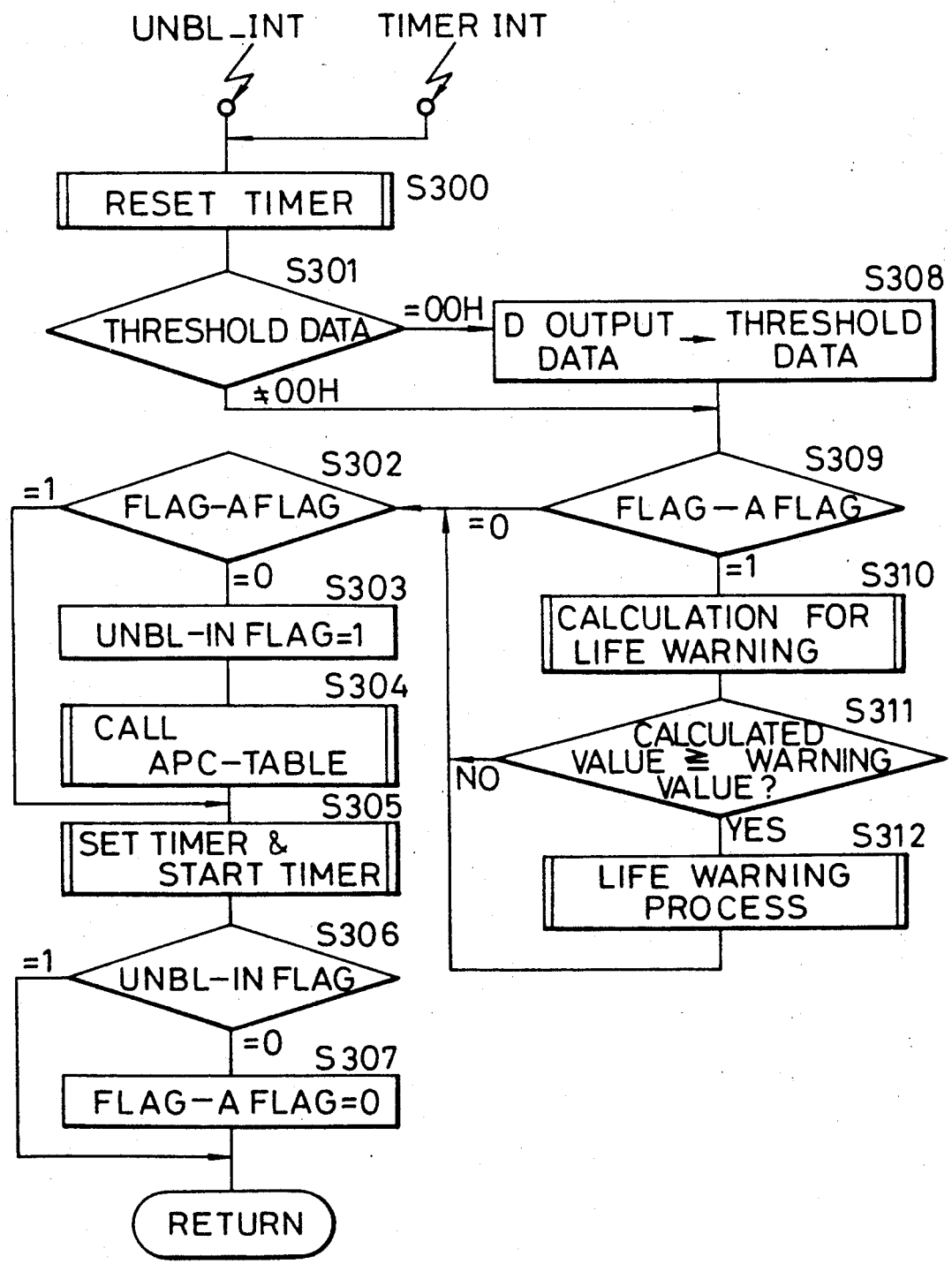
FIG. 3C is a flow chart showing an interrupt routine in the detailed operation of the first embodiment.

The routine shown in FIG. 3C includes a timer interrupt, and other routines include a timer set/reset subroutine. The operation of the timer will be described in detail later in a paragraph of UNBL error. This timer is basically used for performing error processing when inputting of the UNBL signal is stopped, i.e., when the UNBL error occurs. Therefore, a description of the normal operation state will be omitted.

(2-d) Identification of Continuous Laser ON State

The operation of the D flip-flop 10 will be described below.

The video signal is input to the clock terminal of the flip-flop 10. The Q output of the flip-flop 10 goes to "HI (HIGH)" level at the leading edge of this video signal at which it changes from "LOW" level to "HI" level. In order to set the Q output at "LOW" level, when the port P5 of the CPU 1 can be set at "LOW" level, the Q output is inverted by a clear input of the flip-flop 10. The flip-flop 10 is used to determine based on the video signal whether or not the laser ON state continues over a predetermined period of time t.

Figure 4:
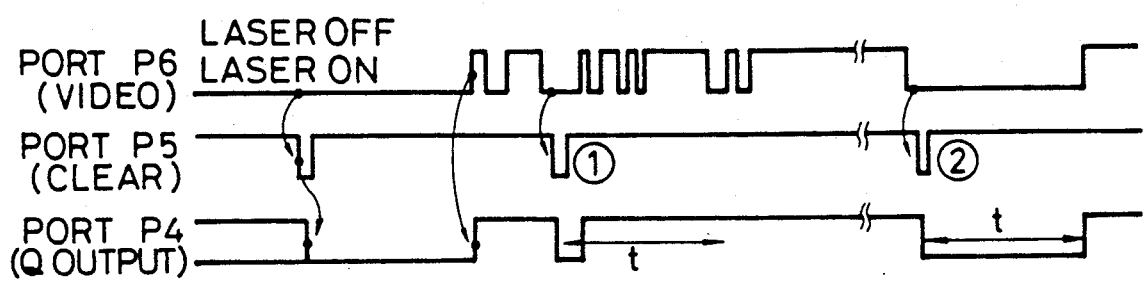
FIG. 4 is a timing chart of a continuous laser ON operation in the first embodiment.

FIG. 4 is a timing chart for explaining the operation of the flip-flop 10.

In FIG. 4, the input to the port P6 of the CPU 1 corresponds to the video signal. If the input at the port P6 is at "LOW" level, i.e., if the laser ON state is detected, a one-shot pulse is output from the port P5 to reset the Q output data as the input to the port P4 to "LOW" level. Therefore, whether or not the laser ON state continues over the predetermined period of time t can be determined by referring to the input to the port P4 after the lapse of the predetermined period of time t. More specifically, when the input to the port P4 is kept at "LOW" level, the continuous laser ON state can be determined; when it is changed to "HI" level, it can be determined that the continuous laser ON state is not set. The predetermined period of time t is basically an A/D conversion time of the CPU 1. Assuming that the laser is turned off during execution of A/D conversion, if an output voltage of the light-receiving element (PIN photodiode PD) of the laser 8 cannot be held before the A/D conversion of the CPU 1 ends, a resultant output of the CPU 1 cannot be processed as a correct A/D-converted value. The laser ON state based on the UNBL signal can guarantee the predetermined period of time t, while the laser ON state based on image data cannot guarantee it. After the A/D conversion processing or the like, whether or not the continuous laser ON state is set is determined to validate or invalidate the A/D-converted value or associated processing, thus allowing correct control.

(2-e) Program Control

Program control in such processing will be described below.

The program control corresponds to steps S103 to S106 in the main routine shown in FIG. 3A. In this embodiment, this control is executed after the Laser APC rises, i.e., the FLAG-A flag is set. However, the present invention is not limited to this. For example, this control may be executed from the beginning of the rise time of the Laser APC, and need not be distinguished from the TRUE timing of the UNBL signal.

When the FLAG-A flag is set, this state is identified in step S102 in FIG. 3A, and it is then checked on the basis of the input of the port P6 whether or not the laser ON state is set (step S103). If the laser OFF state is set, the control ends. However, if the laser ON state is set, a clear pulse for resetting the flip-flop 10 is output from the port P5 (steps S104 and S105). Processing including A/D conversion is then executed to call the APC-TABLE routine. When the APC-TABLE routine is called, one program of the APC routine is selected and executed.

As indicated by ① in FIG. 4, when the laser ON state does not continue for the predetermined period of time t, since the Q output of the flip-flop 10 is set at "HI" level upon completion of the APC routine, it is determined that the input to the port P4 is at "HI" level, and the result of the APC routine is invalidated. When the laser ON state is continuously held, as indicated by ② in FIG. 4, since Q output of the flip-flop 10 is at "LOW" level, it is determined that the input of the port P4 is at "LOW" level, and the result of the APC routine is validated.

Even when no image data corresponding to the laser ON state over the predetermined period of time t is present, since a 1-line scan operation has one UNBL signal in principle, the execution result of the APC routine is validated at least once per line scan unless the UNBL error occurs.

In this embodiment, the flip-flop 10 is used. However, other circuits may be used as long as the same effect can be obtained. In place of using an external circuit such as the flip-flop, the video signal is input to an interrupt terminal of the CPU 1, so that an interrupt is made at the leading edge of the laser ON state. When the interrupt is made, the FLAG-A flag is checked, and a clear pulse is output from the port P5 to call the APC-TABLE routine.

(2-f) IDLE Routine

Control for raising the laser to a predetermined light intensity will be described below.

When the power switch is turned on, the initialization processing is executed in the main routine shown in FIG. 3A, and the control enters the IDLE routine. The IDLE routine includes execution of the APC-RESET routine shown in FIG. 3D.

In the IDLE routine, the APC-RESET signal is checked (step S100). The APC-RESET signal goes to FALSE level while the laser printer executes the printing operation. Therefore, at this time, the APC-RESET routine is called (step S101).

Figure 3D:
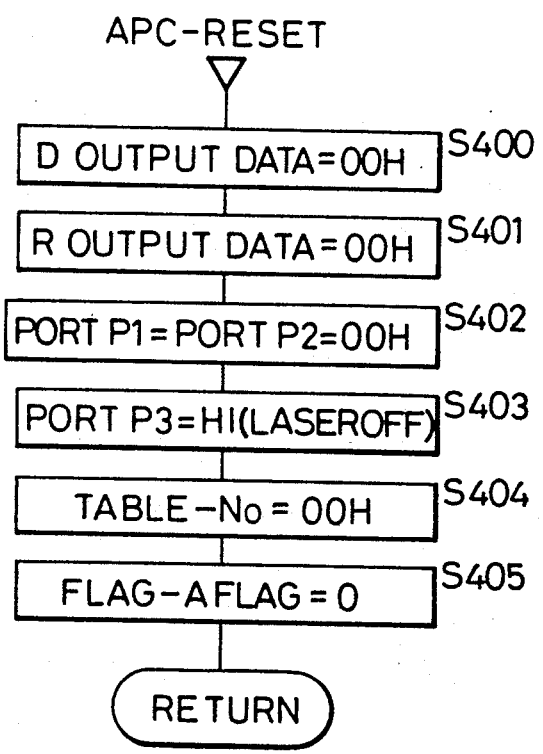
FIG. 3D is a flow chart showing an APC-RESET routine in the detailed operation of the first embodiment.

Thus, in the APC-RESET routine shown in FIG. 3D, the D output data and the R output data are respectively set to be "00H" (steps S400 and S401). The outputs of the ports P1 and P2 are respectively set to be "00H" (step S402), thus setting the laser drive current $i_L$ at 0 mA. The output of the port P3 is set at "HI" level (step S403), so that the laser ON state is canceled.

The TABLE-NO flag as the APC-TABLE control flag is set to be "00H" to designate the APC-NOP routine (step S404). The FLAG-A flag is reset (step S405), and the flow then returns to step S102 in the main routine.

In the main routine, the FLAG-A flag is checked (step S102), and the flow returns to step S100. If the APC-RESET signal is at TRUE level, the above-mentioned operation is repeated.

Figure 3E:
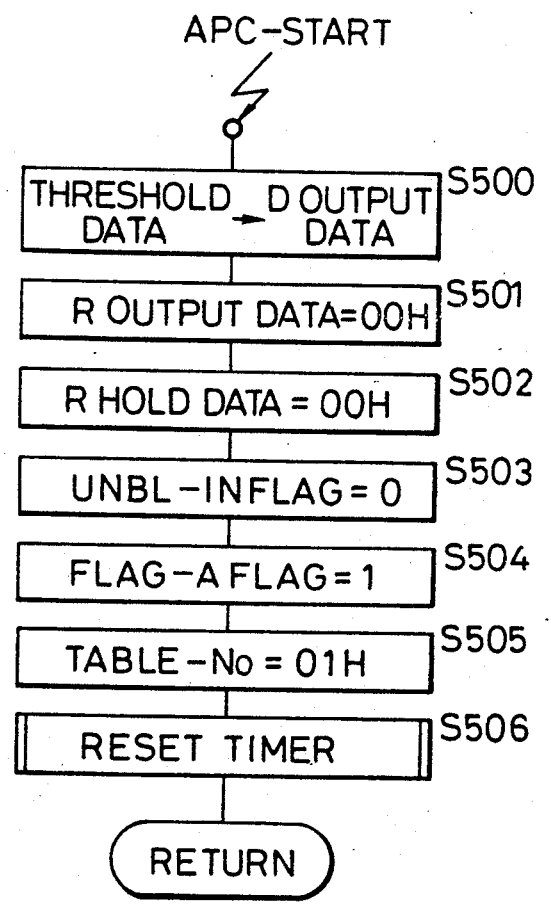
FIG. 3E is a flow chart showing an APC-START routine in the detailed operation of the first embodiment.
Figure 3F:
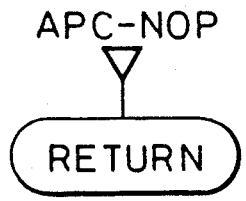
FIG. 3F is a flow chart showing an APC-NOP routine in the detailed operation of the first embodiment.

In the APC-RESET routine, if the control enters the interrupt routine shown in FIG. 3C and the APC-TABLE routine is accidentally called, since the TABLE-NO flag is "00H", the routine shown in FIG. 3F is only called, and the control returns without any processing. Therefore, no Laser APC is executed.

When the controller executes the printing operation, it begins to rotate, e.g., the scanner motor. When the rotation of the scanner motor has reached steady rotation, the controller sets the UNBL signal at TRUE level to obtain the BD signal, and keeps the TRUE-level signal until the BD signal is obtained.

When the UNBL signal goes to TRUE level, the CPU 1 starts the UNBL interrupt operation, and executes the interrupt routine shown in FIG. 3C. However, since the APC-RESET routine is being executed, the control is not influenced. Since the flags are initialized in the APC-START routine shown in FIG. 3E, no problem is posed. As described above, the BD signal is not generated before the laser emits light. Therefore, the interrupt routine by the UNBL signal is not called before the laser emits light.

(2-g) APC-START Routine

When the controller sets the UNBL signal at TRUE level, it then sets the APC-START signal at TRUE level. The light intensity control apparatus of this embodiment executes the following APC operation to maintain a predetermined light intensity until the APC-RESET signal goes to TRUE level again. When the APC-START signal is received again, the rise operation is re-executed, and the APC operation is continued to maintain the predetermined light intensity.

When the APC-START signal goes to TRUE level, the CPU 1 is interrupted at its leading edge, and the control enters the APC-START routine shown in FIG. 3E.

In the APC-START routine, threshold data are stored in the D output data memory (step S500). One threshold data is "00H", and the other is a current value at which the laser begins to emit light, i.e., the data value of the threshold current Ith. More specifically, the threshold data is set to be "00H" after the power switch is turned on. However, if the Laser APC is executed once after the power switch is turned on, the threshold data is not "00H". That is, the rise operation of the Laser APC is started from the data value of the threshold current Ith. Note that a method of determining the data value of the threshold current Ith will be described later.

The R output data and the R hold data for the fine adjustment D/A converter are cleared, i.e., set to be "00H" (steps S501 and S502), and the UNBL-IN flag indicating whether or not an interrupt by the UNBL signal input later is made is reset (step S503). The FLAG-A flag is set to be "1" (step S504), and the TABLE-NO flag is set to be "01H" (step S505). The UNBL error timer is reset (step S506), and the flow returns to step S100 in the main routine.

(2-h) APC-TABLE Call

When the APC-START routine is called in this manner, the main routine shifts from the above-mentioned loop as follows.

The flow skips the APC-START routine (step S101) from step S100, and it is then determined that the FLAG-A flag is set (step S102). Thereafter, processing in step S103 and subsequent steps is executed. Since the UNBL signal is at TRUE level, the video signal is also at TRUE level, and the laser ON state is determined in step S103. Therefore, the flow advances to steps S104 to S106, and then returns to step S100. With this processing, since the FLAG-A flag is not reset until the laser emits light, as will be described later, the APC-TABLE routine is almost successively called for the main routine cycle to perform the rise operation of the Laser APC.

(2-i) APC-01 Routine

Figure 3G:
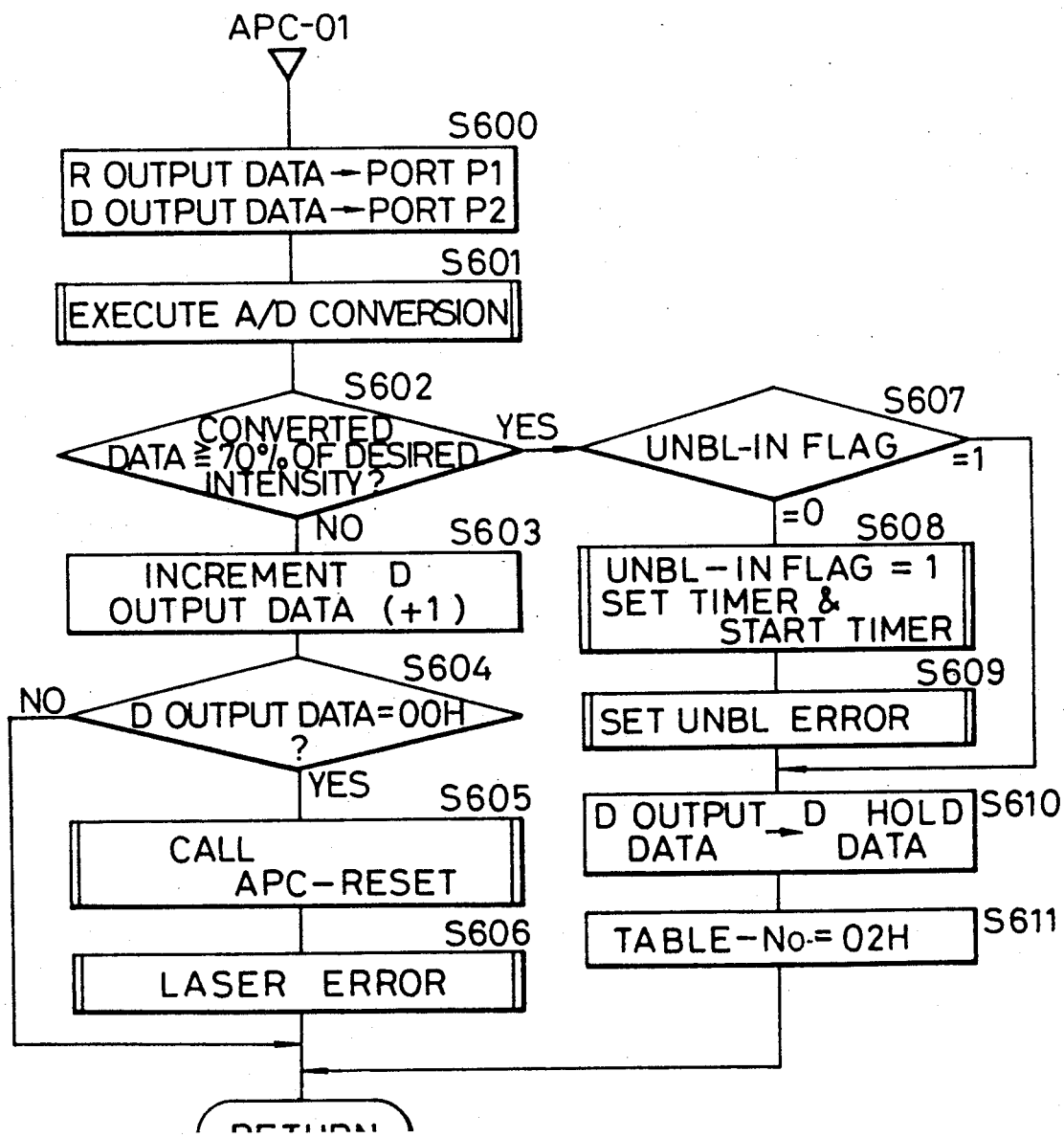
FIG. 3G is a flow chart showing an APC-01 routine in the detailed operation of the first embodiment.

The APC-TABLE indicates the APC-01 routine shown in FIG. 3G by the APC-START routine shown in FIG. 3E. In the APC-01 routine, a comparison calculation for only the D output data for the rough adjustment D/A converter 2 is executed.

In the APC-01 routine, since both the R hold data and R output data for the fine adjustment D/A converter 3 are set to be "00H", the laser drive current $i_L$ is determined by the output data value of the port P2 for the rough adjustment D/A converter 2. The method of raising the rough adjustment D/A converter 2 includes two methods depending on the content of the threshold value data set in step S500 in the APC-START routine.

A case will be described below wherein the threshold data is "00H".

When the APC-01 routine is called in step S106 in the main routine, the D output data is output to the the port P2 for the rough adjustment D/A converter 2, and the R output data, i.e., "00H" is output to the port P1 for the fine adjustment D/A converter 3 in step S600 laser light intensity determined by these data values is measured based on a feedback voltage from the light-receiving element (PIN photodiode PD) incorporated in the laser 8. More specifically, an analog voltage value from the light-receiving element is A/D-converted (step S601), and the A/D-converted value is compared with a reference value corresponding to 70% of a desired light intensity (step S602). If the measured value is smaller than 70%, the data value of the D output data memory is incremented (step S603), and it is then checked if the data value overflows (step S604). In steps S604 to S606, the laser drive current $i_L$ is checked to perform processing for determining whether or not a laser error (to be described later) occurs. Normally, however, no laser error occurs, and the flow returns from step S604. It can be determined that the A/D-converted value in step S601 is valid since the laser ON state is always set by the UNBL signal.

As described above, steps S600 to S604 are executed, the flow returns to the main routine, and this routine is called again from the main routine. Therefore, the rough adjustment D/A converter 2 is successively incremented by one step to almost successively rise the laser drive current $i_L$. With this processing, the laser beam is raised to a 70% value of the desired light intensity. In the APC-01 routine, since the laser beam is raised from 0% to 70%, a call timing varies depending on a timing at which the laser begins to emit light. That is, when the laser drive current $I_L$ is gradually increased by the APC-01 routine and then reaches the threshold current Ith at which the laser begins to emit light, the BD signal can be obtained, and the UNBL signal is changed from the level signal to a pulse signal accordingly. Therefore, the interrupt routine is called by the UNBL signal. When the interrupt routine is called, the flow advances to steps S300 and S301 in the first interrupt routine. Since the FLAG-A flag=1 in step S302, the flow then advances to steps S305 and S306. Since the UNBL-IN flag=0, the flow advances to step S307 to set FLAG-A=0, and the flow then returns to the main routine. In the main routine, it is determined in step S102 that the FLAG-A flag is "0", and the flow returns to step S100. More specifically, steps S100→S102→S100→. . . are repeated, and the APC-TABLE is not called in step S106.

When the control enters the second interrupt routine by the UNBL signal, the flow advances to steps S300, S301, and S302. Since FLAG-A=0, the flow advances to step S303 to set the UNBL-IN flag to be "1". In step S304, the APC-TABLE is called. The flow then advances to steps S305 and S306. Since UNBL-IN flag=1, the flow returns to the main routine.

Since the UNBL-IN flag is reset in only the APC-START routine, the FLAG-A flag is reset in step S307 in only the APC-START routine. Therefore, the FLAG-A flag is kept reset until the operation for raising the Laser APC is completed, and APC-TABLE call (step S304) is executed by the interrupt routine.

As described above, for a rise timing of the Laser APC, the laser drive current $i_L$ is almost successively raised before the laser emits light. After the laser emits light, the drive current is raised only when the UNBL signal is at TRUE level, i.e., indicates the non-drum region. Therefore, the APC raising operation is performed without radiating a laser beam on the photosensitive drum of the laser beam printer.

In this manner, when the laser begins to emit light, although a call timing of the APC-01 routine varies, the value of the rough adjustment D/A converter 2 is gradually incremented. Note that the fact that the UNBL signal is at TRUE level means that the laser ON state is set during this period. Therefore, in the UNBL interrupt, a feedback voltage from the light-receiving element can be obtained by only calling the APC-TABLE. Since the A/D conversion processing is completed within the TRUE period of the UNBL signal, the A/D-converted value can be determined as valid data without being checked.

When the laser beam exceeds the 70% value of the desired intensity (step S602), the flow advances to step S607, and processing for the UNBL error is executed (steps S607 to S609). Since no UNBL error occurs in the normal operation state, the UNBL error will be described later.

The D output data determined in the APC-01 routine is stored in the D hold data memory (step S610), and processing is executed to transfer the control to the APC-02 routine (step S611).

(2-j) APC-02 Routine

Figure 3H:
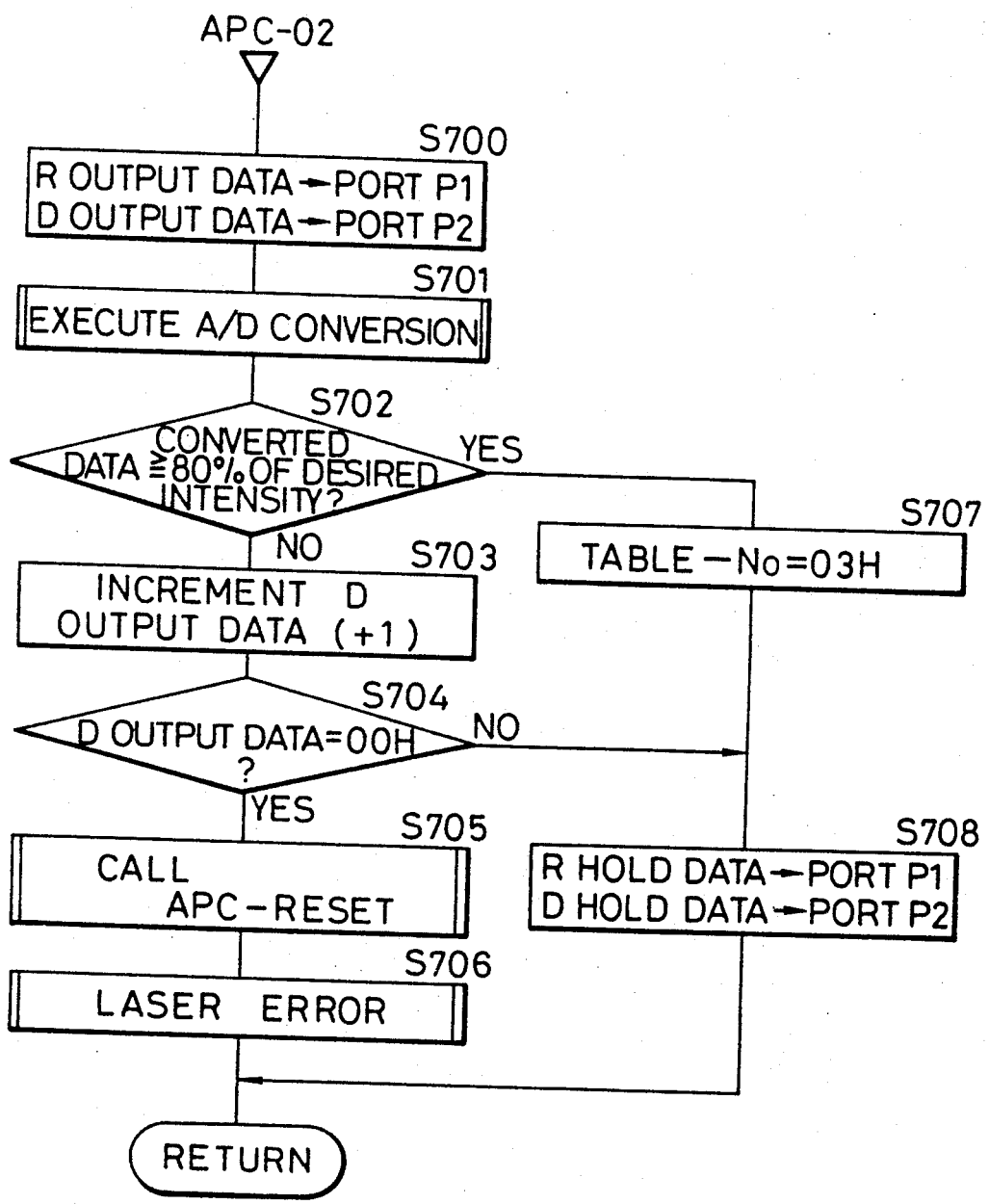
FIG. 3H is a flow chart showing an APC-02 routine in the detailed operation of the first embodiment.

When the control enters the APC-02 routine shown in FIG. 3H by the APC-TABLE call in the interrupt routine shown in FIG. 3C, the D output data and the R output data are respectively output from the ports P2 and P1 of the CPU 1 (step S700). In step S701 and subsequent steps, the same processing as in the APC-01 routine is performed. In this case, a comparison data value is a 80% value of the desired intensity of the laser beam. In the APC-01 routine, the flow returns while the data to the D/A converters are kept set to be the D output data and R output data. In the APC-02 routine, however, the flow returns after the output data are switched to the D hold data and the R hold data, respectively (step S708).

In the APC-02 routine, during the TRUE period of the UNBL signal in which this routine is called, the laser is caused to emit light based on the D output data, and a comparison calculation is executed, so that the laser beam intensity is increased to the 80% value of the desired light intensity. However, when the UNBL signal goes to FALSE level, and the laser scans the photosensitive drum, the laser can emit light based on the D hold data and the R hold data.

In this process, since the APC-RDY state is not established yet, the laser cannot emit light in a scan operation of the photosensitive drum region. However, if the laser emits light, the emitted laser beam corresponds to the 70% value of the desired intensity. Selection of the output data and the hold data will be described in data overflow/underflow processing (to be described later).

The rough adjustment D/A converter 2 is raised by one step on the basis of the D output data in every APC-02 routine call, and the laser drive current $i_L$ is increased over the 80% value of the desired intensity (step S702). Thereafter, processing is executed to transfer the control to the APC-03 routine (step S707).

(2-k) APC-03 Routine

In the APC-03 routine shown in FIG. 3I, comparison between the measured value and the 80% value (step S802), and a decrement calculation of the D output data (step S803) are executed. Other processing operations are the same as those in the APC-02 routine. More specifically, in the APC-03 routine, whether or not the D output data is smaller than the 80% value is checked in step S802 to converge the D output data which has exceeded the 80% value of the desired intensity in the APC-02 routine to a state as approximate as the 80% value of the desired intensity. If the D output data is equal to or larger than the 80% value, the D output data is decremented in step S803. In this manner, the D output data temporarily exceeds the 80% value, and then is decreased to be smaller than the 80% value. Therefore, the D output value is converged to a value which is as approximate as the 80% value and is slightly smaller than the 80% value (to be referred to as a 80% convergence value hereinafter).

In the APC-03 routine, the comparison calculation is executed on the basis of the D output data in the same manner as in the APC-02 routine, and the other light-emission value data is set to be the D hold data.

When the 80% convergence value is determined, the data value of the rough adjustment D/A converter 2 is determined, and processing for transferring the control to the APC-04 routine is performed (step S807). Note that the determined data value for the rough adjustment D/A converter 2 is merely stored in the D output data memory, and the D hold data is left unchanged. More specifically, when the raising operation is performed from the threshold data="00H", the D hold data is kept set to be the 70% value of the desired intensity.

(2-l) APC-04 Routine

Figure 3J:
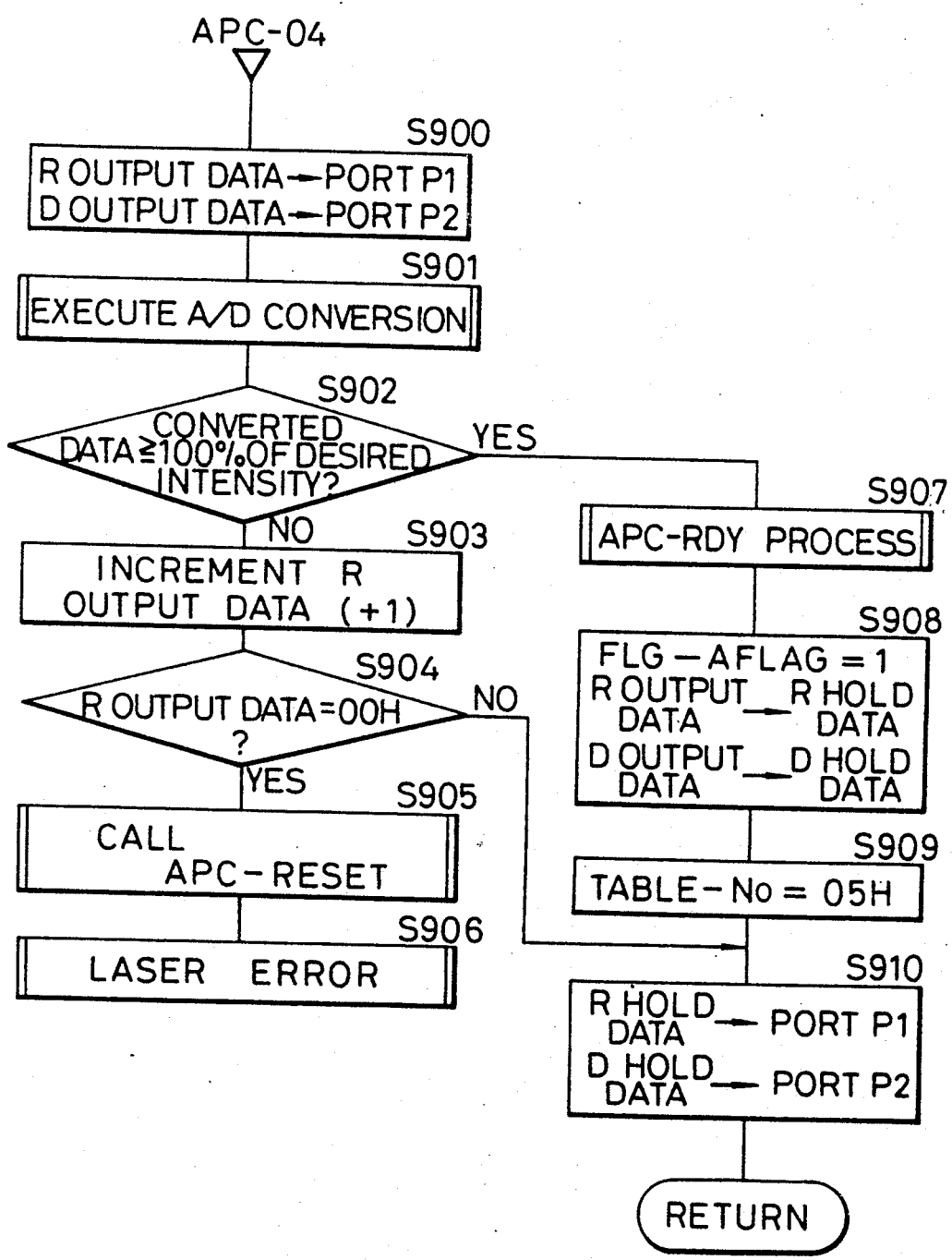
FIG. 3J is a flow chart showing an APC-04 routine in the detailed operation of the first embodiment.

When the control enters the APC-04 routine shown in FIG. 3J, the D output data and the R output data are respectively output to the ports P2 and P1 to determine the laser drive current $i_L$ (step S900). More specifically, the laser beam starts from the 80% convergence value of the desired intensity. In the APC-04 routine, the same processing as in the APC-02 routine is performed. However, a comparison of the measured value is made with a 100% value (=desired intensity) of the desired intensity (step S902), and a calculation for incrementing the R output data for the fine adjustment D/A converter 3 is performed (step S903). More specifically, the laser is raised on the basis of the D output data for the rough adjustment D/A converter 2 up to 80% of the desired intensity, and is raised on the basis of the R output data for the fine adjustment D/A converter up to 100%.

When the laser beam exceeds 100%, APC-RDY processing is executed (step S907). When the APC-RDY state is set, the printing operation is enabled, and the laser is turned on/off in accordance with image data. The FLAG-A flag is set to indicate that the operation for raising the Laser APC is completed, and the D output data and the R output data upon completion of the rise operation are copied (stored) in the D hold data and the R hold data, respectively, thus determining the data values (step S908).

In step S909, the control enters the APC-05 routine, and the data value for the fine adjustment D/A converter 3 is controlled to obtain a 100% convergence value. In the APC-04 routine, when the flow returns, the fine adjustment D/A converter 3 is controlled by the R hold data, and the rough adjustment D/A converter 2 is controlled by the D hold data.

The method of raising the Laser APC from when the D output data in the APC-START routine is "00H" (i.e., when the laser drive current $i_L$ is 0 mA) has been described.

(2-m) Rise from Threshold Current Ith

A method of raising the Laser APC when the data value starts from the threshold current Ith in the APC-START routine will be described below. The operations of each routine are the same as those described above, and a description thereof will be omitted.

When the APC-01 routine starts from the threshold current Ith by the APC-START routine, the APC-01 routine is called by the first main routine after the APC-START routine. In step S600, the D output data is output to the port P2 for the rough adjustment D/A converter 2, thus immediately emitting the laser 8. The BD signal is generated, and the UNBL signal is changed from the level signal to the pulse signal. Therefore, the laser is emitted from the beginning of the operation for raising the Laser APC, and at the same time, the control is switched from the APC-TABLE call from the main routine to the APC-TABLE call by the interrupt routine by the UNBL signal (S304). That is, the laser drive current $i_L$ which is gradually raised until the laser emits light in the APC-01 routine is immediately raised, and a time can be shortened accordingly.

The method of raising the Laser APC of this embodiment has been described. In this embodiment, the operation for raising the Laser APC is performed up to the 100% value of the desired intensity. However, the present invention is not particularly limited to this. In order to increase the rise speed of the Laser APC, the method of raising Laser APC from the threshold current Ith has been described. However, the raising operation can be started from any percentage of the desired intensity. The rough and fine adjustment data are incremented/decremented by one step, but may be incremented/decremented by several steps.

According to this embodiment, when the Laser APC is raised, the laser drive current $i_L$ is almost successively raised before the laser emits light. When the drive current reaches the threshold current Ith and the laser 8 begins to emit light, the raising operation is performed only when the UNBL signal corresponding to the non-drum region is at TRUE level. Therefore, the laser intensity can be raised to a desired value without radiating a laser beam on the photosensitive drum in the laser beam printer.

A laser beam is radiated for a total of several lines due to an error of a maximum of one line or a variation of a BD signal generator from when the laser drive current $i_L$ has reached the threshold current Ith until the control is switched to the interrupt routine based on the UNBL signal. Since the laser is radiated at a laser intensity near the threshold value, no toner becomes attached to the photosensitive drum at the small light intensity. Therefore, there is no problem.

(2-n) UNBL Error Processing

In the method of raising the Laser APC of this embodiment, the UNBL signal is indispensable. However, as described above, the UNBL signal is closely related to the BD signal. Thus, the UNBL signal is not generated due to various factors such as the BD signal generator, the laser, the optical system, and mounting positions, and the like, or is stopped after it is generated once. Therefore, in this embodiment, the following error processing is executed for such a UNBL error.

A UNBL error occurring when the UNBL signal is not input as a normal pulse will be described below.

The cause of this UNBL error can be classified into two cases, i.e., a case wherein the laser cannot perform emission, and a case wherein other causes are present. The former case will be described in a description of a laser life (to be described later). Thus, the latter case wherein the UNBL signal cannot become a normal pulse signal although the laser emits light will be described below.

As described above, in this embodiment, checking is made when the laser beam reaches 70% of the desired intensity (steps S607 to S609 in FIG. 3G). More specifically, the laser itself emits insufficient light although the laser drive current $i_L$ is raised in the APC-01 routine, a laser emission error (to be referred to as a laser error hereinafter) is determined in steps S604 to S606. In contrast to this, if it is determined in step S602 that the laser beam reaches 70% of the desired light intensity, the UNBL-IN flag is checked in step S607. This flag is set to "0" in the APC-START routine, as described above, and is set after it has been checked twice or more in the interrupt routine. More specifically, if NO UNBL signal is generated after the laser beam reaches 70% of the desired intensity, it can be determined that the UNBL signal itself is not a normal pulse although laser emission is made. Therefore, if it is determined in step S607 that the UNBL-IN flag is "0", the flow advances to steps S608 and S609 as the UNBL error. In step S608, the UNBL-IN flag is set, and data corresponding to a predetermined period of time is set in the timer for the UNBL error processing to start the timer. In step S609, data indicating that the UNBL error has occurred is stored.

Since the UNBL error processing after processing in step S608 is the same as that when an interrupt by the UNBL signal is no longer made, a description thereof is omitted here.

In step S609, only the data indicating that the UNBL error has occurred is stored. However, the laser APC operation may be interrupted. In the laser beam printer, even if a synchronization error occurs and is detected for a predetermined period of time like a BD error, the apparatus is then restored, and the BD error is automatically canceled without determining the BD failure. In this embodiment, the UNBL error processing, which can continue the Laser APC operation without interrupting it, is performed. Note that the decision reference of the UNBL error is set to be the 70% value of the desired intensity. However, the present invention is not limited to this. Any value may be set as long as whether or not the UNBL signal is a pulse input can be checked although it is determined that the laser emits light.

UNBL error processing when the UNBL signal is returned to the level signal and an interrupt cannot be made by the UNBL signal like in the BD error although the UNBL signal is the pulse input will be described below.

In this UNBL error, since the interrupt routine by the UNBL signal has already been executed, setting of the UNBL-IN flag and setting and starting of the timer have already been executed in step S608. Therefore, an interrupt is made by the timer even if the interrupt routine is not executed by the UNBL signal. Furthermore, after the UNBL signal is restored, the timer is reset in step S300. Therefore, the timer interrupt is stopped, and the apparatus can be automatically restored. Since the timer is set and started in step S305 in the interrupt routine, the next interrupt is made when the timer is time-up or by the UNBL signal. Therefore, the setup time of the timer must be longer than at least the period of the UNBL signal. That is, if the setup time is shorter than the period of the UNBL signal, the raising operation on the non-drum region cannot be performed. Therefore, when the UNBL signal is a normal pulse signal, the interrupt routine must be called by the UNBL signal.

As described above, even when the UNBL error occurs, the interrupt routine can be called by the timer in place of the UNBL signal. and the Laser APC operation will not be interrupted due to the UNBL error. Note that the UNBL timer processing uses the timer. However, the present invention is not limited to the timer if the same function as the timer of this embodiment can be provided.

Processing for the UNBL error occurring during the rise operation of the Laser APC has been described.

Processing for a UNBL error occurring after the Laser APC is raised and the APC-RDY state is established will be described below.

When the APC-RDY state is established and the FLAG-A flag is set, the APC-TABLE is called not in step S304 in the interrupt routine shown in FIG. 3C but in step S106 in the main routine. More specifically, when the UNBL error occurs, the UNBL signal is changed to a level signal, and the laser ON state continues over the predetermined period of time t. Thus, it is determined that processed data of the Laser APC is valid. Therefore, since the FLAG-A flag is set after the rise operation for raising the Laser APC, if the UNBL error occurs, the APC-TABLE is successively called in step S106 in the main routine, so that the laser light intensity is always corrected. As will be described in detail later, the FLAG-A flag may be reset after the raising operation of the Laser APC. In this case, the APC-TABLE is called by the processing using the timer or the like in the same manner as for the UNBL error during the operation for raising the Laser APC, thus correcting the laser light intensity.

A laser error occurring when a laser used is degraded due to its life and a laser beam cannot be raised to a desired intensity or when the laser itself is damaged and no laser beam cannot be emitted will be described below. In this case, it is uniquely determined that the laser is dead, and the Laser APC operation is interrupted to set the APC-RESET state.

Laser error processing will be described below.

The laser error is determined when the desired intensity cannot be obtained by the D/A converters 2 and 3 and data values overflow. More specifically, for the rough adjustment D/A converter 2, when its data overflows, the laser drive current $i_L$ becomes about 127 mA. Therefore, in each of the APC-01 to APC-03 routines in which calculations are made by the rough adjustment D/A converter 2, an overflow/underflow is checked to determine the laser life (step S604, S704, or S804). If the end of laser life is determined, the APC-RESET routine is called, and the Laser APC operation is interrupted. In addition, the laser drive current $i_L$ is cleared to 0 mA. For the fine adjustment D/A converter 3, checking is made in step S904 in the APC-04 routine. If the laser error is determined, the same processing as for the rough D/A converter is performed. For the fine adjustment D/A converter 3, no error checking is made in the APC-05 routine after the operation for raising the Laser APC is completed. Since the laser is used for a long period of time, the laser intensity is decreased due to heat characteristics. Therefore, the decrease in intensity must be adjusted by the fine adjustment D/A converter 3. In this case, data may overflow or underflow. However, such an overflow/underflow is not caused by an adjustment error of the laser light intensity. Note that this processing will be described later.

In the APC-04 routine, even if the laser is in the worst state, the raising operation must be performed by the fine adjustment D/A converter 3 from the 80% convergence value to the desired intensity without an overflow, as can be seen from the following equation. Therefore, detection of a laser error is performed.

$$(4.5 \text{ mW} \times 20\%)/0.1 \text{ mW/mA} = 9 \text{ mA}$$

$$9 \text{ mA}/0.05 \text{ mA/step} = 180 \ (= \text{B4H}) \text{ steps}$$

The numerical values in the above equation will be described in the following laser life warning processing.

(2-o) Laser Life Warning

The laser life warning processing will be described below.

When the laser is dead, the APC operation is interrupted regardless of the state of the laser beam printer. Thus, the end of laser life is warned before interruption, thus preventing a serious trouble.

In this embodiment, the apparatus has a memory (threshold data memory) for storing a data value of a current (threshold current Ith) at which the laser begins to emit light. This memory stores the data value of the rough adjustment D/A converter 2 when the laser begins to emit light. Thereafter, the rough adjustment D/A converter 2 determines the 80% convergence value. The data value in the threshold data memory is decreased from the data value (80% convergence value of the D output data memory after the FLAG-A flag indicating that the desired intensity is reached is set. Thus, whether or not laser life warning is made is determined on the basis of the difference.

Steps S308 to S312 in the interrupt routine shown in FIG. 3C is a laser life warning sequence.

When the power switch is turned on, the RAM including the threshold data memory is cleared to "00H" by the predetermined initialization processing.

When the first Laser APC after power-on is executed and when the UNBL signal is kept at TRUE level, the interrupt routine is executed once. The flow advances from step S301 to step S308. In this process, since the D output data is "00H", the flow advances from step S309 to step S302 while no processing is essentially made. When the operation for raising the Laser APC starts, the laser then begins to emit light, and the interrupt routine is called by the UNBL signal again. The flow then advances from step S301 to step S308, and the data value of the D output data memory when the laser begins to emit light (data value of the threshold current Ith of the laser) is stored in the threshold data memory, and is latched until the power switch is turned off. In this embodiment, the data value of the laser threshold current Ith which is obtained first is stored in the threshold data memory. Note that when the UNBL error or laser error occurs, the threshold data memory may be cleared to "00H". Data immediately after power-on need not always be stored.

If the threshold data is determined in step S308, the FLAG-A flag indicating completion of the operation for raising the Laser APC is checked (step S309). Note that the flow advances to step S302 until the FLAG-A flag is set. If the FLAG-A flag is set, the flow advances from step S309 to step S310, and a calculation for life warning is executed. In this calculation, the content of the threshold data is subtracted from the content of the D output data. More specifically, when the FLAG-A flag is set, the D output data corresponds to the 80% convergence value. Thus, a calculation of (80% convergence value) — (threshold current) is made. It is, then checked in step S311 if the difference current data value exceeds a warning data value. As a result, whether or not life warning processing for displaying a laser life warning message or the like is executed is determined in step S312, and the flow then returns to step S302. The laser life determination is executed as long as the UNBL signal is generated after the Laser APC is raised. Therefore, the determination result can be obtained based on the latest 80% convergence value. Even if the laser is gradually degraded, its life can always be detected.

A method of setting a difference current value determined as the laser life will be described below.

Figure 5:
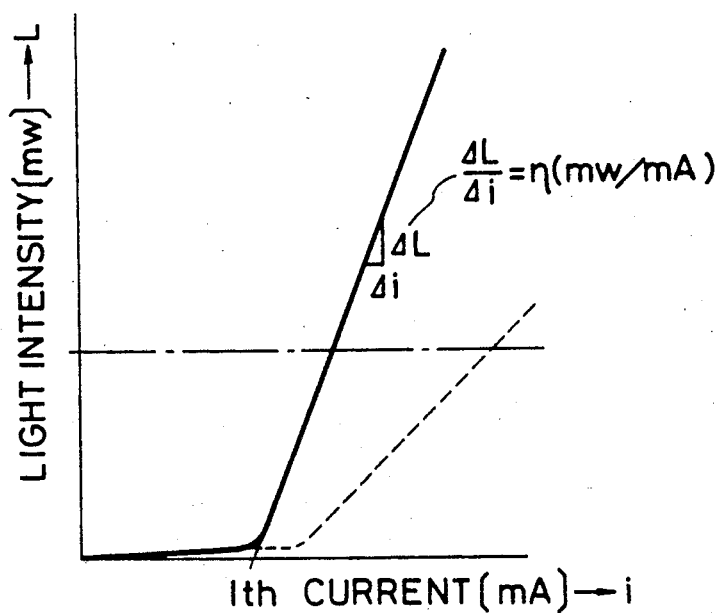
FIG. 5 is a graph showing i-L characteristics of a conventional laser.

FIG. 5 is a graph showing characteristics of a semiconductor laser.

In general, the semiconductor laser has current-intensity characteristics (to be referred to as an I-L curve hereinafter), as indicated by a solid curve in FIG. 5. A current value at which the laser begins to emit light (threshold current Ith) is about 20 to 60 mA, and a slope efficiency $\eta$ corresponds to a ratio of the laser light intensity to a current (the inclination of the i-L curve), i.e., about 0.1 to 0.6 mW/mA.

Normally, the threshold current Ith is about 40 mA, and the slope efficiency $\eta$ varies around 0.3 mW/mA. When the laser suffers from degradation, the i-L curve changes as indicated by a dotted curve in FIG. 5, so that the threshold current Ith is increased, and the slope efficiency $\eta$ is decreased. That is, in order to obtain an identical light intensity, a more current must be supplied. The laser state is gradually degraded, and a predetermined light intensity is no longer obtained. Finally, no light can be emitted.

In this embodiment, therefore, when the slope efficiency $\eta$ is decreased below a predetermined value, life warning is determined. This value is calculated as follows:

(A) Taking desired intensity-heat characteristics of 10% of the laser into consideration, a maximum intensity with respect to the rated value of 5 mW is:

$$5 \text{ mW} \times 0.9 = 4.5 \text{ mW}$$

(B) A calculation is made on the basis of the 80% convergence value and the threshold current. Therefore, the maximum value of the 80% convergence value is:

$$4.5 \text{ mW} \times 0.8 = 3.6 \text{ mW}$$

(C) Based on the minimum value of the slope efficiency, a maximum upper limit of the difference current larger than the threshold current up to the 80% convergence value is:

$$3.6 \text{ mW}/0.1 \text{ mW/mA} = 36 \text{ mA}$$

(D) When the maximum value is converted to the data value for the rough adjustment D/A converter, the data value is calculated as follows to have 0.5 mA/step:

$$36 \text{ mA}/0.5 \text{ mA/step} = 72 \ (= \text{48H}) \text{ steps}$$

Therefore, the difference current value determined in this program is 36 mA or more, and a setup value of the data value level of the rough adjustment D/A converter is 48H or more. That is, if a result of calculations of (A), (B), and (C) yields 48H or more, it is determined in (A), (B), and (D) that the laser life warning is necessary. Note that the life warning setup value may be added with a margin, e.g., 50H or 60H. That is, since processing need only be made with reference to 48H as the measure of life warning, the setup value is not particularly limited.

For maximum slope efficiency, the setup value is:

(3.6 mW/0.6 mW/mA)/0.5 mA/step = 12 (=0CH) steps

However, as the degradation state progresses, a value at the slope efficiency of 0.1 mW/mA is decreased. Therefore, the setup value need not be changed in correspondence with lasers. Of course, the setup value may be changed in correspondence with lasers.

Even if it is determined that the life warning is necessary, only the slope efficiency is decreased, and this determination does not directly lead to a phenomenon that the desired intensity cannot be obtained. However, since degradation is gradually accelerated, when the laser is exchanged upon life warning, a trouble caused by laser failure can be avoided.

In this embodiment, life warning data is obtained based on the difference current between the 80% convergence value and the threshold current. However, the difference current may be obtained from any reference point.

The above-mentioned UNBL error, laser error, and laser life warning processing are continuously performed in the subsequent Laser APC operation.

(2-p) Operation After APC-RDY

The Laser APC operation after APC-RDY will be described below.

As described above, when the desired intensity is reached in the APC-04 routine and the APC-RDY state is established, the control enters the APC-05 routine. In the APC-05 routine, the data value of the fine adjustment D/A converter 3 is incremented/decremented in accordance with a variation in the laser (this adjusted value will be referred to as a 100% convergence value hereinafter). More specifically, in the APC-05 routine, in order to maintain the desired intensity, the fine adjustment data value is corrected to obtain the 100% convergence value. When an image signal continues over the predetermined period of time t or when the UNBL signal is at TRUE level, the APC-TABLE is called to execute correction of the 100% convergence value. Therefore, the laser need not be intentionally turned on upon execution of the Laser APC.

When the fine adjustment D/A converter 3 executes comparison calculation to maintain the 100% convergence value, if a long-term Laser APC is executed, the i-L curve drifts due to the heat dissipation of the laser itself, and the laser light intensity is gradually decreased. As a result, the laser drive current $i_L$ is increased. When a decrease in light intensity due to the heat dissipation from the laser itself becomes as large as 20% or 30%, the decrease cannot be compensated by only the fine adjustment D/A converter 3. In this case, re-correction including the rough adjustment D/A converter 2 must be performed.

(2-q) Overflow/Underflow Processing

Prior to a description of the APC-05 routine, correction processing including the rough adjustment D/A converter 2 when the data value of the fine adjustment D/A converter 3 overflows or underflows will be described. This processing will be referred to as overflow-/underflow processing of the fine adjustment D/A converter 3 hereinafter.

In the APC-05 routine, the R output data is subjected to comparison calculation. Upon termination of the APC-05 routine, the R hold data is output to the fine adjustment D/A converter 3. After the comparison calculation, whether or not the R output data is stored as the R hold data is determined. After the comparison calculation, it is checked if the data value of the R output data is "00H" to determine whether or not the overflow/underflow processing is executed.

If it is determined that the overflow/underflow processing need not be executed, the APC-05 routine is kept executed. However, if it is determined that the overflow/underflow processing must be executed, the FLAG-A flag is reset to "0", and the TABLE-NO flag is set to be "02H" to select the APC-02 routine. The control then enters this routine. In this case, the data value of the rough adjustment D/A converter 2 is the 80% convergence value stored in the APC-04 routine, and the data value of the fine adjustment D/A converter 3 is the R hold data before overflow/underflow caused by the R output data. Note that since the R output data is determined as a result of calculations, it is "00H". Since the R hold data indicates a state before calculations of the R output data, it must be "FFH" or "01H".

The overflow/underflow processing will be described below while explaining the method of using these R output data, R hold data, D output data, and D hold data.

In the APC-START routine, the R output data and D output data are cleared to "00H". The D hold data is left unchanged, and the threshold data is loaded in the D output data memory.

In the APC-01 routine, the data value of the rough adjustment D/A converter 2 is raised on the basis of only the D output data almost successively before the laser 8 emits light, and for the UNBL signal cycle and during the TRUE period of the UNBL signal after the laser 8 begins to emit light. On the other hand, although the R output data, R hold data, and D hold data are left unchanged, when the control advances from the APC-01 routine to the APC-02 routine, the data value in the D output data memory is loaded in the D hold data memory in the APC-01 routine. Therefore, the R output data = R hold data = 00H, and D output data = D hold data = 70% value data of the desired intensity.

During execution of the APC-02 routine, the laser emits light in accordance with the laser drive current $i_L$ determined by the R output data and the D output data, and the measured value is compared. The APC-02 routine is executed during the TRUE period of the UNBL signal while incrementing the D output data until the 80% value of the desired intensity is obtained. Upon termination of execution of the APC-02 routine, the laser drive current $i_L$ is switched to one determined by the R hold data and the D hold data. More specifically, the laser emits a raster-scan laser beam in accordance with the laser drive current $i_L$ determined by the R hold data and the D hold data in the drum region, and in accordance with the laser drive current $i_L$ determined by the R output data and the D output data during the TRUE period of the UNBL signal other than the drum region. In the APC-02 routine, any processing is performed for neither the R hold data nor the D hold data to maintain a state wherein the control enters the APC-02 routine.

When the condition in the APC-02 routine is satisfied, the control enters the APC-03 routine. In the APC-03 routine, substantially the same operation as in the APC-02 routine is executed except for the data value condition of the D output data.

In the next APC-04 routine, the APC-04 routine is executed during the TRUE period of the UNBL signal, and the laser light intensity for the drum region is determined on the basis of the R hold data and D hold data. During execution of the APC-04 routine, the laser emits light on the basis of the R output data and D output data, and its light intensity is raised to the desired intensity while incrementing the R output data. When the condition in the APC-04 routine is satisfied, the control then enters the APC-05 routine. In this case, the data value of the D output data memory is loaded in the D hold data memory, and the data value of the R output data memory is loaded in the R hold data memory. Therefore, while the APC-02 to APC-04 routines are called by the APC-TABLE, the laser light intensity on the drum region is updated upon completion of the APC-04 routine.

Therefore, when overflow/underflow occurs in the APC-05 routine, the data values immediately before overflow/underflow occurs are stored in the R and D hold data memories. The control returns to the APC-02 routine, and the laser light intensity is set again. However, in the APC-02 to APC-04 routines, the R and D hold data are left unchanged, and the light intensity is raised to the desired intensity based on only the D and R output data. When the raising operation is completed, the D and R hold data are updated, and the control enters the APC-05 routine, so that correction for protecting the 100% convergence value is executed.

Since the FLAG-A flag is reset to "0" during the overflow/underflow processing, the APC-TABLE is called by the interrupt routine. The operation for raising the laser light intensity again in the APC-02 to APC-04 routines is executed during only the TRUE period of the UNBL signal. Upon completion of the re-raising operation, when the FLAG-A flag is set to "1" In the APC-04 routine, the APC-TABLE is called again by the main routine.

In the APC-05 routine, when the data value overflows/underflows and can no longer be corrected during execution of correction of the 100% convergence value by the fine adjustment D/A converter 3, the final data value before overflow/underflow is latched for the drum region (image printing region) during the raster scan period of the laser beam. Before the laser light intensity rises again, the laser is allowed to emit light by the laser drive current $i_L$ determined by the latched data values (R and D hold data), thus enabling printing. In the non-drum region during the raster scan period of the laser beam (the TRUE period of the UNBL signal), data values corresponding to the 80% convergence value or the desired intensity are set again, thus re-rising the laser light intensity. More specifically, when the fine adjustment data overflows/underflows, the previously determined 80% convergence value data is already offset from the actual 80% value of the desired intensity. Therefore, the 80% convergence value is set again, so that correction of the 100% convergence value is allowed.

When the overflow/underflow processing is executed in this manner, even if the correction of the 100% convergence value by the fine adjustment D/A converter 3 is disabled, re-setting operation can be performed on a non-printing region (non-drum region) without interrupting the printing operation. In the Laser APC of this embodiment, therefore, since light intensity control for the 100% convergence value is available semipermanently, i.e., until the laser is dead, a predetermined light intensity on the printing region can be continuously maintained.

A drift of the laser intensity latched and output during re-setting occurs for a very short period of time, and poses no problem. Since the raising operation is started from almost 80% of the desired intensity, the intensity can be set by several steps by the rough adjustment D/A converter, and the operation for raising the remaining 20% light intensity can be completed by at most 180 steps by the fine adjustment D/A converter 3. Thus, the raising operation can be completed by a total of 200 steps or less. Since the light intensity is incremented by one step per UNBL signal (per line), the raising operation can be completed by 200 lines.

Therefore, for a laser beam printer having a resolution of 240 dpi, the raising operation can be completed by about 20 mm. A time required for this operation is within 1 sec even in a low-speed laser beam printer. Therefore, the influence of a thermal drift need not be considered.

(2-r) APC-05 Routine

Figure 3K:
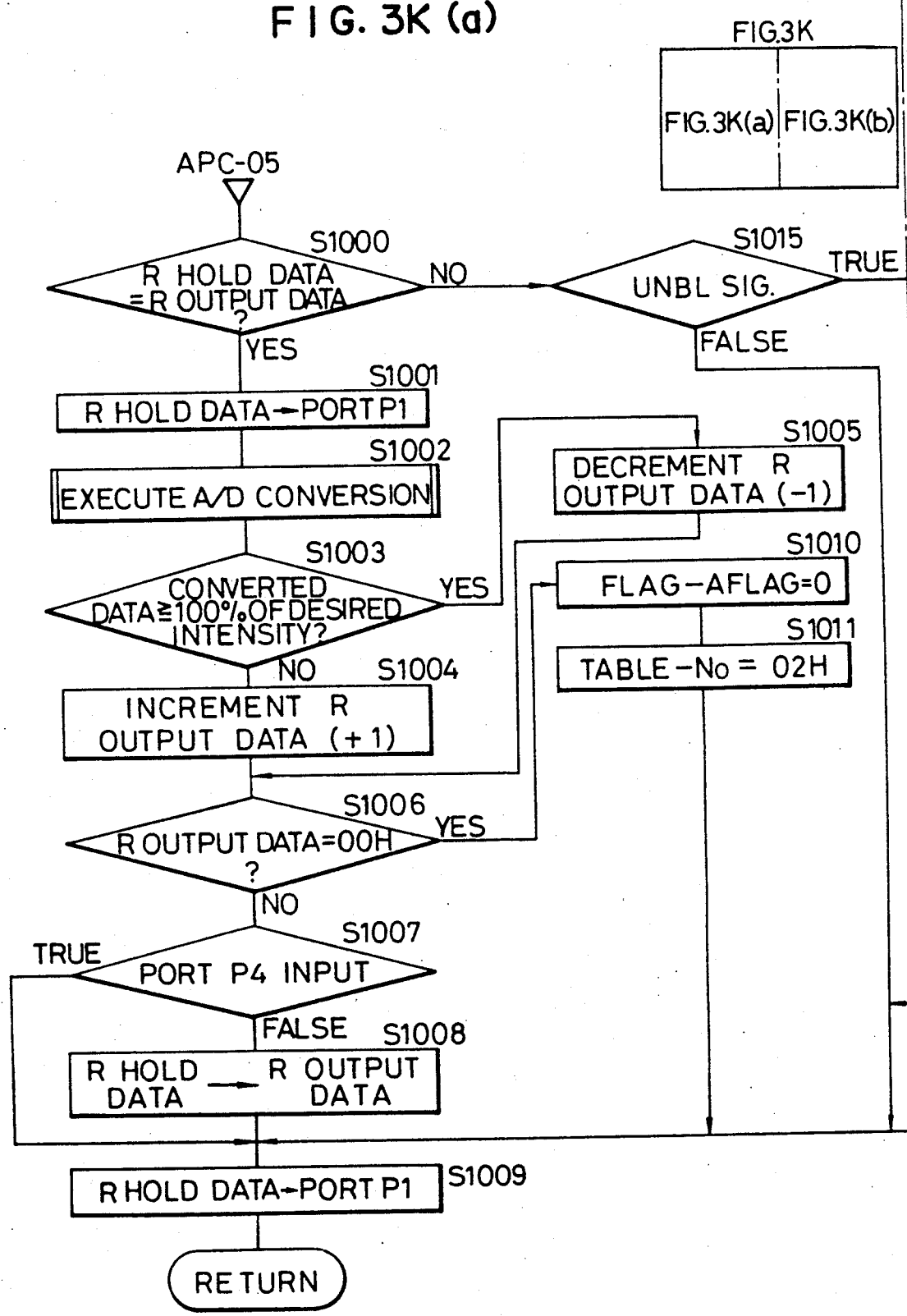
FIGS. 3K(a) and 3K(b) are a flow chart showing an APC-05 routine in the detailed operation of the first embodiment.
Figure 3K:
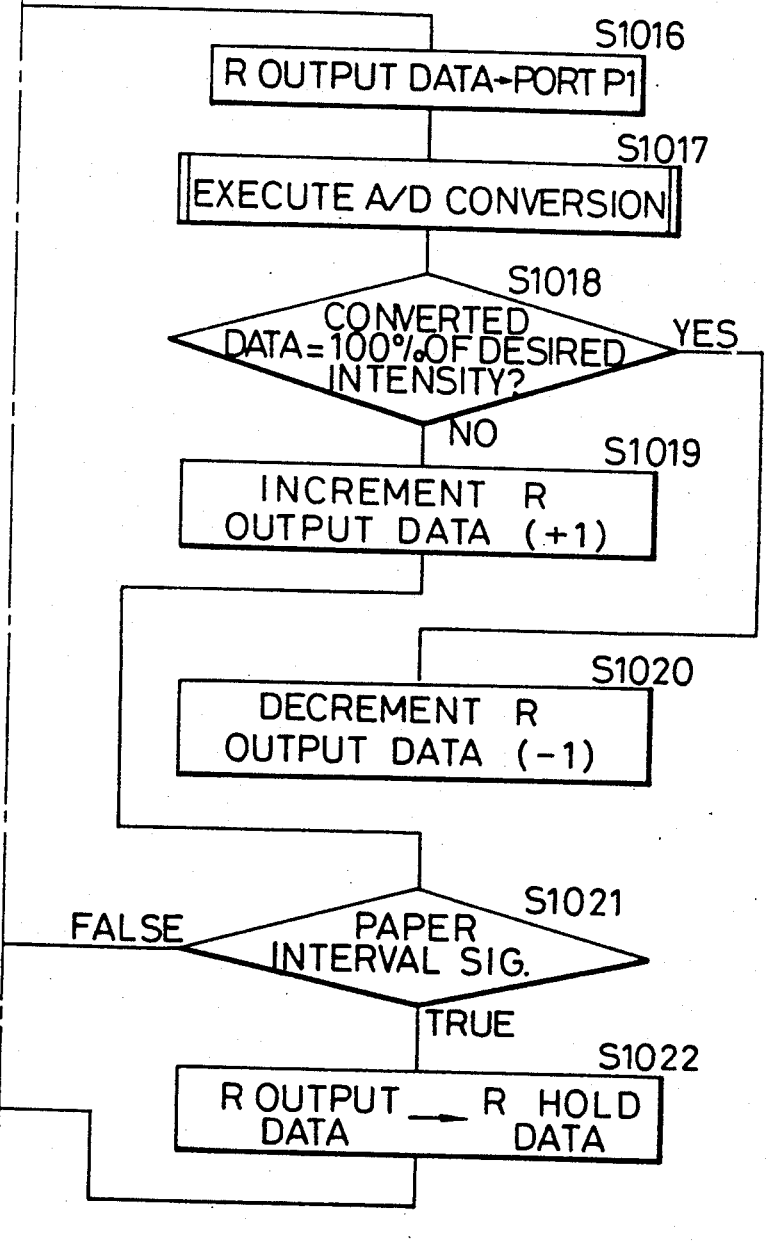

The APC-05 routine will now be described with reference to FIG. 3K.

When the APC-05 routine is designated by the APC-TABLE call, the R output data and R hold data are compared with each other (step S1000). If these data are equal to each other, the flow advances to step S1001 since no comparison calculation is required.

The D hold data (80% convergence value) is output to the port P2 as the data output to the rough adjustment D/A converter 2 in the APC-04 routine. In the APC-05 routine, the D hold data and D output data for the rough adjustment D/A converter 2 are left unchanged.

The R hold data is output to the fine adjustment D/A converter 3, so that a feedback voltage obtained when the laser is turned on in accordance with the laser drive current $i_L$ determined by the D hold data and the R output data is A/D-converted (step S1002). The A/D-converted data is compared with the desired intensity data (step S1003). As a result, if the A/D-converted data is smaller than the 100% value, the R output data is incremented (step S1004); otherwise, the R output data is decremented (step S1005). Then, an overflow/underflow is checked in accordance with the calculation result (step S1006). If the calculation result is "00H", the FLAG-A flag is reset (step S1010), and the flag is set to transfer the control to the APC-02 routine (step S1011). The R hold data is output to the port P1 output for the fine adjustment D/A converter 3 (step S1009), and the flow returns to the main routine. Thus, the overflow/underflow processing is started to be executed from the next APC-TABLE call, as described above. If it is determined in step S1006 that the calculation result is not "00H", the flow advances to step S1007, and the port P4 input is checked to determine whether or not the laser ON state continues from when the control enters this APC-05 routine until the present time, thus judging validity/invalidity of the comparison calculation. If it is determined that the calculation result is invalid, the R hold data is loaded in the R output data memory, and the R output data result is canceled (step S1008). The flow then advances to step S1009. On the other hand, if it is determined that the comparison calculation result is valid, the flow advances to step S1009 while the comparison calculation result of the R output data remains the same, and the R hold data is determined as the data value for the fine adjustment D/A converter 3. The flow then returns to the main routine.

Meanwhile, if it is determined in step S1000 that the R output data is not equal to the R hold data, since there is a comparison calculation data (R output data) result which is not updated yet, the flow advances to step S1015, and a loop of step S1000→S1015→S1009→ return is executed to wait for inputting of the UNBL signal. Note that when the laser ON state does not continue over the predetermined period of time t in a 1-line image (when the comparison calculation data is invalid), the next UNBL signal must be waited since the comparison calculation is made on the basis of the UNBL signal (step S1015). When the UNBL signal is input, the flow advances to step S1000→S1015→S1016. In step S1016, the R output data storing the comparison calculation data is output to the port P1, and a laser light intensity determined by the D hold data and the R output data is A/D-converted to obtain a measurement value (step S1017). The measurement value is compared with the desired intensity (step S1018). If the measurement value is equal to or larger than the desired intensity, the R output data is decremented (step S1020), and the flow advances to step S1021. If the measurement value is smaller than the desired intensity, the R output data is incremented (step S1019), and the flow advances to step S1021). In step S1021, the paper interval signal is checked. If the paper interval signal is at FALSE level, the R hold data is output to the fine adjustment D/A converter 3 (step S1009), and the flow returns to the main routine. If the paper interval signal is at TRUE level, the flow advances to step S1022, and the R output data as a result of the comparison calculation is updated to the R hold data (step S1009), and the flow then returns to the main routine.

Even in the paper interval, since no image signal is input but the UNBL signal is input several times, the comparison calculation is repeated for every UNBL signal to have the data value stored and calculated in a paper region (to be referred to as accumulation data hereinafter) as a starting point immediately after the paper interval starts. As a result, convergence to the 100% convergence value further progresses. When the paper interval ends, the data value at that time is latched. The R output data is compared and calculated, and the calculation result is stored until the next paper interval.

As described above, in this embodiment, the comparison calculation is performed using the R output data in a line where an image signal is valid, and the calculation result is stored. Data temporarily stored in the paper interval in which the image signal is invalid is updated, and is corrected based on the UNBL signal until the paper interval ends, thus determining the 100% convergence value.

Figure 6:
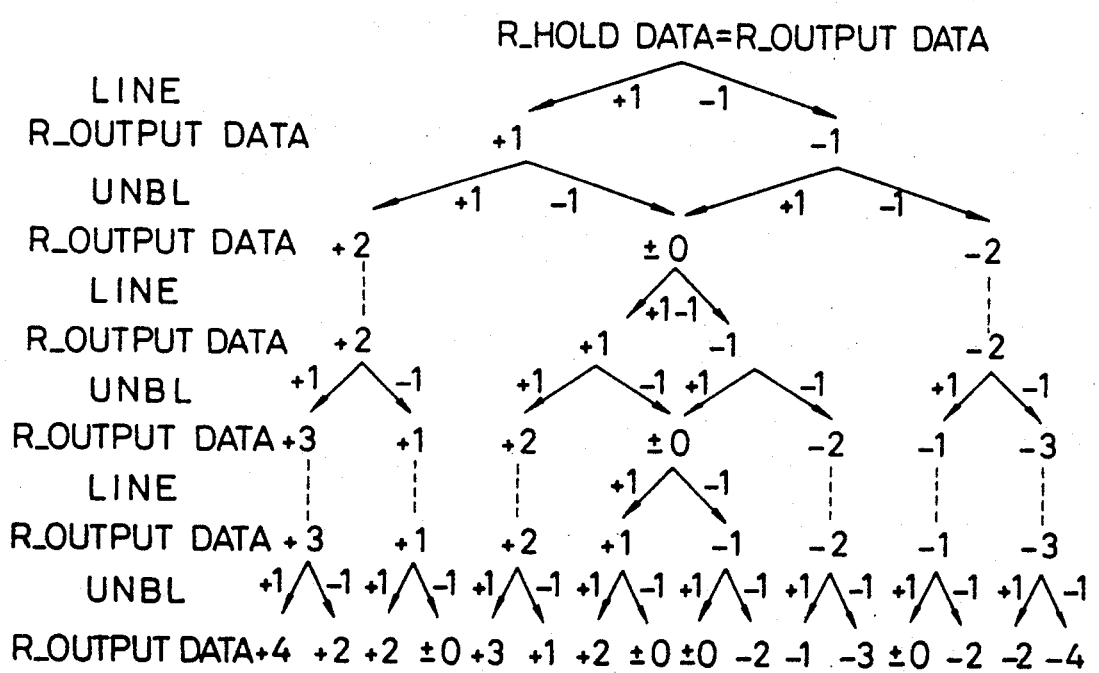
FIG. 6 is a transistion chart of data values stored by comparison calculations in a line where an image signal is made valid.

FIG. 6 shows transition of the data value stored by the comparison calculation in a line where an image signal is valid. If a laser beam does not so drift, the R output data repeatedly becomes ±0, +1, −1, +2, −2, ... as shown in the central portion of FIG. 6, and the paper interval then starts. When the laser beam begins to decrease, the R output data becomes a value corresponding to the decrease in laser beam. More specifically, the R output data becomes a value corresponding to the decrease in laser beam (i.e., +4, +3, +2, ...), as shown in the left end portion of FIG. 6. When a drift is eliminated or the laser beam is returned to the desired value, the R output data becomes ±0. When the laser beam begins to increase, the R output data becomes a value corresponding to an increase in laser beam (−4, −3, −2, ...). If the laser beam is restored, the R output data is often returned to ±0. However, a normal laser beam suffers from only a variation in light intensity caused by a thermal drift, and only a small decrease in light intensity is experienced in page printing. Therefore, in the paper interval, the R output data is converted to a value of about +2 to 3.

The Laser APC according to the present invention has been described. The laser APC need not be intentionally executed. That is, the Laser APC can be executed in response to the UNBL signal in the non-drum region or by the laser ON state in response to an image write signal in the drum region, so that a light intensity can be stabilized. In order to raise the light intensity to the desired intensity in response to the UNBL signal and to maintain the desired intensity, the laser is caused to emit light based on the data to be updated (R output data), comparison and measurement are performed, data is incremented/decremented in accordance with the comparison and measurement results, and the data value is stacked and stored. The data is updated during the TRUE period of the UNBL signal in an image printing invalid line (paper interval), and the data is kept updated by the UNBL signal until the paper interval ends.

A laser light intensity upon image printing based on an image signal is determined for every paper interval, and is latched until the next paper interval. This control is repeated, so that the laser beam is converged to the desired intensity.

Meanwhile, error judgement processing such as life judgement by the laser error, life warning judgement, UNBL error judgement, or the like is executed to prevent the Laser APC operation from being disabled. Light intensity stabilization correction in the Laser APC can be executed without an upper limit by the overflow/underflow processing of the fine adjustment D/A converter 3.

SECOND EMBODIMENT

In the above embodiment, when the laser ON state is maintained over the predetermined period of time t even by an image signal, the measurement result obtained by A/D conversion is validated, and 100% convergence value correction is performed. In the second embodiment, accumulation of the measurement calculation result by the Laser APC and 100% value convergence value correction are executed by only the UNBL signal. Thus, the D flip-flop 10 shown in FIG. 1A can be omitted, and cost can be reduced. In addition, the control programs can be relatively simplified.

FIGS. 7 to 11 are flow charts for explaining the embodiment wherein an APC-TABLE is called by only the UNBL signal.

Figure 7:
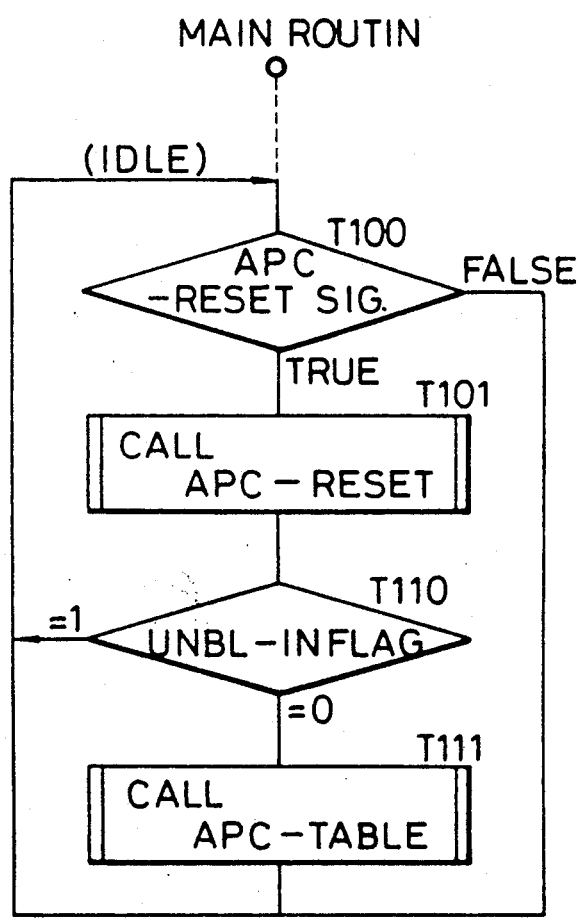
FIG. 7 is a flow chart showing a main routine according to a second embodiment of the present invention.
Figure 8:
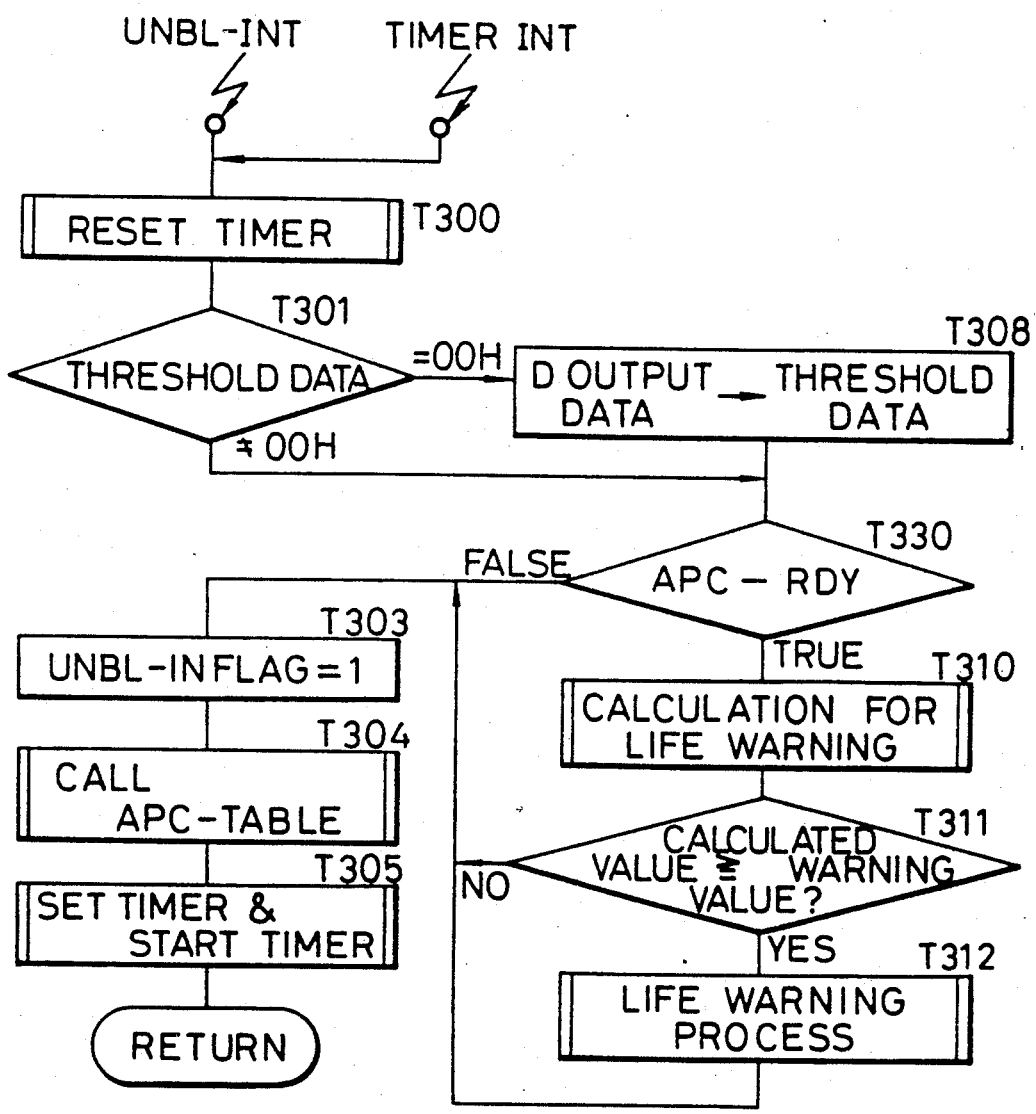
FIG. 8 is a flow chart showing an interrupt routine of the second embodiment.
Figure 9:
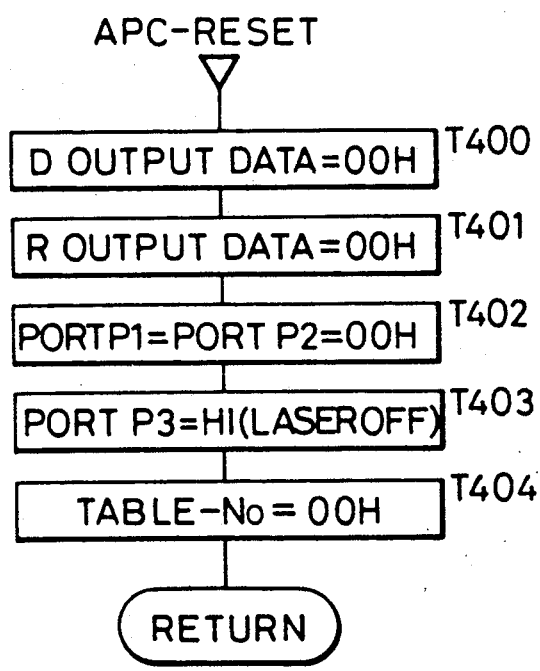
FIG. 9 is a flow chart showing an APC-RESET routine in the second embodiment.
Figure 10:
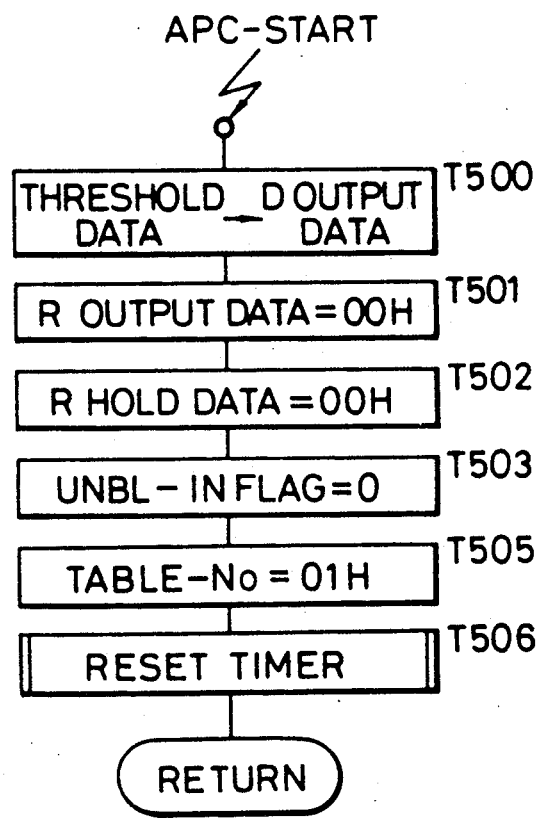
FIG. 10 is a flow chart showing an APC-START routine in the second embodiment.
Figure 11:
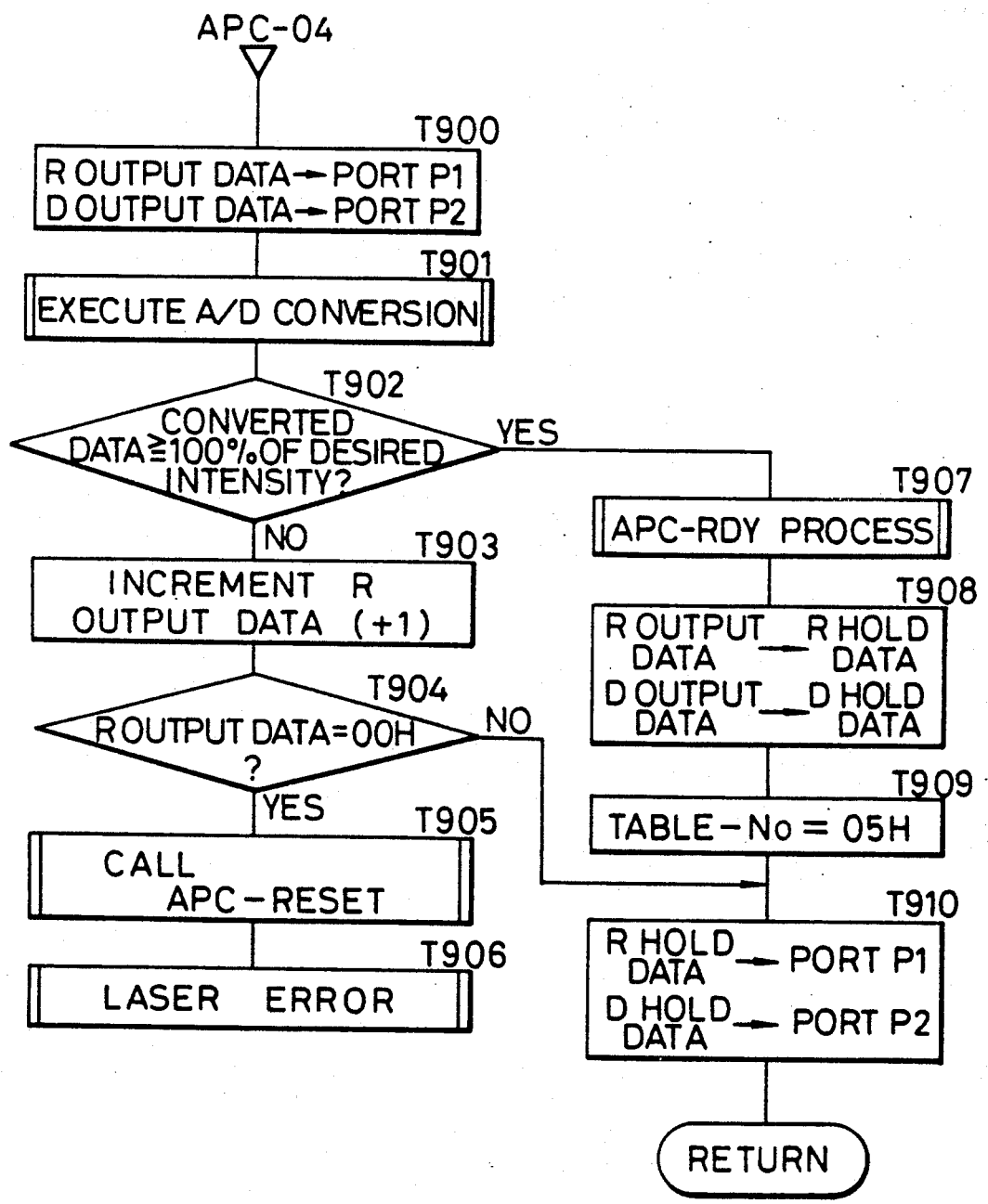
FIG. 11 is a flow chart showing an APC-04 routine in the second embodiment.

The flow charts shown in FIGS. 7 to 11 show modified portions of the flow charts shown in FIGS. 3A to 3K, and other portions are common to each other. More specifically, FIG. 7 corresponds to FIG. 3A; FIG. 8, FIG. 3C; FIG. 9, FIG. 3D; FIG. 10, FIG. 3E; FIG. 11, FIG. 3J; and FIG. 12, FIG. 3K.

In the main routine shown in FIG. 7, control associated with the flip-flop 10 is omitted, and control associated with the APC-RESET routine is made. The operation for raising the Laser APC and 100% convergence value correction are made by the APC-TABLE call by only the UNBL signal. Therefore, the FLAG-A flag for identifying whether or not the operation for raising the Laser APC is being performed can be omitted. Thus, the set/reset operation of the FLAG-A flag in the APC-RESET routine shown in FIG. 3D, the APC-START routine shown in FIG. 3E, and the APC-04 routine shown in FIG. 3J can be omitted, as shown in FIGS. 9 to 11.

Therefore, in the operation for raising the Laser APC, if it is determined in step T110 in the main routine (FIG. 7) that UNBL-IN flag=0, the flow advances to step T111 to call the APC-TABLE until the interrupt routine by the UNBL signal occurs. When the UNBL signal is changed to a normal pulse, the UNBL-IN flag is set in the interrupt routine. Thereafter, the APC-TABLE call in step T111 in the main routine is not performed, and the APC-TABLE call by only the UNBL signal is performed.

Control for a UNBL error, laser life, and life warning, and overflow/underflow of a fine adjustment D/A converter 3 as in the first embodiment is similarly executed in the second embodiment.

100% convergence value correction according to the modification of the APC-05 routine will be described below with reference to FIG. 12.

When the APC-05 routine is called by the UNBL signal, the flow advances to step T1200 to check a paper interval or not. If no paper interval is detected (i.e., in a non-image region during printing to a print sheet), the flow advances to step T1201, and the laser is caused to emit light at a light intensity for the UNBL signal determined by the R output data. The flow then advances to steps T1002 to T1009 as in the first embodiment, and then returns to the main routine. More specifically, the laser is caused to emit light on the basis of a data value stored in an R output data memory during the TRUE period of the UNBL signal, and its light intensity is measured. The measured intensity is compared with a desired intensity to correct the data value of the R output data. The data value of the fine adjustment D/A converter 3 is reset to the R hold data, and the flow then returns to the main routine (step T1009). Therefore, not in a paper interval but during a FALSE period of the UNBL signal (i.e., when the laser is turned on/off in accordance with an image signal), a laser light intensity is determined by the R hold data. Not in a paper interval but during the TRUE period of the UNBL signal, the laser is caused to emit light based on the R output data, and measurement, comparison, and data correction are performed. The above operations are repeated until the paper interval starts, and the content of the R output data is accumulated and corrected as in the first embodiment.

If the data value of the fine adjustment D/A converter 3 overflows/underflows in step T1006, the control returns to the APC-02 routine, and the raising operation is restarted from the 80% convergence value. For this reason, when the control returns again to the APC-05 routine, the R hold data=R output data is set in the APC-04 routine, and the content of the R output data accumulated before execution of the overflow/underflow processing of the fine adjustment D/A converter is canceled. Therefore, the content of the R output data is started to be accumulated and corrected when the control returns to the APC-05 routine.

Figure 13:
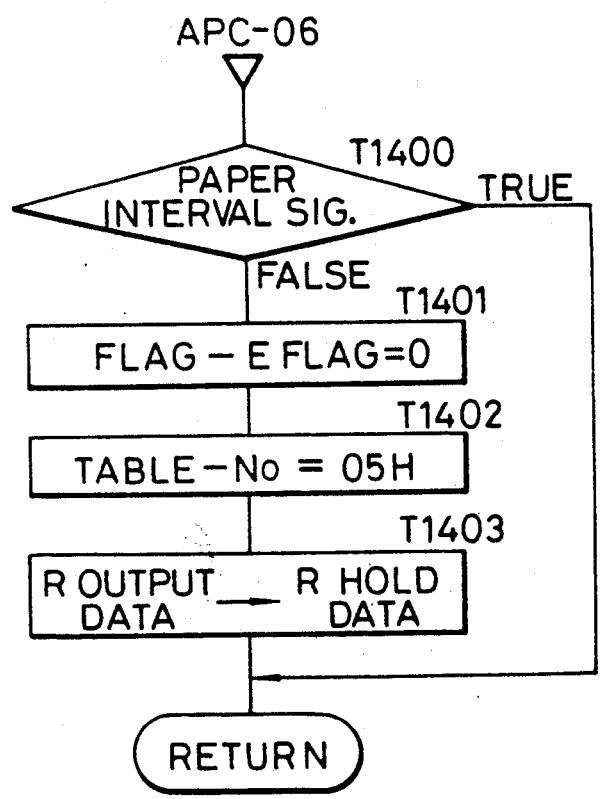
FIG. 13 is a flow chart showing an APC-06 routine in the second embodiment.

In the paper interval, the flow advances from step T1200 to step T1016, the laser 8 is caused to emit light based on the content of the R output data accumulated and corrected during the TRUE period of the UNBL signal in steps T1016 to S1018, as in the first embodiment. The light intensity is measured and compared with the desired intensity. If the measured value is smaller than the desired intensity (smaller than 100%), the flow advances to step T1203, and a FLAG-E flag is set. In step T1204, the R output data is incremented. On the contrary, if the measured value is equal to or larger than the desired intensity, the FLAG-E flag is checked in step T1205. If this flag is "0", the R output data is decremented in step T1206; otherwise, in step T1207, the control transfers to an APC-06 routine shown in FIG. 13. When the paper interval starts, the accumulated data is set as designation data, and measurement and comparison calculations are repeated by the UNBL signal. If the laser light intensity determined by the accumulated data is smaller than the desired intensity, the FLAG-E flag is set. However, the R output data is incremented to be a value slightly larger than the desired intensity (within 1 step of the R output data) in step T1204. Thereafter, the flow advances from step T1205 to step T1207. On the contrary, if the laser light intensity determined by the accumulation correction data is equal to or larger than the desired intensity, since the FLAG-E has already been reset, the R output data is temporarily decremented to a value smaller than the desired intensity in step T1206. Thereafter, as described above, the FLAG-E flag is set, and the flow advances from step T1205 to step T1207 while the R output data is slightly larger than the desired intensity. A flag is then set to transfer the control to the APC-06 routine, and the flow then returns. The control enters the APC-06 routine in FIG. 13. If this routine is called by the UBNL signal in the paper interval, no processing is made until the paper interval ends in step T1400. When the paper interval ends, the FLAG-E flag is reset for the next paper interval in step T1401. The flag is set to return the control to the APC-05 routine in step T1402. In step T1403, the R output data set to be slightly larger than the desired intensity is loaded in the R hold data, and the flow then returns.

As described above, in the embodiment shown in FIGS. 12 and 13, not in the paper interval, data is formed for accumulated data during the TRUE period of the UNBL signal. When the paper interval starts, the measurement and comparison are performed to correct data on the basis of the accumulated data in the TRUE period of the UNBL signal. In this correction method, data (slightly larger than the desired intensity) is determined when the R output data is temporarily set to be smaller than the desired intensity, and then set to be equal to or larger than the desired intensity. The determined data is latched until the next paper interval.

Note that data accumulated not in the paper interval is incremented/decremented. However, such data may be averaged or may be decided by majority of magnitudes, and the determination method is not particularly limited. Alternatively, in place of forming the accumulated data, correction in the paper interval may be executed to have laser light intensity data immediately before the paper interval as a starting point.

Figure 12A:
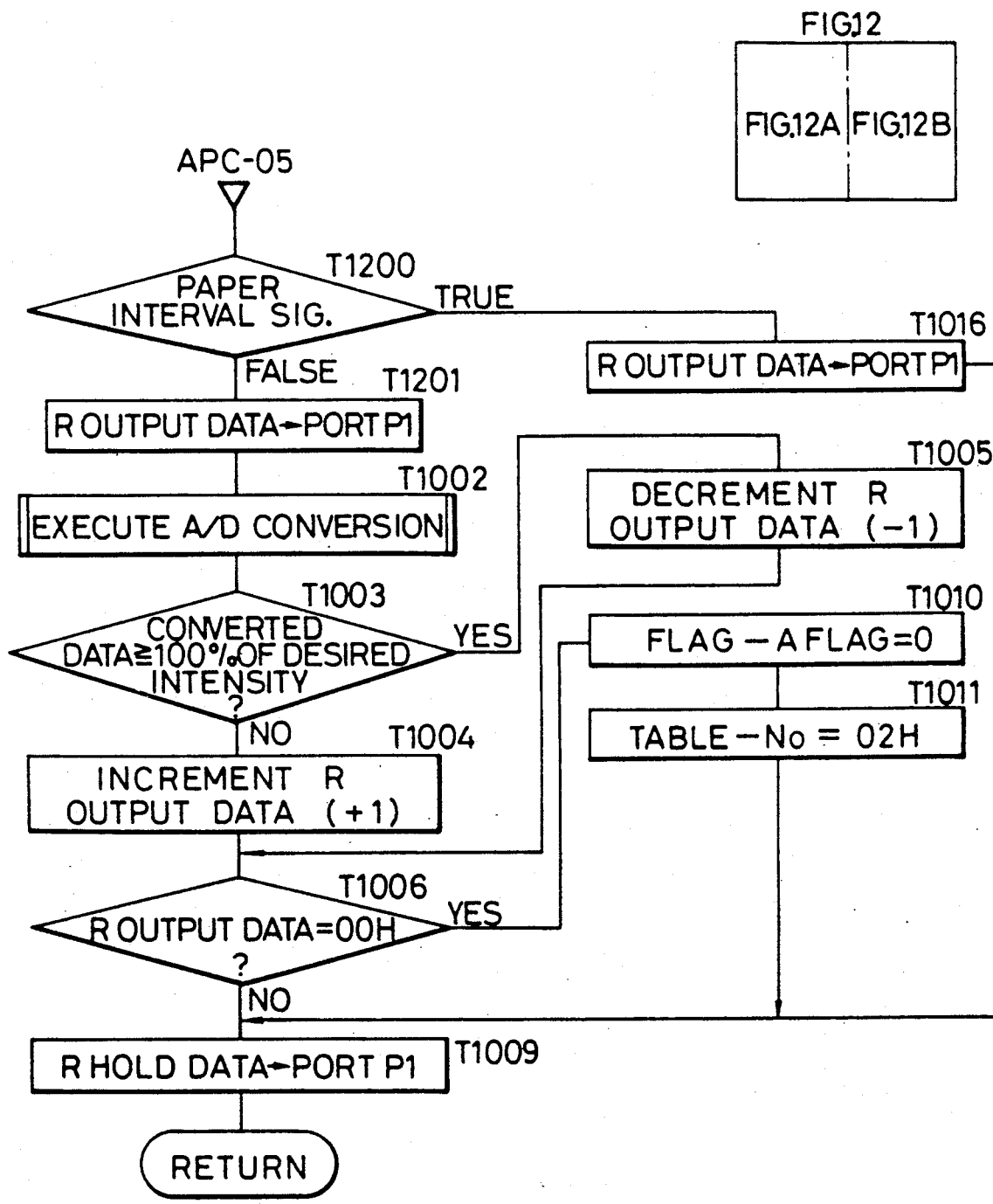
Figure 12B:
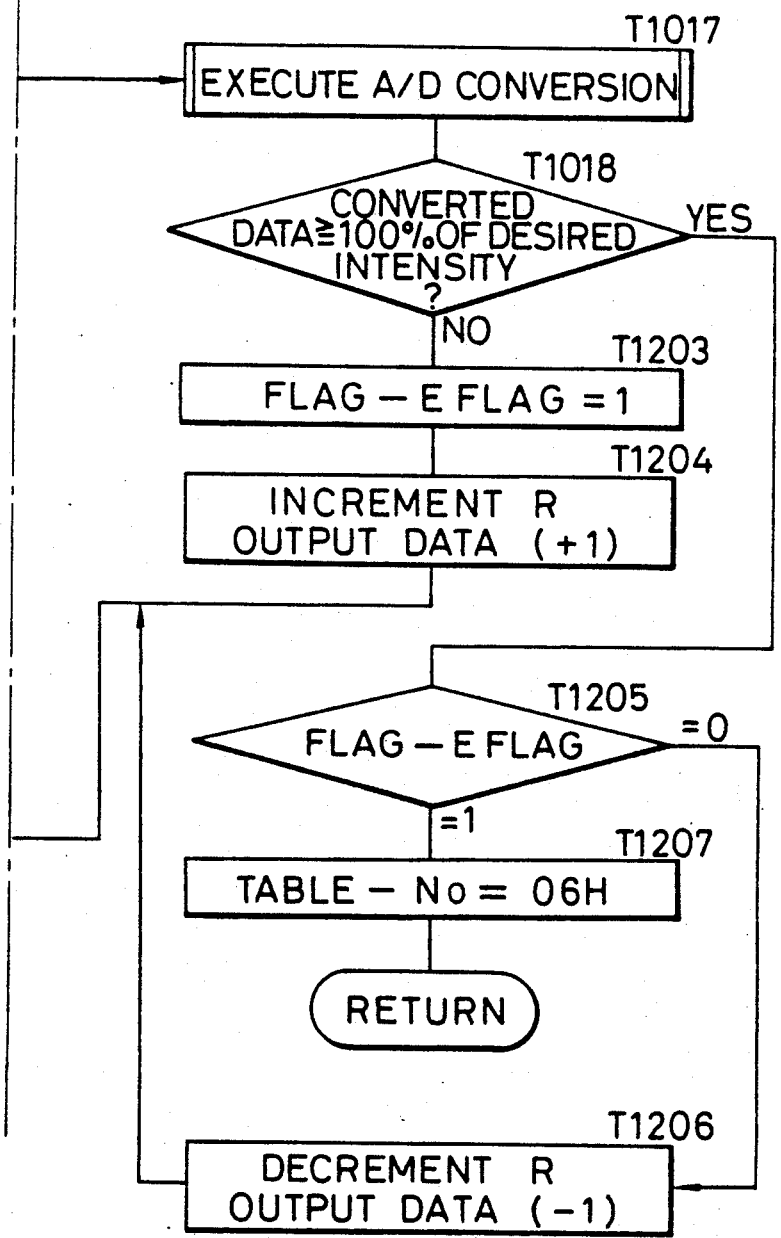
Figure 14A:
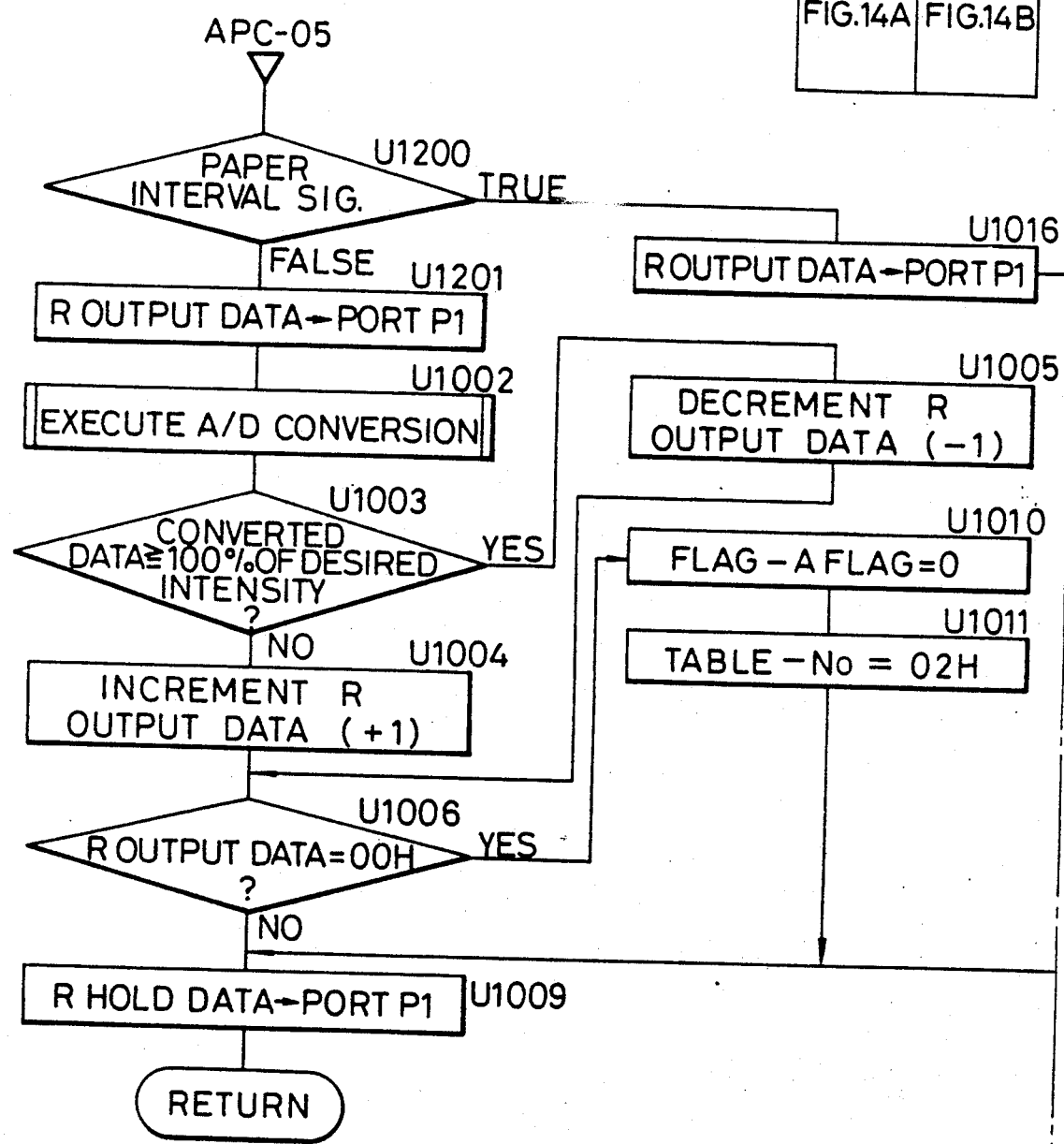
FIGS. 14A and 14B are a flow chart showing a modification of the APC-05 routine in the second embodiment.
Figure 14B:
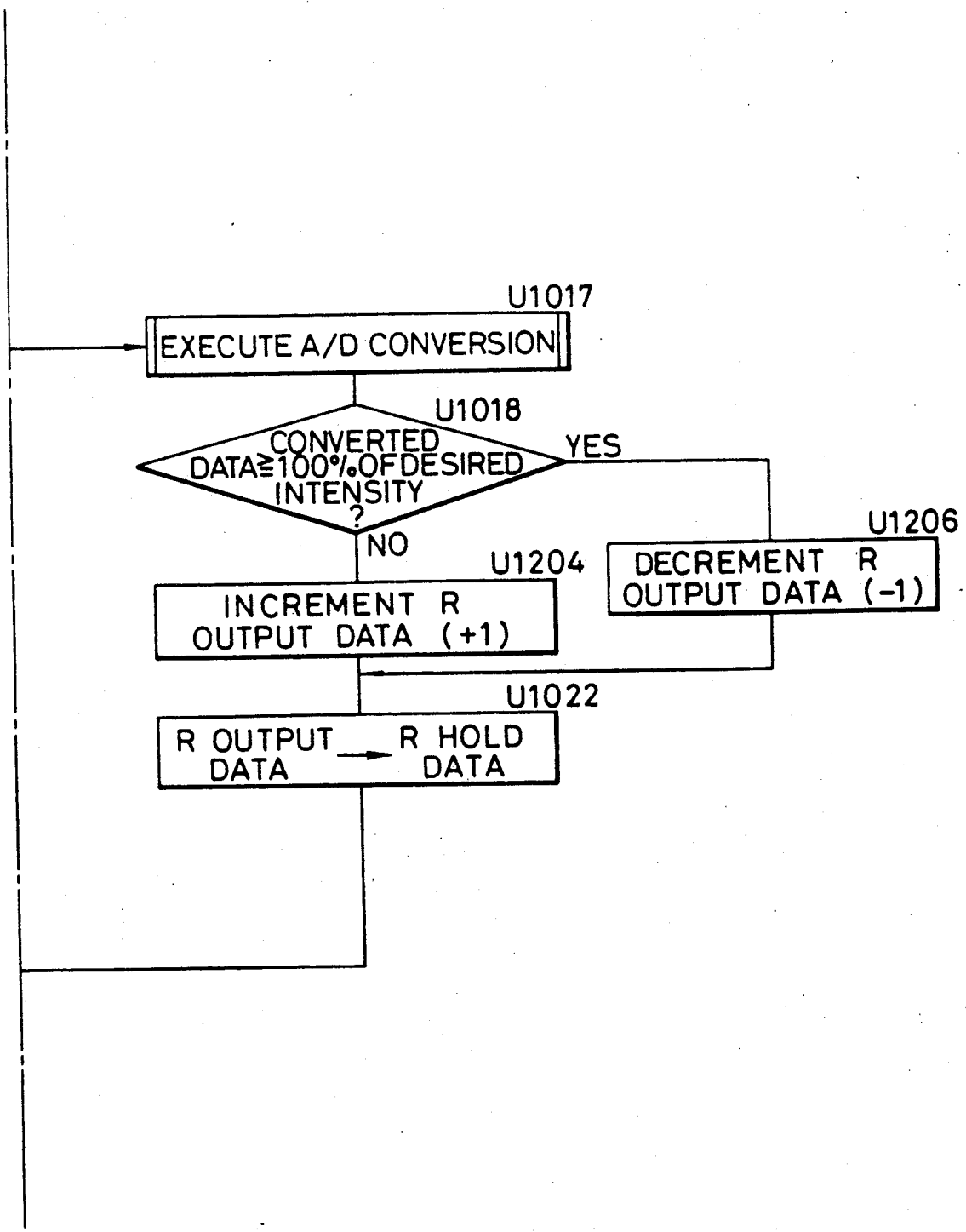

As shown in the APC-05 routine shown in FIG. 14, not in the paper interval, accumulated data is formed as in FIG. 12. When the paper interval starts, measurement and comparison calculation are repeated to have the accumulated data as a starting point, and data obtained when the paper interval ends may be latched.

The detailed application of the present invention is not limited to the above-mentioned embodiments, and various modifications may be made.

For example, the present invention may be applied to a system using not a single laser but a plurality of lasers. Furthermore, the present invention may be applied to light intensity control of, e.g., a recording apparatus, an optical communication apparatus using other light-emitting elements. The arrangements of the above embodiments may be combined.

THIRD EMBODIMENT

Figure 15:
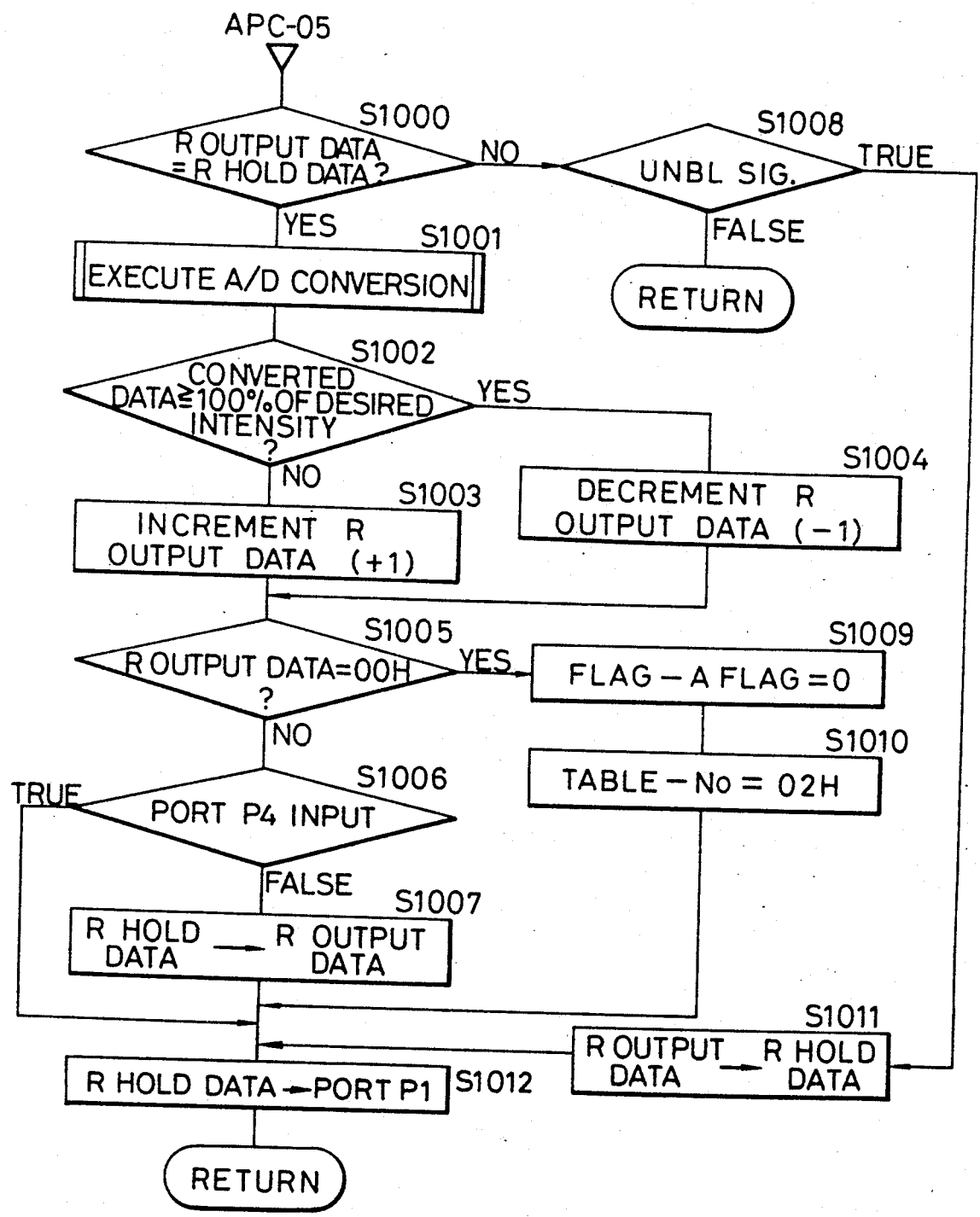
FIG. 15 is a flow chart showing an APC-05 routine in the detailed operation of a third embodiment.

A third embodiment of the present invention will now be described. In the third embodiment, the APC-05 routine is modified, as shown in FIG. 15. Other arrangements are the same as those in the first embodiment, and a detailed description thereof will be omitted.

When the APC-05 routine is designated by an APC-TABLE call, R output data and R hold data are compared with each other (step S1000). If these data are equal to each other, the flow advances to step S1001 without performing a comparison calculation. Note that D hold data (80% convergence value) is output to a port P2 as the data output to a rough adjustment D/A converter 2 in the APC-04 routine. In the APC-05 routine, the D hold data and D output data for the rough adjustment D/A converter 2 are left unchanged.

A feedback voltage obtained when a laser 8 is turned on by a laser drive current $i_L$ determined by the D hold data and the R output data is A/D-converted (step S1001), and is compared with desired intensity data (step S1002). As a result, if the A/D-converted value is smaller than the 100% value, the R output data is incremented (step S1003). Contrary to this, if the A/D-converted data is equal to or larger than the 100% value, the R output data is decremented (step S1004). Thus, overflow/underflow is checked based on the calculation result (step S1005).

If the calculation result is "00H", a FLAG-A flag is reset (step S1009), and a flag is set to transfer the control to the APC-02 routine (step S1010). The R hold data is output to the port P1 output for a fine adjustment D/A converter 3 (step S1012), and the flow then returns to the main routine. Then, overflow/underflow processing is started to be executed from the next APC-TABLE call. On the other hand, if it is determined in step S1005 that the calculation result is not "00H", the flow advances to step S1006, and a port P4 input is checked to determine whether or not a laser ON state continues from when the control enters the APC-05 routine until the present time, thus judging validity of the comparison calculation. If it is determined that the calculation result is invalid, the R hold data is loaded to an R output data memory, and the R output data result is canceled (step S1007). A data value of the fine adjustment D/A converter 3 is set as the R hold data, and the flow then returns (step S1012). On the other hand, if it is determined that the calculation result is valid, the content of the comparison calculation result is left unchanged as the R output data, and the data value of the fine adjustment D/A converter 3 is set as the R hold data (step S1012). The flow then returns to the main routine.

If it is determined in step S1000 that the R output data is not equal to the R hold data, the control waits until a UNBL signal goes to TRUE level (step S1008). If the UNBL signal is at FALSE level, a loop of step S1000→S1008→return is repeated. When the UNBL signal goes to TRUE level, the R output data storing the comparison calculation result is loaded to an R hold data memory (steps S1011) to update data, and the updated data is output to the fine adjustment D/A converter 3 (step S1012).

In the third embodiment, as described above, since the R hold data is output in step S1012 in the APC-05 routine, if it is determined in step S1000 that the R output data is equal to the R hold data, the laser emits light in accordance with the laser drive current $i_L$ determined by the D hold data and R hold data.

The comparison calculation is made on the basis of this value, and at the same time, validity of the calculation result is judged. If it is determined that the calculation result is invalid, the comparison calculation result is canceled, and the flow returns. Therefore, the above-mentioned processing is repeated by the next APC-TABLE call. The comparison calculation is made valid several times to once per line (once by the UNBL signal) in the APC-TABLE called by the laser ON state. In one line, the comparison calculation is always made valid. If the comparison calculation is made valid, the valid comparison calculation result is held until the UNBL signal is input, and data is updated in response to inputting of the UNBL signal.

However, when the comparison calculation is made valid by the UNBL signal, data of the corresponding line is not updated but is updated by the UNBL signal for the next line.

Basically, valid comparison calculation data is latched, and is updated by estimation for every line. The latched comparison calculation data value is a value obtained by incrementing or decrementing the data value at that line by 1. For example, assuming that a variation of a laser light intensity is small, if a data value exceeds 100% by the comparison calculation based on the first data value N, N−1 is calculated. Since the data value becomes smaller than 100% by the comparison calculation for the next line, the data value is restored to N. Similarly, if the data value is changed from N to N+1, it can be restored to N in the next line. More specifically, when there is no variation in laser light intensity, the data value is converted for every line by an amplitude corresponding to one step of the fine adjustment D/A converter output.

If a laser light intensity varies due to a drift of an i-L curve of the laser due to its own heat dissipation, the data value is corrected accordingly in units of steps, and is finally converged within the range of one step. Even if a light intensity changes due to a thermal variation, since the correction time is shorter than the change time, convergence is possible.

An amplitude corresponding to one step for converging a light intensity by estimation is a maximum of:

(slope efficiency $\eta_{max}$ × current for one step) ÷

(chip light intensity min × 100) = 3%

Since the value of the slope efficiency $\eta$ of the laser is normally converged to 0.3 mW/mA, the amplitude is 1.5%. Furthermore, since the chip light intensity (TYP) is about 2 mW, the amplitude is essentially 0.75%.

If a variation in light intensity of about 3% occurs, it does not pose a problem in the existing laser beam printers.

In the Laser APC of this embodiment, as described above, a light intensity is stabilized by the laser ON state by the UNBL signal in the non-drum region or an image write signal in the drum region without performing the laser ON operation for the Laser APC. Since the stabilization means raises a light intensity to the desired intensity by the UNBL signal and then maintains the desired intensity, the comparison and estimation calculation result executed in the immediately preceding line is updated by the UNBL signal of the line, so that the data value can be converged by an amplitude of one step for a 1-line cycle. Such processing is repeated in units of lines to control the light intensity.

Meanwhile, error judgement processing such as life judgement by a laser error, life warning judgement, UNBL error judgement, or the like is executed to prevent the Laser APC operation from being disabled. Light intensity stabilization correction in the Laser APC can be executed without an upper limit by overflow/underflow processing of the fine adjustment D/A converter 3.

FOURTH EMBODIMENT

In the third embodiment, when the laser ON state continues over the predetermined period of time t even by an image signal, measurement by A/D conversion is performed. In the fourth embodiment, this operation is inhibited, and 100% convergence value correction by the Laser APC is executed by only the UNBL signal. Thus, the D flip-flop shown in FIG. 1A can be omitted, and cost can be reduced. In addition, the control programs can be relatively simplified.

FIGS. 7 to 11 described above and FIG. 16 are flow charts for explaining the fourth embodiment wherein an APC-TABLE is called by only the UNBL signal.

The flow charts shown in FIGS. 7 to 11 and FIG. 16 show modified portions of the flow charts shown in FIGS. 3A to 3K, and other portions are common to each other. More specifically, FIG. 7 corresponds to FIG. 3A; FIG. 8, FIG. 3C; FIG. 9, FIG. 3D; FIG. 10, FIG. 3E; FIG. 11, FIG. 3J; and FIG. 16, FIG. 3K. Note that FIGS. 7 to 11 have already been described in the second embodiment, and a detailed description thereof will be omitted.

Figure 16:
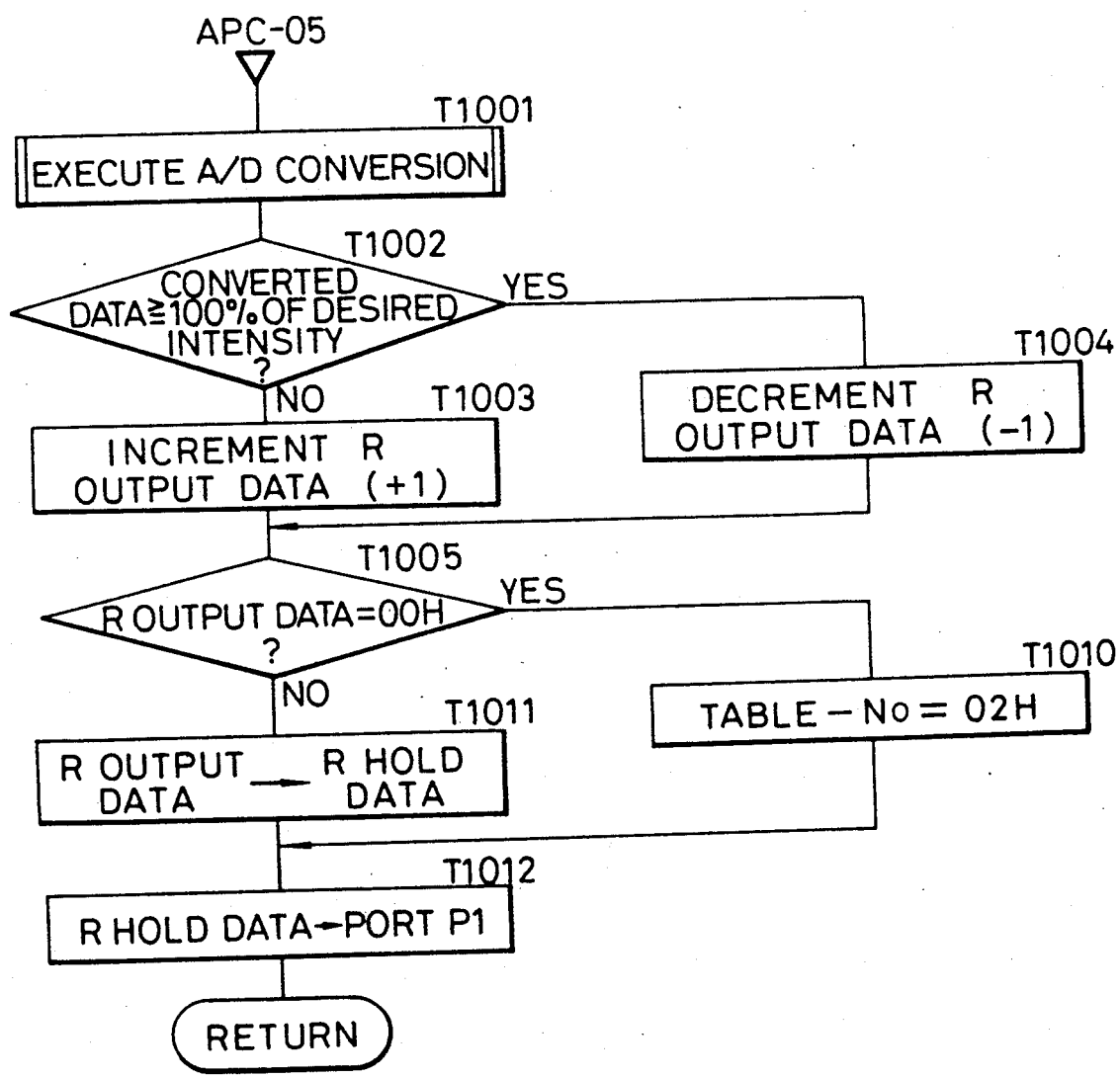
FIG. 16 is a flow chart showing an APC-05 routine of a fourth embodiment.

100% convergence value correction by the APC-05 routine according to the fourth embodiment will be described below with reference to FIG. 16.

When the APC-05 routine is called, the flow advances to steps T1001, T1002, and T1003 (or T1004). Thus, the present laser light intensity is measured, a comparison calculation is made to form a data value to be updated, and the flow then advances to step T1005. It is checked in step T1005 if the comparison calculation data value overflows/underflows. If the data value overflows/underflows, the flow advances to step T1010 for overflow/underflow processing of a fine adjustment D/A converter 3, and the same control as in the first embodiment is performed.

Normally, the flow advances from step T1005 to step T1011, and the comparison calculation data value stored in an R output data memory is loaded to an R hold data memory, and the R hold data is output to a port P1 for controlling the fine adjustment D/A converter 3, thus updating data (step T1012).

As described above, since the APC-05 routine is called in synchronism with the UNBL signal, and is executed, data is latched and updated in units of UNBL signals.

In the fourth embodiment, since measurement and comparison calculation are made in response to the UNBL signal, a continuous laser ON state can be guaranteed. Therefore, validity/invalidity of the data value need not be checked.

FIFTH EMBODIMENT

Figure 17A:
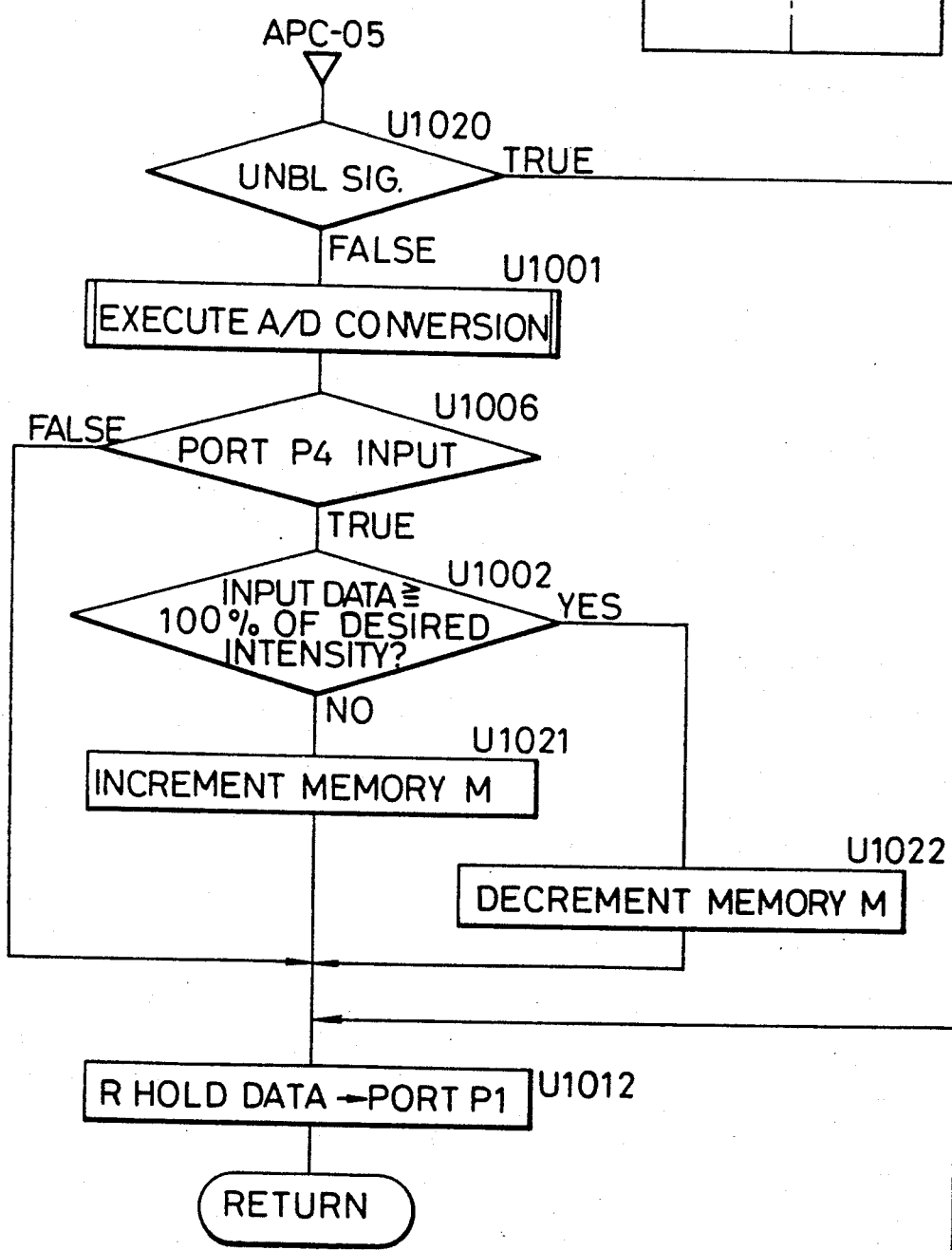
FIGS. 17A(a) and 17A(b) are a flow chart showing an APC-05 routine of a fifth embodiment.
Figure 17A:
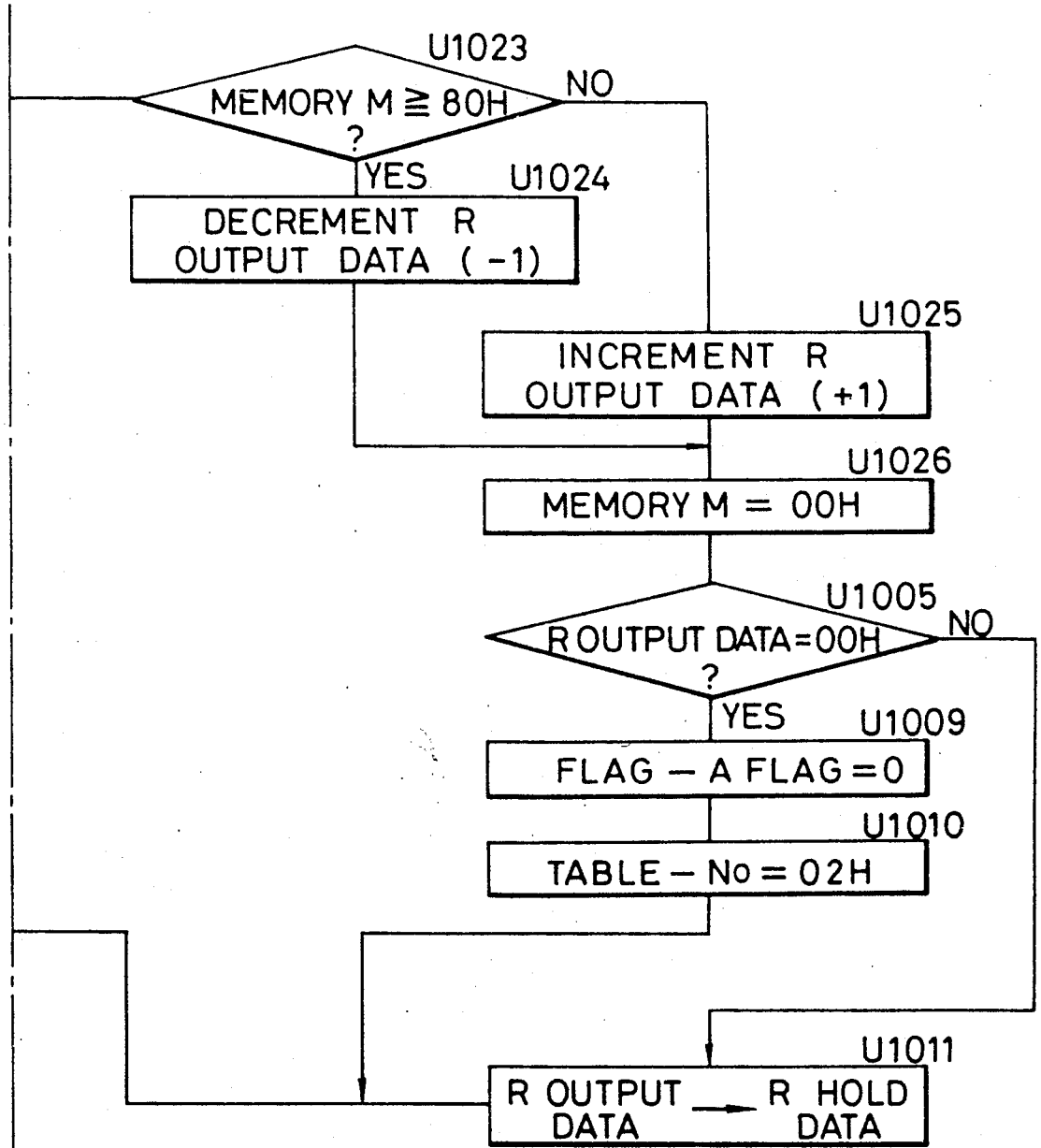
Figure 17B:
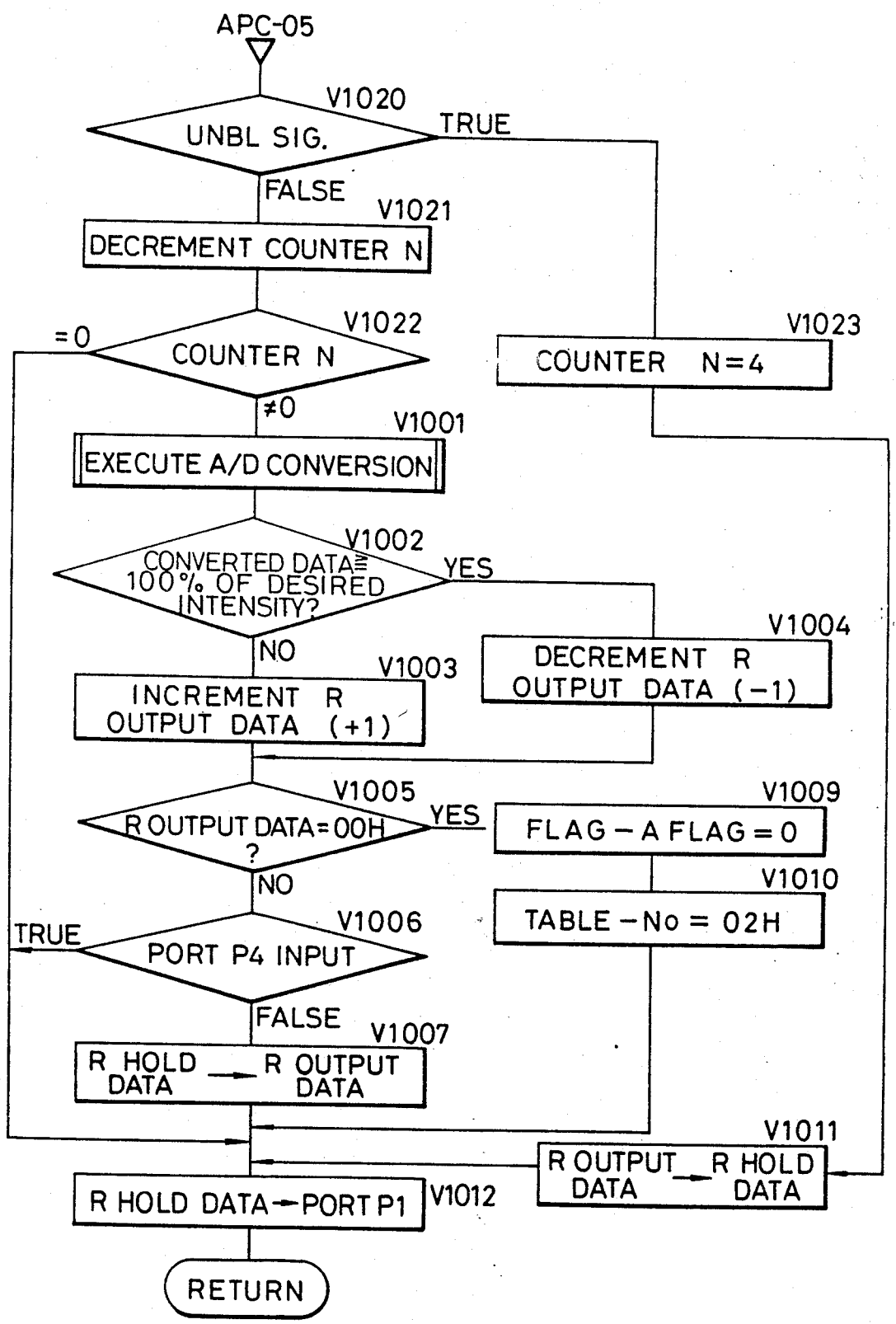
FIG. 17B is a flow chart showing a modification of the APC-05 routine of the fifth embodiment.

In the above embodiments, the present laser light intensity is measured once per cycle of the UNBL signal (per line), and after comparison calculation, data is updated by the next UNBL signal. As shown in FIGS. 17A and 17B, the present laser light intensity is measured several times, and data can be updated by the next UNBL signal.

In FIG. 17A, when the laser APC rises and the APC-05 routine is called, it is checked if the routine is called by the TRUE UNBL signal (step U1020). If the routine is called by a factor other than the UNBL signal, A/D conversion is performed in step U1001, and validity/invalidity of the A/D conversion is checked in step U1006. If the A/D conversion is invalid, no processing is performed, and the flow skips to step U1012. The flow then returns to the main routine. On the other hand, if the A/D conversion is valid, the flow advances to step U1002, and a desired intensity level is compared with the A/D-converted value. On the basis of the comparison result, a memory M is incremented/decremented in step U1021 or U1022, and the flow returns via step U1012.

With the above processing, when the laser ON state continues over the predetermined period of time t by a factor other than the UNBL signal, measurement is performed by the present laser light intensity, and the measurement result is accumulated in the memory M. Note that the memory M is cleared in step U1026 when the UNBL signal is input. If the present laser light intensity is smaller than the desired intensity, the content of the memory M changes like "00H"→"01H"→"02H", . . . ; otherwise, it changes like "00H"→"FFH"→"FEH", . . . . If the present light intensity is almost equal to the desired intensity, the content of the memory M changes like "00H"→"01H"→"00H", . . . . When the UNBL signal is input, the flow advances from step U1020 to step U1023 to check the value of the memory. In this case, the value of the memory is compared with an intermediate value 80H to detect an increase or decrease in present light intensity level. In step U1024 or U1025, the data value is corrected. With the above operation, a light intensity level in one line is measured several times, and R output data is determined by incrementing/decrementing it upon decision by majority of the measurement results. The determined data is set as the R hold data to update a laser light intensity of the next line.

An embodiment shown in FIG. 17B will be described below. Note that a data value to be corrected basically falls within one step. However, a case will be described wherein a data value must be corrected by several steps. In FIG. 17B, the present laser light intensity is measured four times or less within a cycle of the UNBL signal, and the data value of the R output data is incremented/decremented. As a result, the R output data is set and held to be one of "−4", "−2", "±0", "+2", and "+4" of the R output data. The R output data is then updated by the next UNBL signal.

In the fifth embodiment, the present laser light intensity is measured several times in one line, and a valid data value is compared with the desired intensity. The comparison result is calculated with a predetermined algorithm to make a decision by majority, as shown in FIG. 17A to increment/decrement as shown in FIG. 17B, or to be averaged, thus updating the present laser intensity to a new data value upon inputting of the next UNBL signal.

SIXTH EMBODIMENT

Figure 18A:
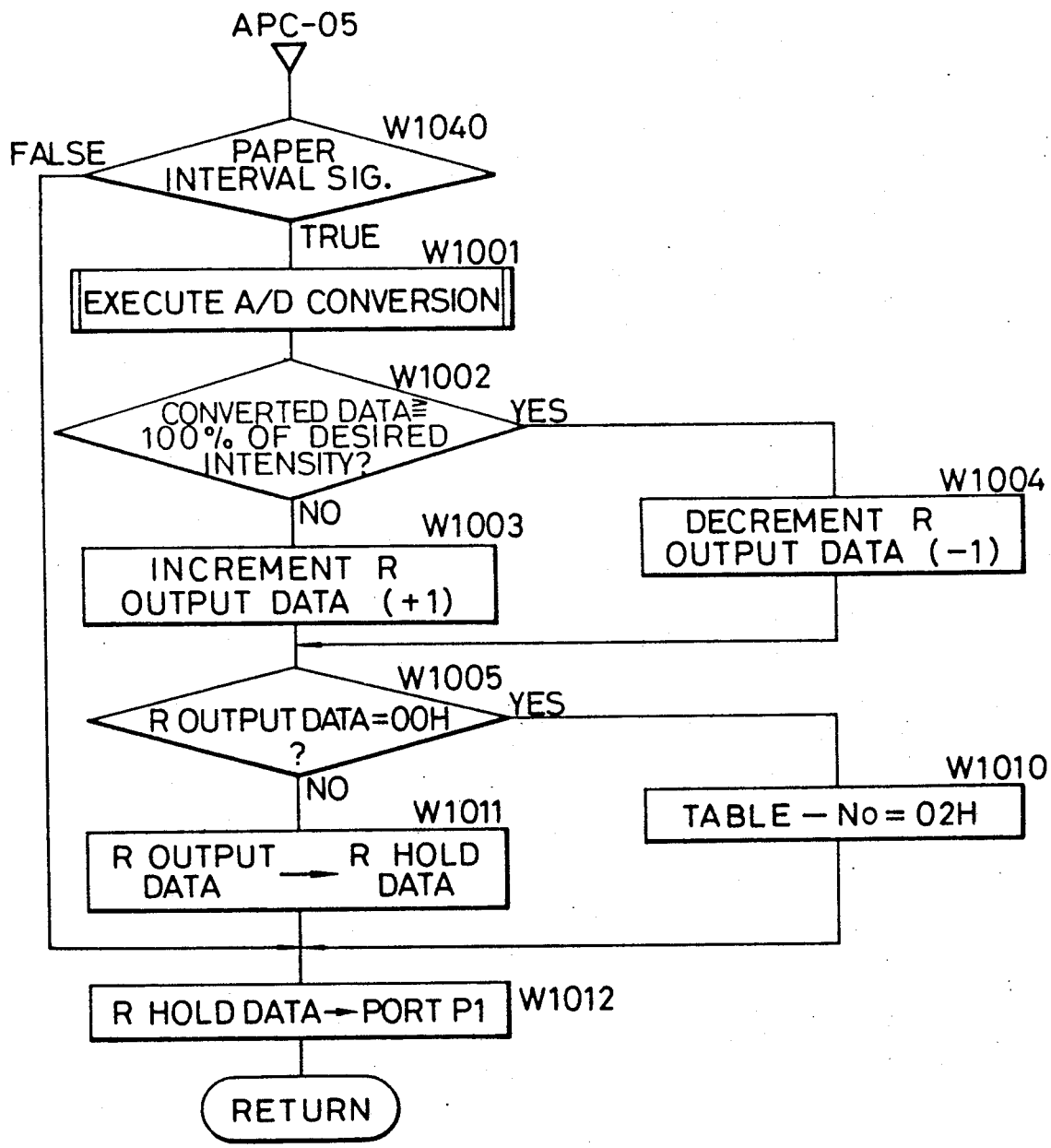
FIG. 18A is a flow chart showing an APC-05 routine of a sixth embodiment.
Figure 18B:
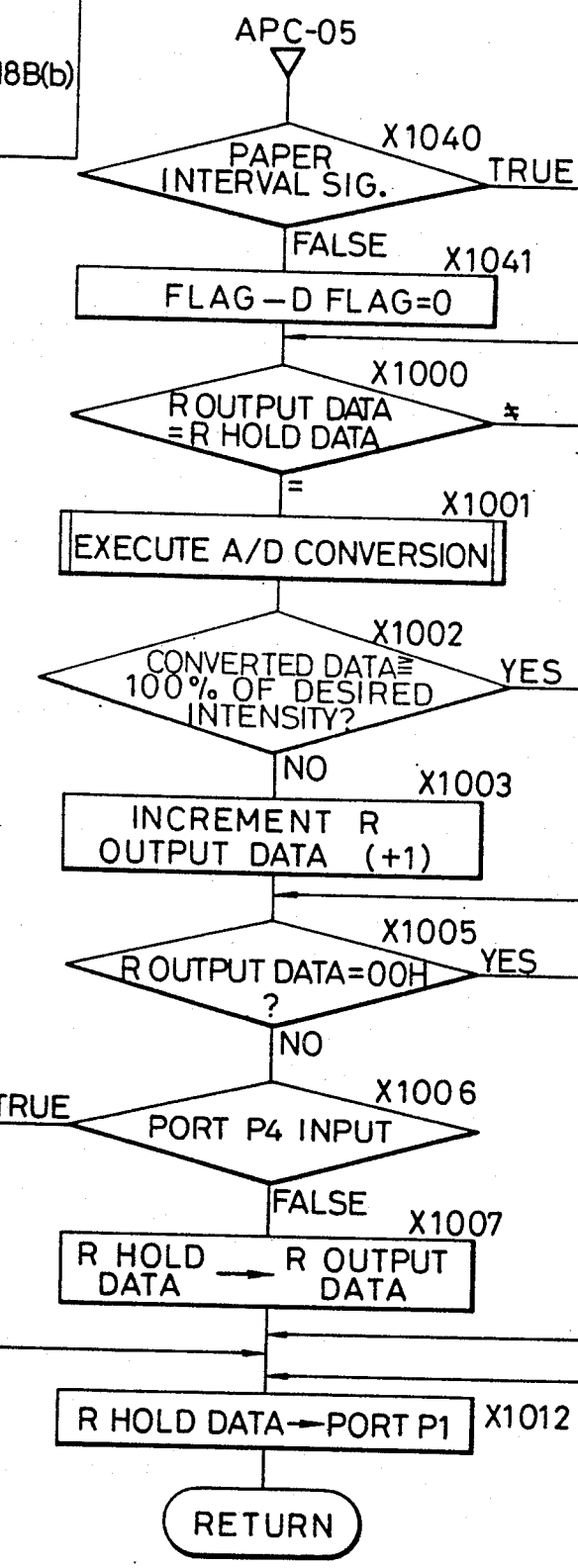
FIGS. 18B(a) and 18B(b) are a flow chart showing a modification of the APC-05 routine of the sixth embodiment.
Figure 18B:
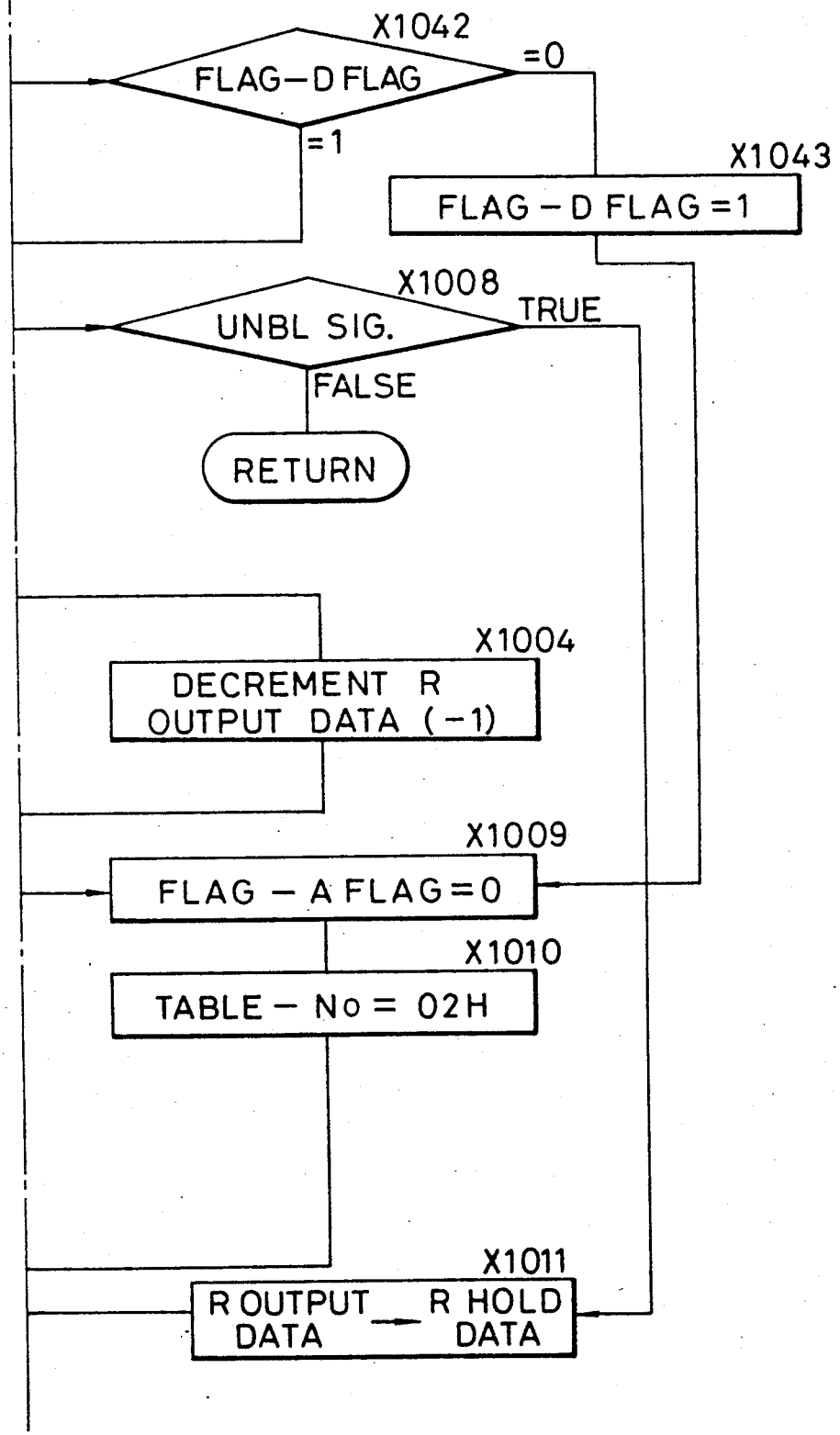

As shown in FIGS. 18A and 18B, 100% convergence value correction by the Laser APC may be executed in accordance with a paper interval signal.

In the routine of FIG. 18A, 100% convergence value correction for the Laser APC is executed in only a paper interval, and data for determining a laser light intensity is held in a period other than the paper interval. The 100% convergence value correction processing can be executed in the paper interval only when the UNBL signal is at TRUE level. Thus, this embodiment is equivalent to an application of FIG. 16.

In FIG. 18A, when the APC-05 routine is called, the flow advances to step W1040 to check a paper interval signal input to a CPU 1, thus determining a paper interval. If the paper interval is detected, the flow advances to step W1001 and the subsequent steps, and a value of R hold data is updated as in the fourth embodiment. However, if the paper interval is not detected, the flow advances to step W1012, and the value of the R hold data is kept latched. Therefore, in this method, a laser light intensity is corrected based on the 100% convergence value in the paper interval, and a data value of a fine adjustment D/A converter 3 is determined in the paper interval and is latched until the next paper interval. More specifically, during image printing, a laser is turned on with a constant laser drive current.

In the routine shown in FIG. 18B, the Laser APC is re-raised from a 80% convergence value in a paper interval, and 100% convergence value correction is executed in a period other than the paper interval like in the third embodiment.

In FIG. 18B, when the APC-05 routine is called, a paper interval signal is checked in step X1040. If it is determined that a paper interval is not detected, a FLAG-D flag is reset in step X1041. In step X1000, the same processing as in the third embodiment is executed. On the other hand, if it is determined that the paper interval is detected, the flow advances to step X1042 to check the FLAG-D flag. If this flag is "0", the FLAG-D flag is set in step X1043, and overflow/underflow processing for the fine adjustment D/A converter 3 is executed in step X1009. When the control returns to the APC-05 routine again, the flow advances to step X1000 via steps X1040 and X1042, and the same processing as in the third embodiment is executed until the next paper interval starts and the FLAG-D flag is reset in step X1041. Therefore, with this method, when the paper interval starts, the Laser APC is re-raised once from the 80% convergence value to the desired intensity. 100% convergence correction processing is executed until the next paper interval as in the third embodiment.

SEVENTH EMBODIMENT

Figure 19A:
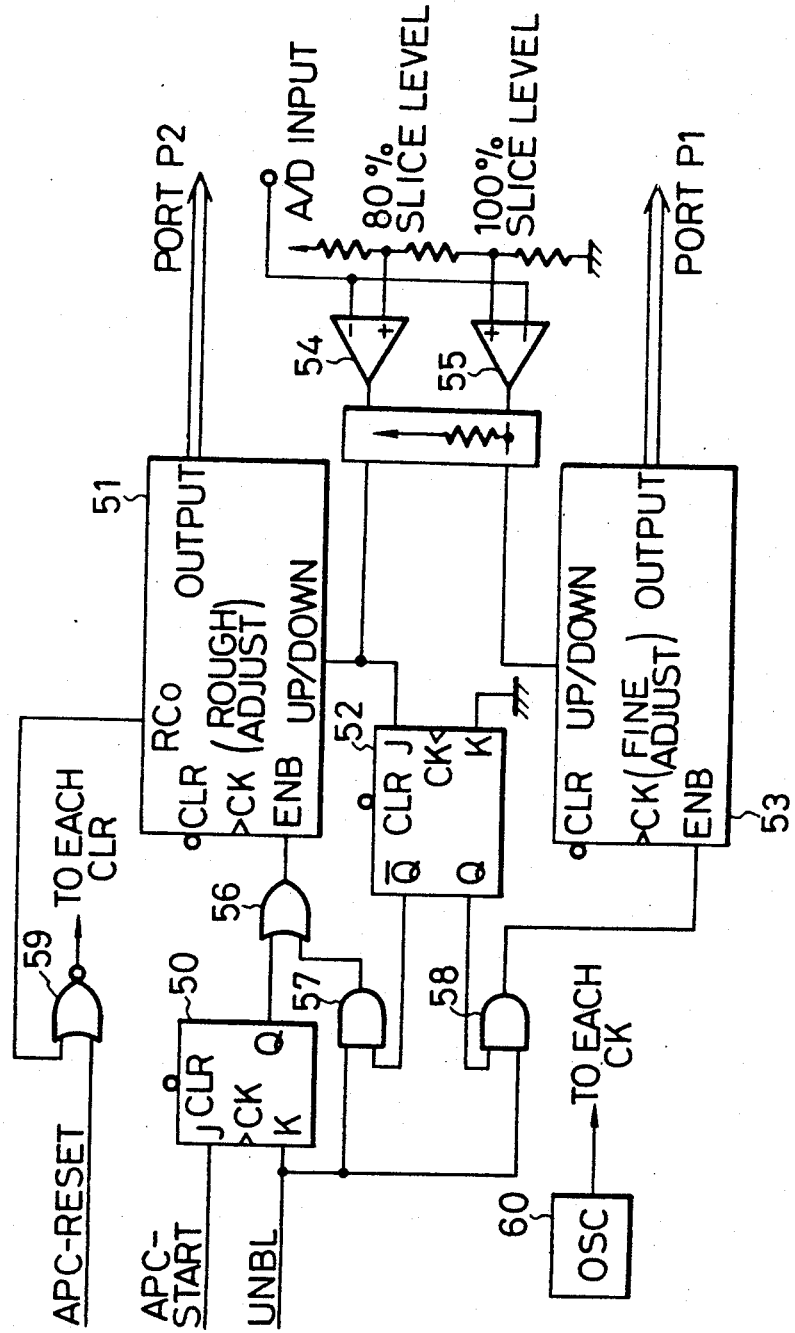
FIG. 19A is a partial circuit diagram of a basic circuit according to a seventh embodiment of the present invention.
Figure 19B:
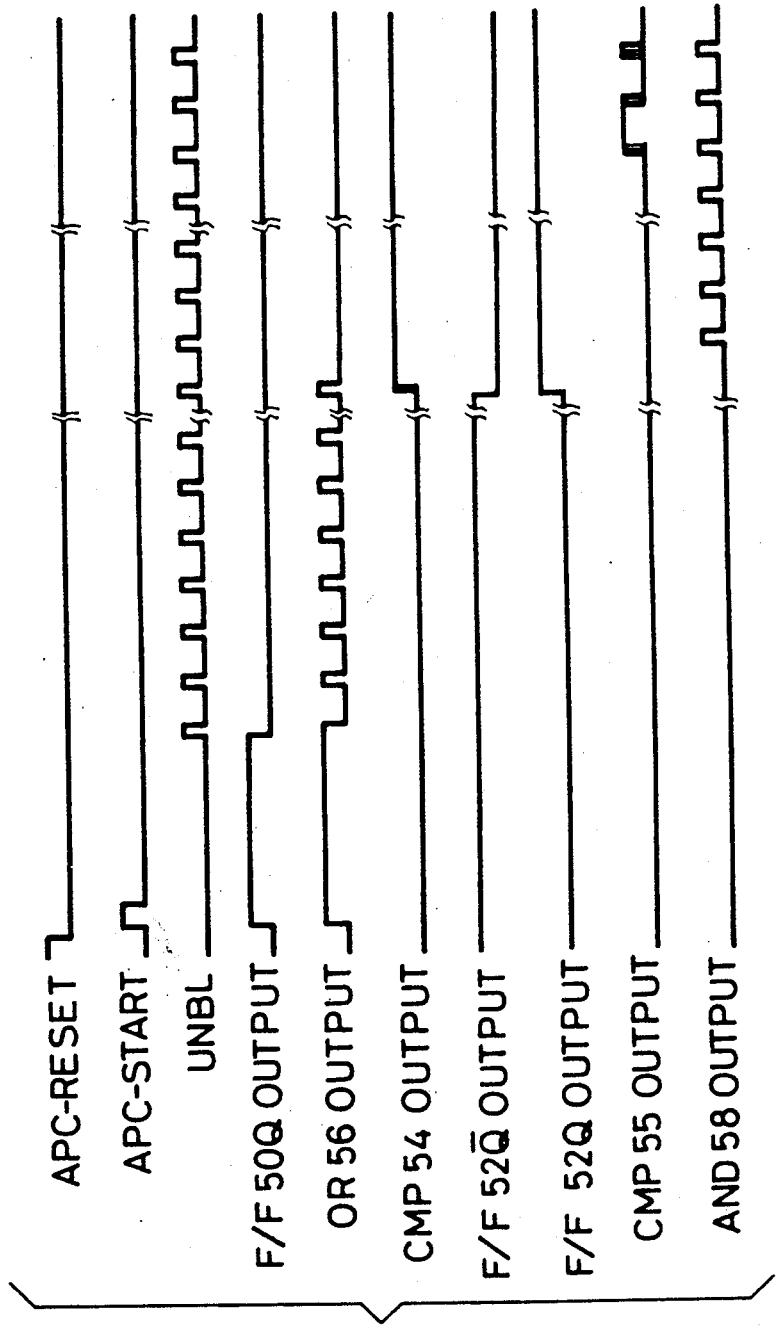
FIG. 19B is a timing chart showing an operation of the basic circuit of the seventh embodiment.

FIGS. 19A and 19B show an embodiment wherein a control portion of the CPU 1 described in the fourth embodiment is constituted by a hardware circuit.

In FIG. 19A, input signals are the same as those shown in FIG. 1A, and output signals also correspond to the ports P1 and P2 of the CPU 1 shown in FIG. 1A.

The port P2 is connected to a rough adjustment D/A converter 2, and the port P1 is connected to a fine adjustment D/A converter 3. Note that a feedback voltage of a light-receiving element incorporated in the laser 8 is input to comparators 54 and 55 connected to an A/D input terminal. The feedback voltage from the light-receiving element is inverse proportional to a laser light intensity, as can be seen from the circuit arrangement of FIG. 1A.

This circuit also includes J-K flip-flops 50 and 52, 8-bit up/down counters 51 and 53, AND gates 57 and 58, an OR gate 56, a NOR gate 59, and an oscillator (OSC) 60.

The oscillator 60 is connected to clock input terminals (CK) of the flip-flops 50 and 52 and the up/down counters 51 and 53. The output of the NOR gate 59 is also connected to clear terminals (CLR) of the flip-flops 50 and 52 and the up/down counters 51 and 53.

In this circuit, as shown in FIG. 19B, when an APC-RESET signal is at TRUE level for the first time, the flip-flops 50 and 52 are cleared by the NOR gate 59, and each Q output goes to "LOW" level, and each $\overline{Q}$ output goes to "HI" level. The up/down counters 51 and 53 are also cleared, and output "00H". Therefore, data of both the D/A converters 2 and 3 are "00H", and a laser drive current $i_L$ becomes 0 mA. When an APC-START signal is input, the Q output of the flip-flop 50 goes to "HI" level, and an enable terminal ENB of the counter 51 goes to TRUE level through the OR gate 56 to continuously increment data. Thus, a data value of the port P1 is increased, and hence, the laser drive current $i_L$ is increased. Then, the laser begins to emit light. When the laser begins to emit light, a UNBL signal is input. When the UNBL signal is input, the Q output of the flip-flop 50 goes to "LOW" level. However, the UNBL signal is input to the counter 51 via the OR gate 56 by the AND gate 57. Since the flip-flop 52 is kept cleared by the APC-RESET signal until the output from the comparator 54 goes to "HI" level, its Q output is at "LOW" level, and its $\overline{Q}$ output is at "HI" level.

Therefore, since the counter 51 is enabled to count data during the TRUE period of the UNBL signal, it intermittently increments data.

When data for the port P1 is incremented, the output from the rough adjustment D/A converter 2 is increased. When the laser light intensity is increased up to 80% of a desired value, the comparator 54 compares a 80% slice level and an A/D input value, and inverts its output from "LOW" level to "HI" level. Thus, the $\overline{Q}$ output of the flip-flop 52 goes to "LOW" level, and the UNBL signal is cut off at the AND gate 57. Therefore, the counter 51 stops its count-up operation, and holds the output data value at that time, thus determining data for the rough adjustment D/A converter 2.

On the other hand, since the Q output of the flip-flop 52 goes to "HI" level, the AND gate 58 is enabled, and the UNBL signal is input to the counter 53. During the TRUE period of the UNBL signal, the counter 53 is enabled to count data, and starts intermittent incrementation of data. Thus, a data value for the fine adjustment D/A converter 3 is increased. When a laser light intensity reaches a desired intensity by the counter 53, the output from the comparator 55 is changed from "LOW" level to "HI" level. Thus, the counter 53 decrements data until its UP/DOWN terminal goes "HI". When the light intensity becomes smaller than the desired intensity, the output from the comparator 55 is changed from "HI" level to "LOW" level, and the counter 53 restarts incrementation of data. In this manner, the counter 53 increments/decrements data in accordance with the output of the comparator 55, whose state is determined by a laser light intensity.

Therefore, before the UNBL signal is input, the rough adjustment counter 51 increments data in response to the APC-START signal to continuously raise the laser drive current $i_L$. When the UNBL signal is input, the rough adjustment counter 51 increments data during only the TRUE period of the UNBL signal, and continues incrementation until a laser light intensity reaches a 80% value of the desired intensity.

When the counter 51 overflows, the NOR gate 59 outputs a ripple carry out (RCO) signal, and sets an APC-RESET state. The RCO signal may be processed as a laser error, or a data value as a counter output may be processed as laser life warning. When the laser light intensity has reached the 80% value, a counter to be operated by the flip-flop 52 is switched from the counter 51 to the counter 53, and the data value of the counter 51 is held. The counter 53 for the fine adjustment D/A converter raises the laser drive current $i_L$, and increments data until the laser light intensity reaches the desired intensity. When the desired intensity has been reached, the fine adjustment counter 53 increments/decrements data to execute 100% convergence value correction.

The 100% value convergence value correction is executed during only the TRUE period of the UNBL signal, and data is incremented/decremented upon comparison with the present light intensity. Thus, data correction is made by estimation as in the third embodiment.

The detailed application of the present invention is not limited to the above-mentioned embodiments, and various modifications may be made.

For example, the present invention may be applied to a system using not a single laser but a plurality of lasers or may be applied to light intensity control of, e.g., a recording apparatus, an optical communication apparatus, or the like using other light-emitting elements. The arrangements of the above embodiments may be combined.

EIGHTH EMBODIMENT

Figure 20:
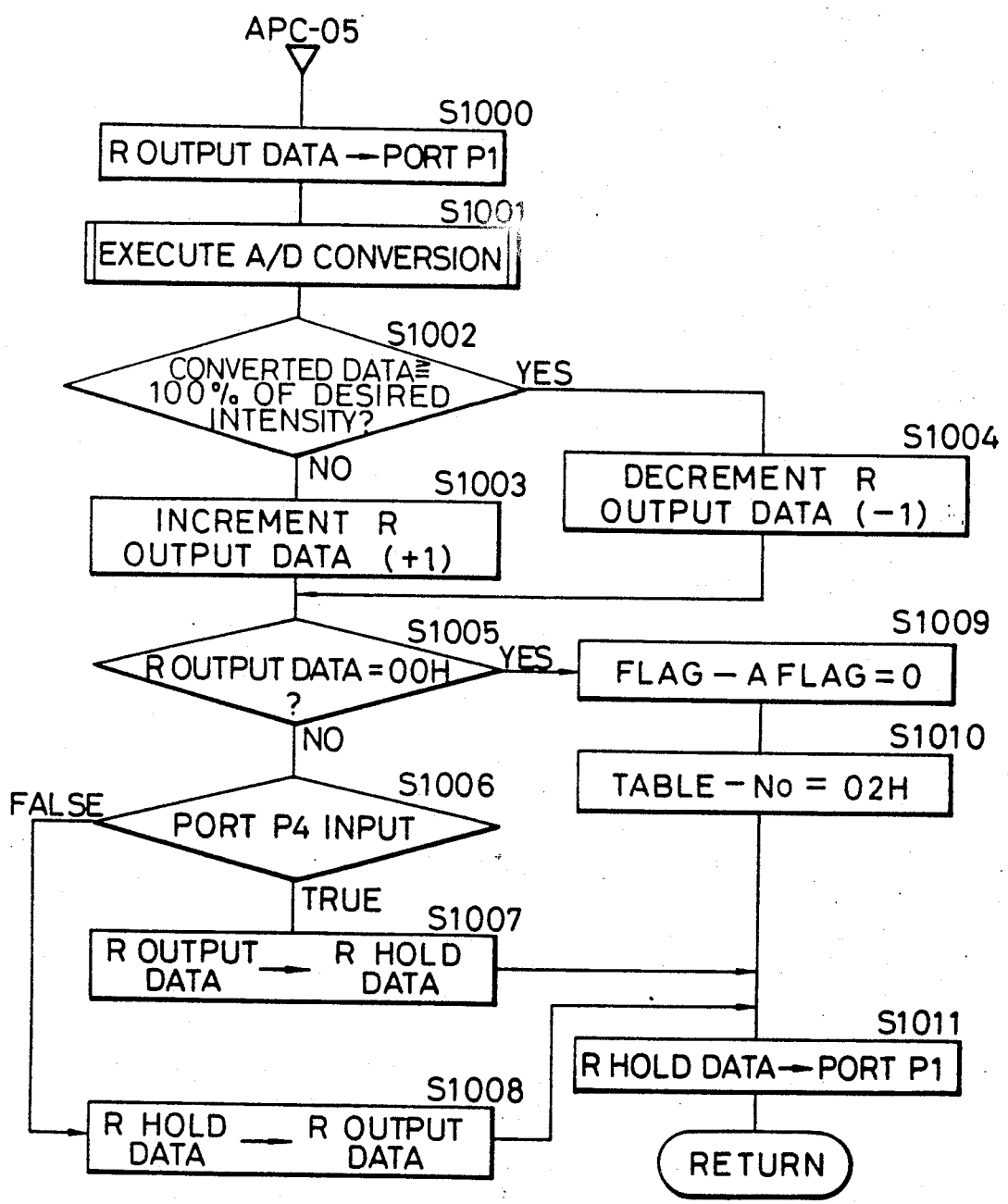
FIG. 20 is a flow chart showing an APC-05 routine in the detailed operation of an eighth embodiment.

An eighth embodiment of the present invention will now be described. In the eighth embodiment, the APC-05 routine is modified, as shown in FIG. 20. Other arrangements are the same as those in the first embodiment, and a detailed description thereof will be omitted.

When the APC-05 routine is designated and skipped by an APC-TABLE call, R output data is output to a port P1 (step S1000). Note that D hold data (80% convergence value) is output to a port P2 as a data output to a rough adjustment D/A converter 2 in the APC-04 routine. In the APC-05 routine, D hold data and D output data for the rough adjustment D/A converter 2 are left unchanged. A feedback voltage obtained when a laser is turned on at a laser drive current $i_L$ determined by the D hold data and the R output data is A/D-converted (step S1001), and the A/D-converted value is compared with desired intensity data (step S1002). If the A/D-converted value is smaller than a 100% value, the R output data value is incremented (step S1003); otherwise, the R output data value is decremented (step S1004). Thus, overflow/underflow of data is checked on the basis of this calculation result (step S1005).

If the calculation result is "00H", a FLAG-A flag is reset (step S1009), and a flag is set to transfer the control to the APC-02 routine (step S1010). The R hold data is output to a port P1 output for a fine adjustment D/A converter 3 (step S1011), and the flow then returns to the main routine. In this manner, the overflow/underflow processing is started from the next APC-TABLE call, as described above. On the other hand, if it is determined in step S1005 that the calculation result is not "00H", a port P4 input is checked (step S1006) to determine whether or not a laser ON state continues from when the control enters this APC-05 routine until the present time, thus judging validity/invalidity of the comparison calculation. If it is determined that the comparison calculation result is valid, the R output data as the comparison calculation result is loaded in an R hold data memory (step S1007), and the flow advances to step S1011. If it is determined that the comparison calculation result is invalid, the R hold data before comparison calculation is loaded in an R output data memory (step S1008) to restore the R output data, and the flow then advances to step S1011.

In step S1011, the R hold data is output to the port P1 for the fine adjustment D/A converter 3. Thus, if the comparison calculation result is valid, the value of the laser drive current $i_L$ is updated; otherwise, it is not updated since data before the comparison calculation is set.

As described above, in a sequence for the 100% convergence value of the eighth embodiment, when a laser ON state continues over a time required for the comparison calculation processing (i.e., when it is determined that comparison calculation is valid), the comparison calculation result is immediately output to the port P1, and a laser is allowed to emit light at the laser drive current $i_L$ based on the output data value until the next comparison calculation result is made valid.

For the 100% convergence value of the eighth embodiment, the data value of the fine adjustment D/A converter 3 is updated for every cycle in which the comparison calculation is made valid. If a laser light intensity is constant, a comparison calculation is made based on the first data value N. If the data value N is equal to or larger than 100%, N−1 is calculated, and the data value becomes smaller than 100% in the next comparison calculation and is restored to N. Contrary to this, if the first data value N is smaller than 100%, N+1 is calculated, and the data value exceeds 100% in the next comparison calculation and is restored to N. That is, even if a laser beam does not drift due to heat or the like, the data value is converged within the range of one step.

If a laser light intensity varies due to a drift of an i-L curve of the laser due to the own heat dissipation, the data value is corrected accordingly in units of steps, and is finally converged within the range of one step. Even if a light intensity changes due to a thermal variation, since the correction time is shorter than the change time, convergence is possible.

Figure 21:
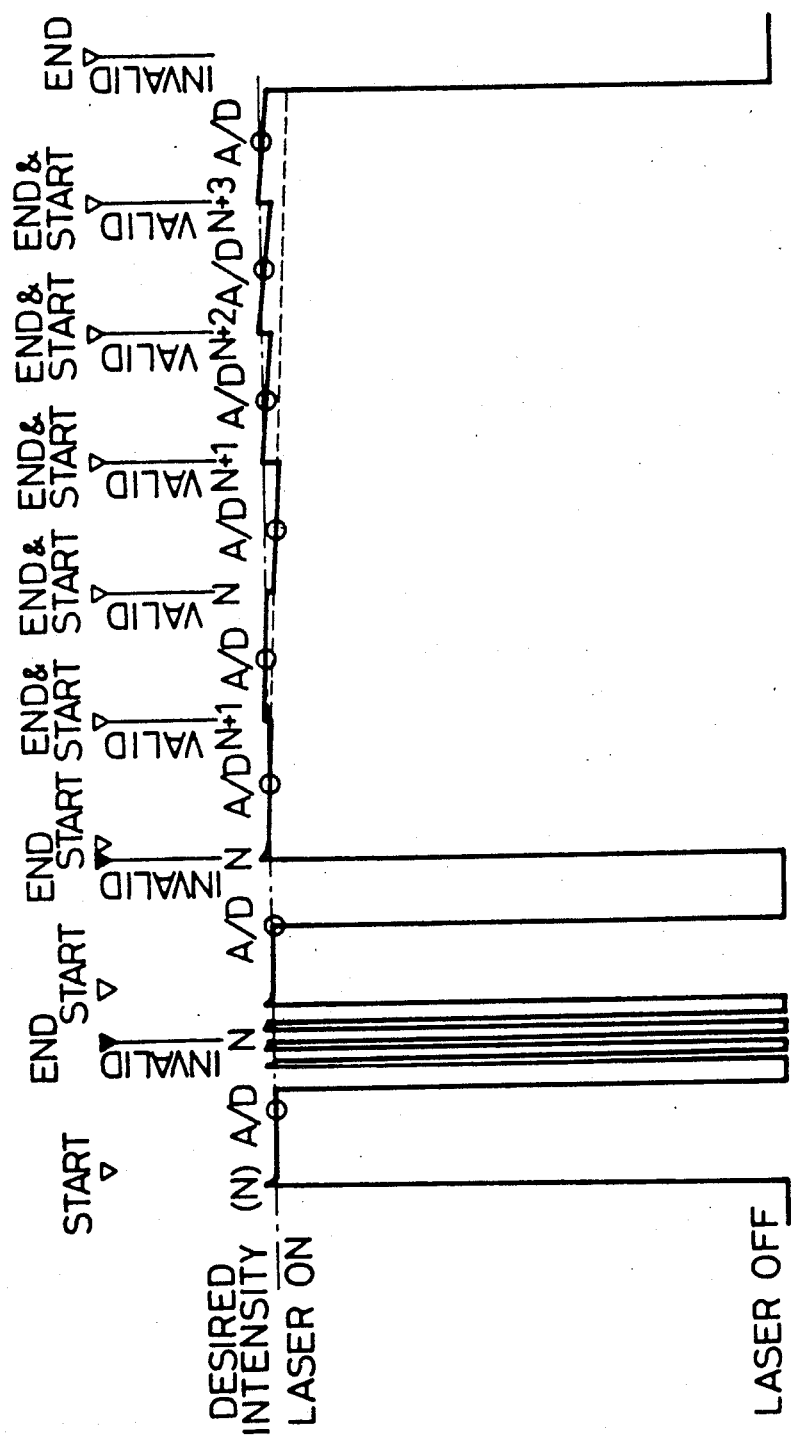
FIG. 21 is a chart showing the relationship between a laser ON state and a correction operation in the eighth embodiment.

As shown in FIG. 21, there is almost no variation in laser light intensity in a laser ON state which is so short as to make the comparison calculation invalid upon completion of the comparison calculation. In a laser ON state which is long enough to make the comparison calculation valid upon completion of the comparison calculation, the next laser light intensity is incremented/decremented by 1 by estimation after a laser light intensity at that time is measured. Assuming that an image signal shown in FIG. 21 is obtained in a line, if correction by the comparison calculation of the eighth embodiment is not performed, a light intensity is decreased in a continuous laser ON state, as indicated by a dotted line. Even if there is no valid comparison calculation result of an image signal in one line, correction of several steps is made by at least one UNBL signal per line, and a decrease in light intensity due to heat does not occur, thus obtaining a stable light intensity.

An amplitude corresponding to one step for converging a light intensity by estimation is a maximum of:

(slope efficiency $\eta_{max}$ × current for one step) ÷

(chip light intensity min × 100) = 3%

Since the value of the slope efficiency $\eta$ of the laser is normally converged to 0.3 mW/mA, the amplitude is 1.5%. Furthermore, since the chip light intensity (TYP) is about 2 mW, the amplitude is essentially 0.75%.

Even if a variation in light intensity of about 3% occurs, it does not pose any problem in the existing laser beam printers.

In the Laser APC of the eighth embodiment, as described above, a light intensity is stabilized by the laser ON state by the UNBL signal in the non-drum region or an image write signal in the drum region without performing the laser ON operation for the Laser APC. Thus, a photosensitive drum can be prevented from being irradiated with a wasteful laser beam. The light intensity stabilization means raises a light intensity to the desired intensity by the UNBL signal, and executes a comparison calculation to maintain the desired intensity. If the means determines that the comparison calculation result is valid, it increments/decrements the next laser drive current $i_L$ by one step by estimation on the basis of the comparison calculation result at that time. More specifically, the means repeats this operation in units of lines while converging the light intensity within the range of one step with respect to the desired light intensity.

Meanwhile, error judgement processing such as life judgement by a laser error, life warning judgement, UNBL error judgement, or the like is executed to prevent the Laser APC operation from being disabled. Light intensity stabilization correction in the Laser APC can be executed without an upper limit by overflow/underflow processing of the fine adjustment D/A converter 3.

NINTH EMBODIMENT

A ninth embodiment of 100% convergence value correction of the above-mentioned Laser APC will be described below.

In the eighth embodiment, when a laser ON state continues over a predetermined period of time and measured data is valid, data is updated regardless of a printing period of an image signal and a paper interval. In the ninth embodiment, the same operation as in the eighth embodiment is executed during image printing. However, in a paper interval, the control is temporarily returned to the APC-02 routine, and a laser light intensity is re-raised from a 80% convergence value up to a desired intensity. With this method, a data value for a fine adjustment D/A converter 3 rarely overflows/underflows. Thus, a data value will not overflow/underflow during image printing.

Figure 22:
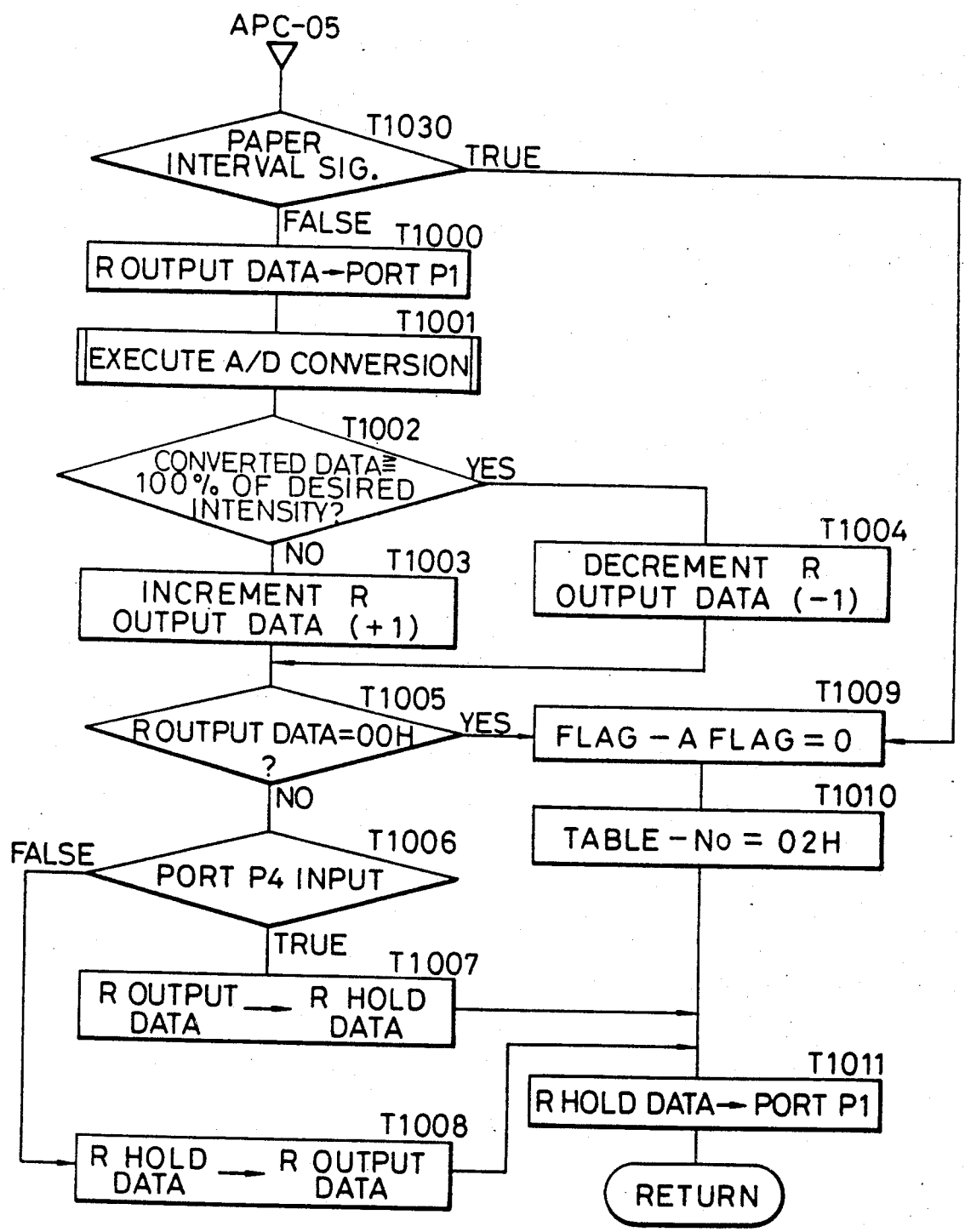
FIG. 22 is a flow chart showing an APC-05 routine according to a ninth embodiment of the present invention.

FIG. 22 is a flow chart showing the APC-05 routine of the ninth embodiment. This flow chart corresponds to the flow chart shown in FIG. 3K in the first embodiment.

When the APC-01 to APC-04 routines are executed by the APC-TABLE call and a laser light intensity is raised to a desired intensity, the control enters the APC-05 routine to execute 100% convergence value correction.

When the control enters the APC-05 routine, it is checked based on a paper interval signal if a paper interval starts (step T1030). If the present state is an image printing state, the flow advances to step T1000, and a control operation as in the first embodiment is executed. If the paper interval is detected, the flow advances to step T1009 to cause the data value of the fine adjustment D/A converter 3 to overflow/underflow. Therefore, since no image signal is present in the paper interval, the control returns to the APC-02 routine in synchronism with the next UNBL signal, and a light intensity is re-raised from the 80% convergence value. However, since the re-raising operation is performed while a light intensity does not vary, it can be essentially achieved by UNBL signals for several lines.

The detailed application of the present invention is not limited to the above-mentioned embodiments, and various modifications may be made.

For example, the present invention may be applied to a system using not a single laser but a plurality of lasers or may be applied to light intensity control of, e.g., a recording apparatus, an optical communication apparatus, or the like using other light-emitting elements. The arrangements of the above embodiments may be combined.

TENTH EMBODIMENT

Figure 23A:
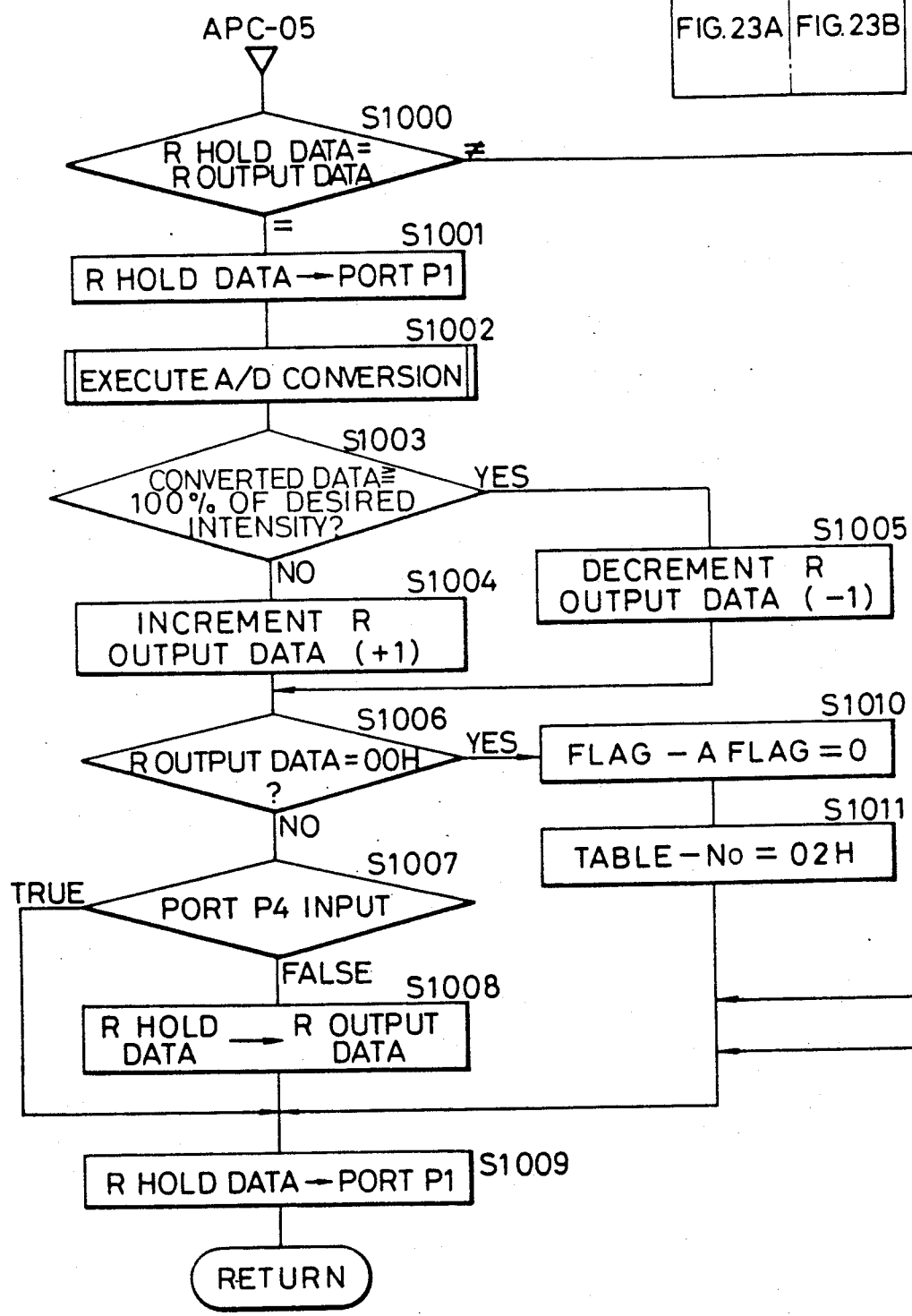
FIGS. 23A and 23B are a flow chart showing an APC-05 routine according to a tenth embodiment of the present invention.
Figure 23B:
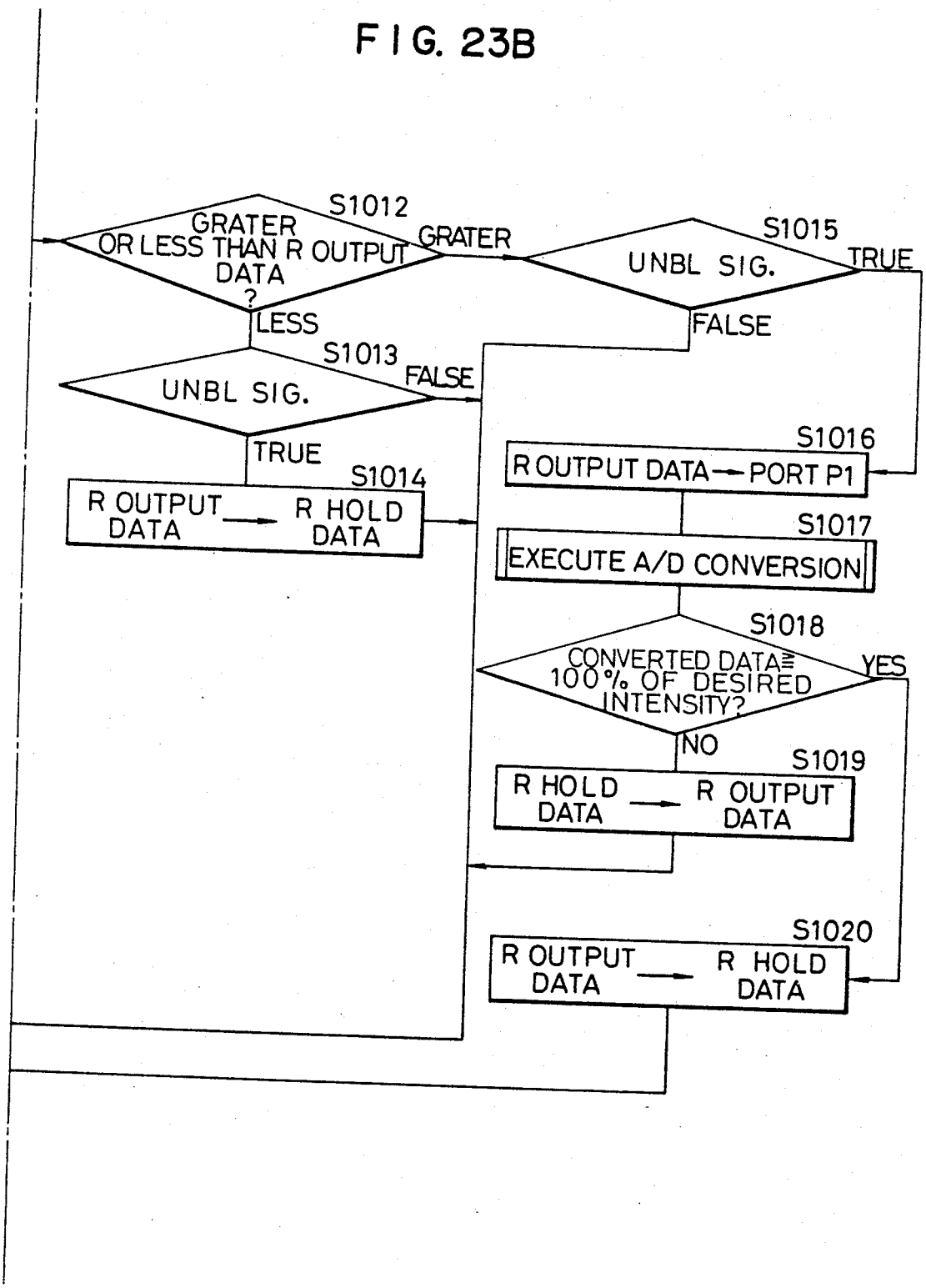

A tenth embodiment of the present invention will now be described. In the tenth embodiment, the APC-05 routine is modified, as shown in FIG. 23. Other arrangements are the same as those in the first embodiment, and a detailed description thereof will be omitted.

In the APC-05 routine of the tenth embodiment, a laser light intensity is controlled to be kept at a level slightly higher than a desired intensity (this level will be referred to as a 100% convergence level hereinafter).

When the APC-05 routine is designated by the APC-TABLE call, R output data and R hold data are compared with each other (step S1000). If these data are equal to each other, the flow advances to step S1012 without a comparison calculation. Note that D hold data (80% convergence value) is output to a port P2 as a data output to a rough adjustment D/A converter 2 in the APC-04 routine. In the APC-05 routine, D hold data and D output data for the rough adjustment D/A converter 2 are left unchanged.

The R hold data is output to a port P2 (step S1001). Thus, a feedback voltage obtained when a laser 8 is caused to emit light at a laser drive current $i_L$ determined by the D hold data and the R output data is A/D-converted (step S1002). The A/D-converted value is compared with desired intensity data (step S1003). As a result, if the A/D-converted value is smaller than a 100% value, the R output data is incremented (step S1004); otherwise, the R output data is decremented (step S1005). Thus, overflow/underflow of data is checked based on the calculation result (step S1006).

If the calculation result is "00H", a FLAG-A flag is reset (step S1010), and a flag is set to transfer the control to the APC-02 routine (step S1011). The R hold data is output to the port P1 for the fine adjustment D/A converter 3 (step S1009), and the flow then returns to the main routine. Thus, overflow/underflow processing is started from the next APC-TABLE call, as described above. On the other hand, if it is determined in step S1006 that the calculation result is not "00H", the flow advances to step S1007, and a port P4 input is checked to determine whether or not a laser ON state continues from when the control enters this APC-05 routine until the present time, thus judging validity of the comparison calculation. If it is determined that the comparison calculation is invalid, the R hold data is loaded in an R output data memory, and the R output data result is canceled (step S1008). A data value of the fine adjustment D/A converter 3 is set as the R hold data, and the flow then returns to the main routine (step S1009). If it is determined that the comparison calculation result is valid, the content of the comparison calculation result is left unchanged as the R output data, and the data value of the fine adjustment D/A converter is set as the R hold data (step S1009). The flow then returns to the main routine.

If it is determined in step S1000 that the R output data is not equal to the R hold data, since there is a comparison calculation data result which is not updated yet, the R hold data which determines the present laser light intensity is compared with the R output data as data after the comparison calculation (step S1012). If the R output data is larger, it is determined that the R hold data is incremented as a result of the comparison calculation. That is, it is determined that the present laser light intensity is lower than the desired intensity, and the control waits until the UNBL signal is input (step S1013). When the UNBL signal is input, data is updated by the R output data value (step S1014), and the updated data is output to the port P1 for the fine adjustment D/A converter 3 (step S1009). On the other hand, if the R output data is smaller (step S1012), it is determined that the R hold data is decremented as a result of the comparison calculation. That is, it is determined that the present laser light intensity is higher than the desired intensity, and the R hold data is latched in step S1009 until the UNBL signal is input (step S1015). When the UNBL signal is input, the R output data is output to the port P1 for the fine adjustment D/A converter 3 (step S1016). A laser light intensity determined by the D hold data and the R output data is compared and measured (steps S1017 and S1018). As a result, if the light intensity is lower than the desired intensity (100%), it is determined that a present light intensity determined by the R hold data is higher than the desired intensity but a light intensity determined by the R output data obtained by decrementing the R hold data by one step is lower than the desired intensity. That is, it is determined that this value is the 100% convergence value. Therefore, in order to cancel the R output data, the R hold data is loaded in the R output data memory (step S1019), and the R hold data as the present light intensity data is kept latched until the UNBL signal of the next line (step S1009). On the contrary, if the result of comparison and measurement in steps S1017 and S1018 is equal to or higher than the desired intensity (100%), it is determined that a present light intensity determined by the R hold data is higher than the desired intensity and a light intensity determined by the R output data obtained by decrementing the R hold data by one step is also higher than the desired intensity. That is, it is determined that the R hold data is higher than the desired value even if it is decremented by at least one step. The R hold data is updated to the value of the R output data, and is latched until the UNBL signal for the next line (step S1020). Note that a laser light intensity is never immediately increased/decreased within several lines except for an error mode such as a laser failure. Therefore, the laser light intensity is stabilized and controlled to be the 100% convergence value, as shown in FIG. 24.

In the tenth embodiment, as described above, when the laser ON state continues over the predetermined period of time t and the comparison calculation result is made valid, comparison and measurement of the 100% convergence value are executed on the basis of a data value of the comparison calculation of the next UNBL signal (content of the R output data). As a result, whether the 100% convergence value is updated to the comparison calculation data (R output data) or is held to be the previous data (R hold data) is determined. Thus, data is latched or updated for a line cycle, so that a laser light intensity is stabilized at a level (100% convergence value) slightly higher than the desired intensity. If a laser beam does not drift, a light intensity is as shown in (1) in FIG. 24. Even if a laser beam is lowered by a thermal drift, the light intensity is corrected as shown in (2) in FIG. 24. Even if a light intensity is largely offset from the desired intensity, it can be corrected to the 100% convergence value within several lines, as shown in (3) or (4) in FIG. 24. Note that since a time of a decrease in light intensity due to thermal drift is sufficiently longer than the 100% convergence value correction time, the light intensity can be satisfactorily corrected by an operation shown in (1) or (2) in FIG. 24. That is, laser beam drift caused by long-term use can be corrected step by step within a short cycle.

In the tenth embodiment, the comparison calculation is made by one UNBL signal per line even if a laser ON state by an image signal does not continue over the predetermined period of time t. However, the comparison measurement in this case is executed by the next UNBL signal. Therefore, a light intensity is corrected by one step of the fine adjustment D/A converter 3 in two lines. However, as compared to a case wherein a comparison calculation is made in an image signal period and a comparison measurement is performed by the UNBL signal, no problem is posed on execution of the 100% convergence value correction even if a thermal drift occurs.

As described above, in the tenth embodiment, a light intensity is stabilized by the laser ON state by the UNBL signal in the non-drum region or an image write signal in the drum region without performing the laser ON operation for the Laser APC. The light intensity stabilization means raises a light intensity to the desired intensity by the UNBL signal, and compares and measures the comparison calculation result obtained in the immediately preceding line in synchronism with the UNBL signal of the line to determine if data is to be updated. Thus, a light intensity can be converged to the 100% convergence value within one line cycle or several line cycles. This operation is repeated to control the light intensity.

Meanwhile, error judgement processing such as life judgement by a laser error, life warning judgement, UNBL error judgement, or the like is executed to prevent the Laser APC operation from being disabled. Light intensity stabilization correction in the Laser APC can be executed without an upper limit by overflow/underflow processing of the fine adjustment D/A converter 3.

In the tenth embodiment, when data obtained by the comparison calculation (content of the R output data) is larger than data before the comparison calculation (R hold data), data is updated without comparison measurement since it is determined that a light intensity is lowered. However, a comparison measurement may be uniquely executed regardless of a data level in the comparison calculation to determine whether or not data is to be updated.

ELEVENTH EMBODIMENT

In this embodiment, a modification of the method of raising the Laser APC will be described below.

Figure 25A:
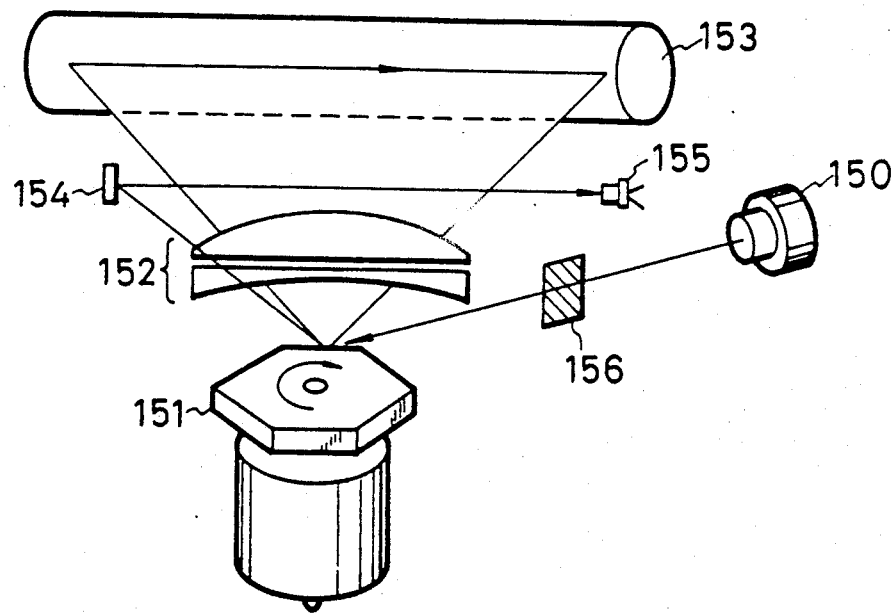
FIG. 25A is a schematic view partially showing an optical system arranged in an eleventh embodiment of the present invention.
Figure 25B:
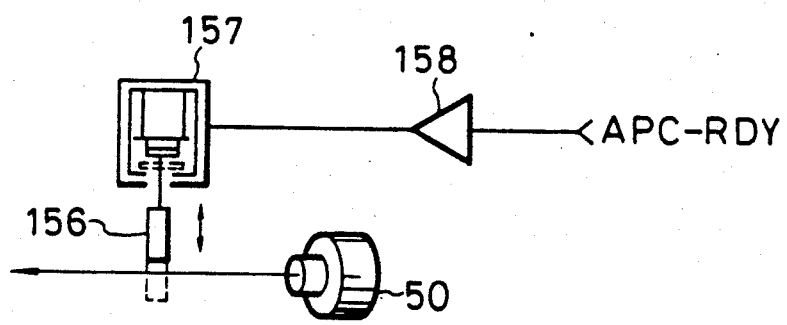
FIG. 25B is a schematic side view showing an arrangement and operation of a shutter arranged in the optical system shown in FIG. 25A.
Figure 26A:
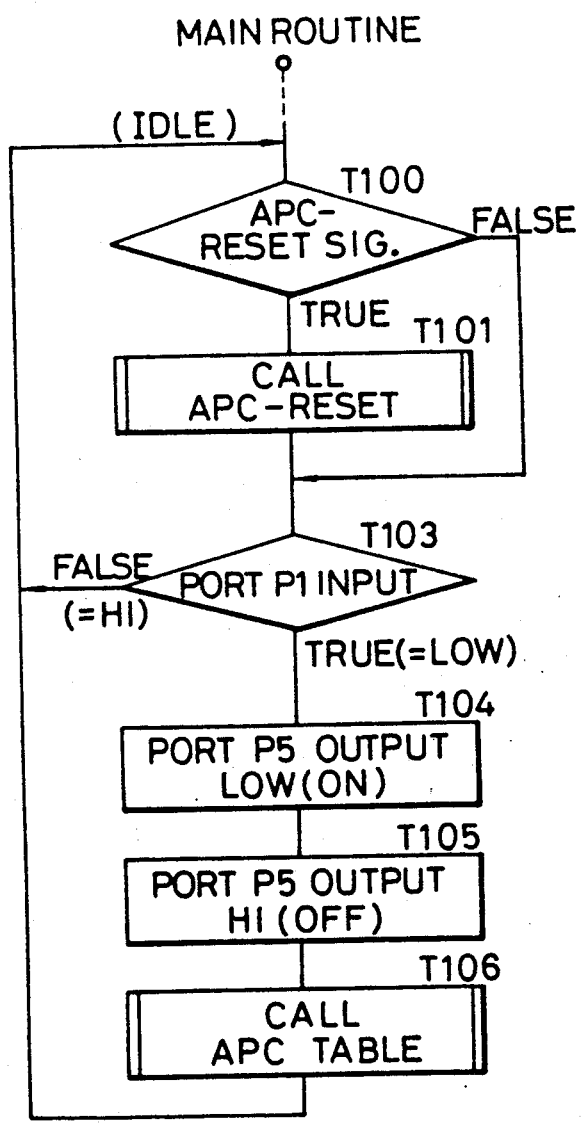
FIG. 26A is a flow chart showing a main routine of the eleventh embodiment.
Figure 26B:
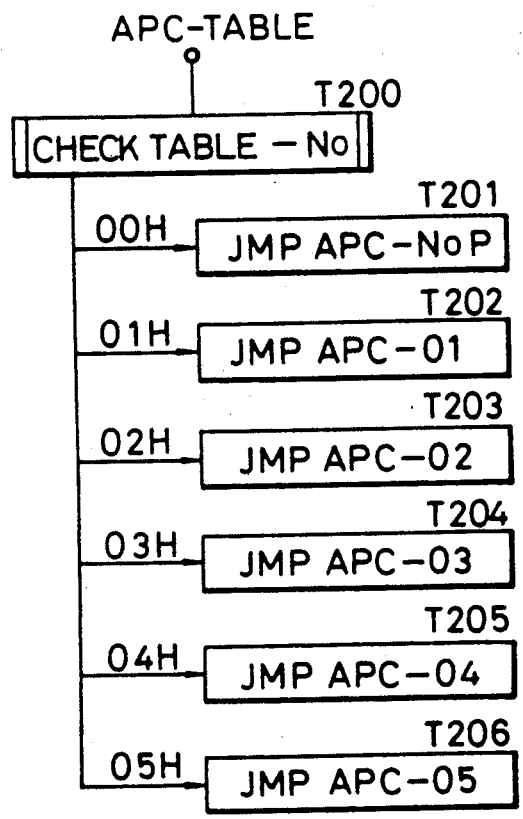
FIG. 26B is a flow chart showing an APC-TABLE call routine of the eleventh embodiment.
Figure 26C:
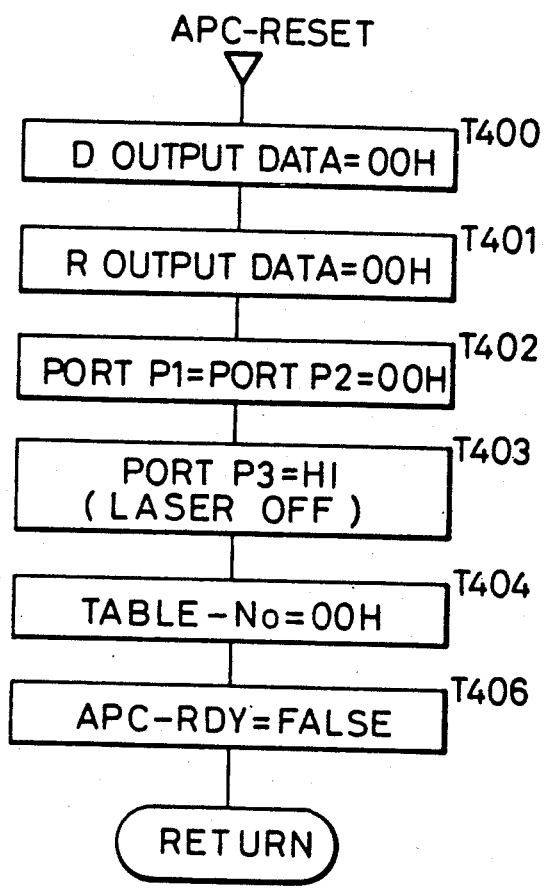
FIG. 26C is a flow chart showing an APC-RESET routine in the detailed operation of the eleventh embodiment.
Figure 26D:
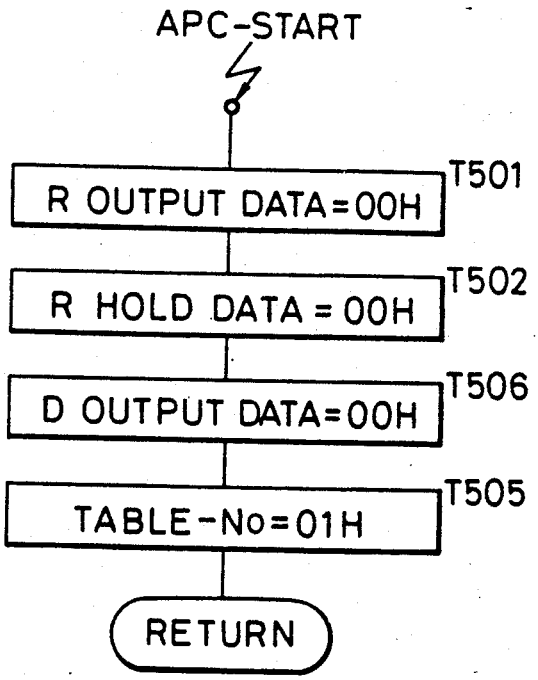
FIG. 26D is a flow chart showing an APC-START routine in the detailed operation of the eleventh embodiment.
Figure 26E:
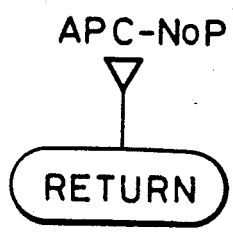
FIG. 26E is a flow chart showing an APC-NOP routine in the detailed operation of the eleventh embodiment.
Figure 26F:
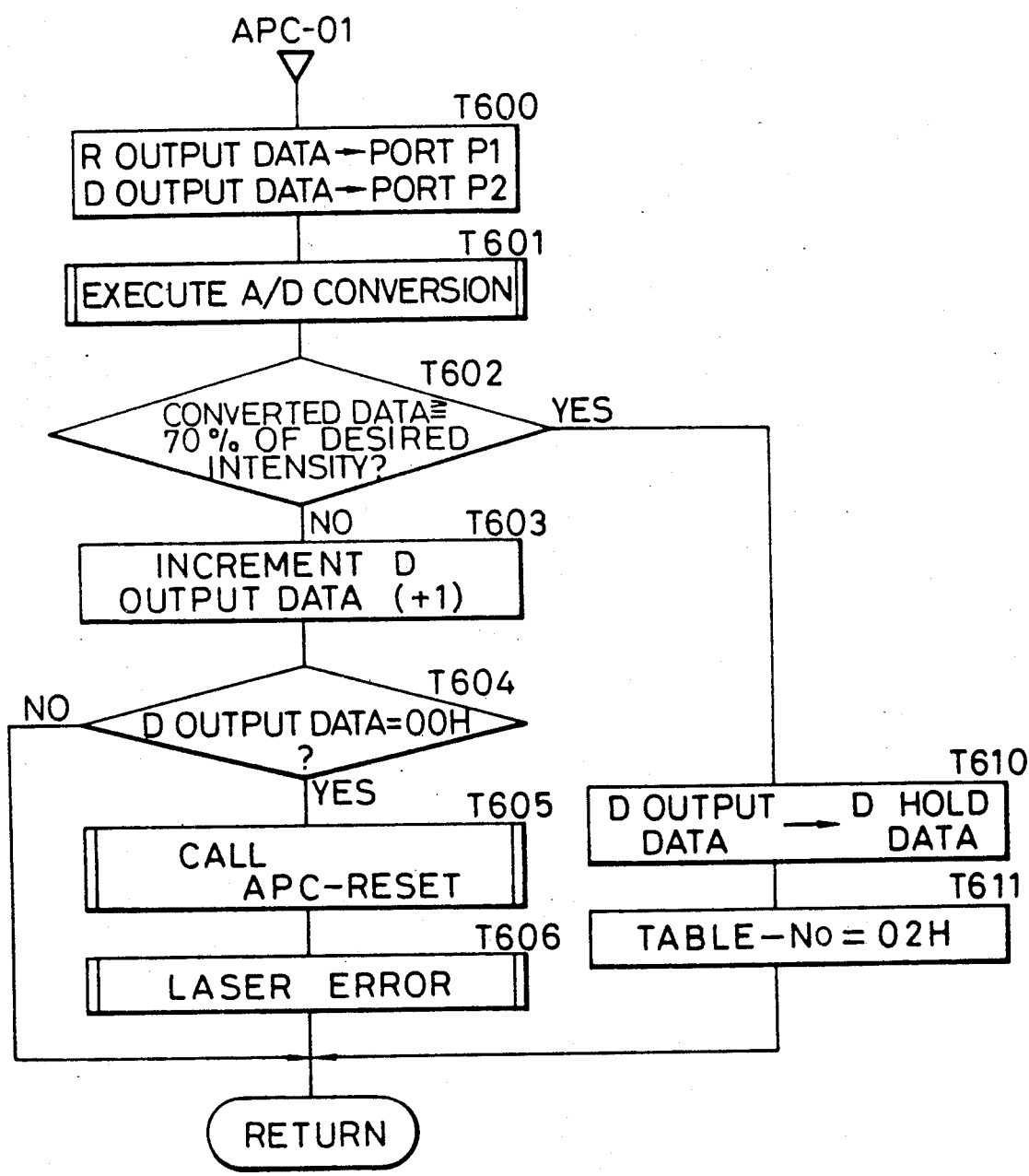
FIG. 26F is a flow chart showing an APC-01 routine in the detailed operation of the eleventh embodiment.
Figure 26G:
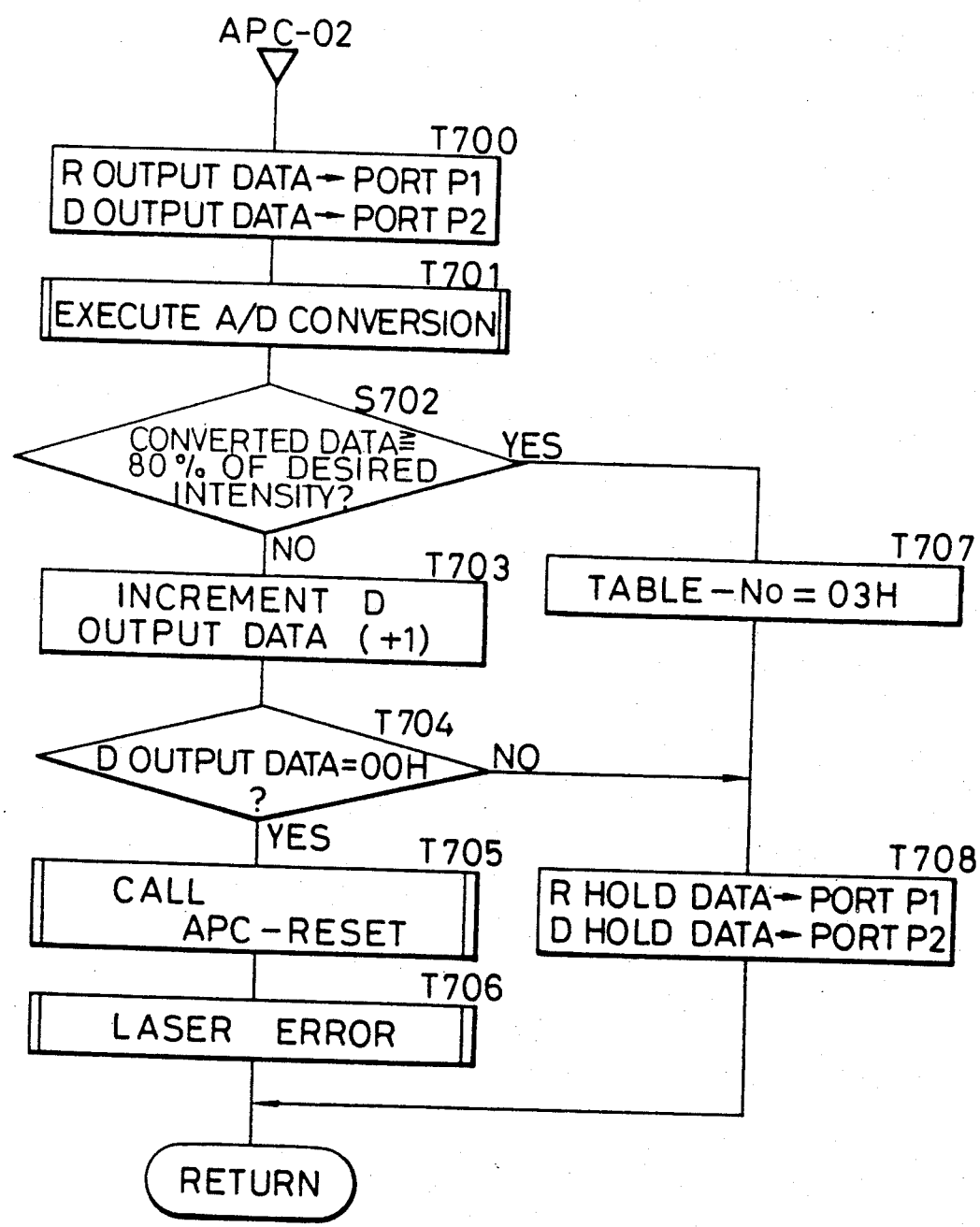
FIG. 26G is a flow chart showing an APC-02 routine in the detailed operation of the eleventh embodiment.
Figure 26H:
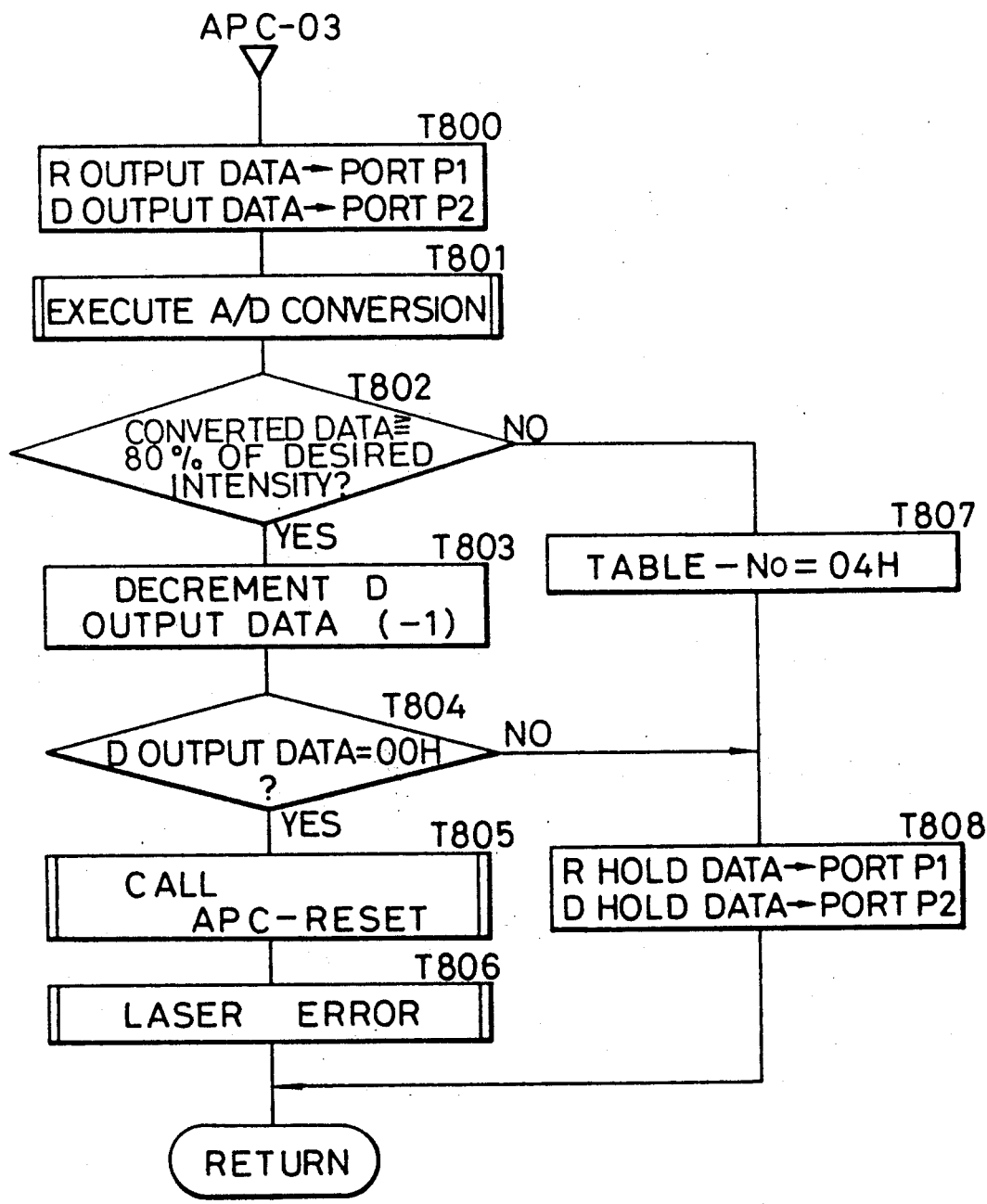
FIG. 26H is a flow chart showing an APC-03 routine in the detailed operation of the eleventh embodiment.
Figure 26I:
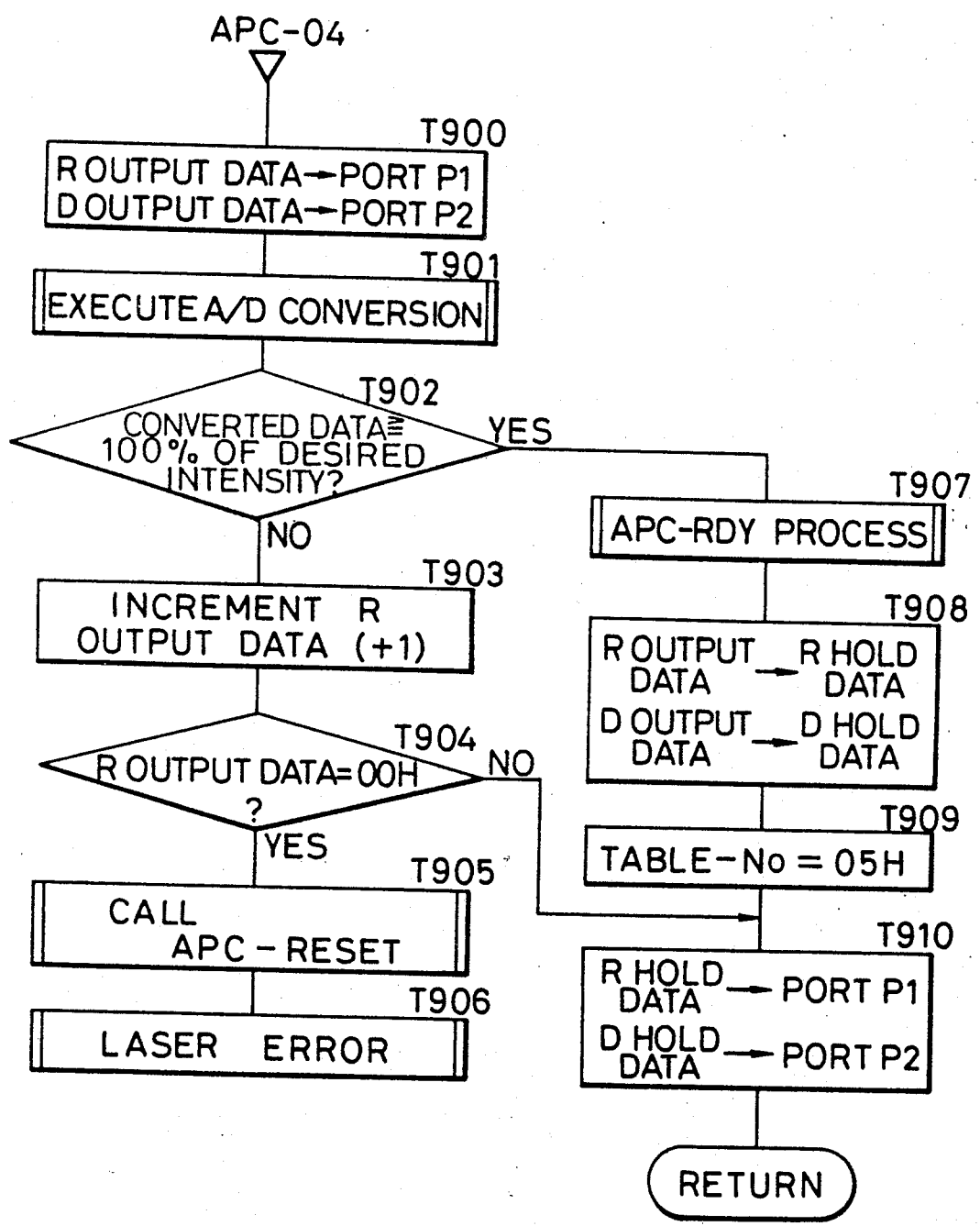
FIG. 26I is a flow chart showing an APC-04 routine in the detailed operation of the eleventh embodiment.

In order to explain the eleventh embodiment, an arrangement shown in FIGS. 25A and 25B are added.

FIG. 25A shows an optical system of a laser beam printer.

The optical system includes a laser unit 150, a scanner unit 151, and f-$\theta$ lens 152, a shutter 156, and the like.

The laser unit incorporates a semiconductor laser, a collimator lens, and the like. The scanner unit 151 is constituted by a polygonal mirror, a scanner motor, and the like, and scans a laser beam emitted from the laser unit 150 onto a photosensitive drum 153.

The f-$\theta$ lens 152 focuses the laser beam scanned by the scanner unit 151 onto the photosensitive drum 153. The above-mentioned BD signal is generated by a reflection mirror 154 and a light-receiving element 155.

The shutter 156 is arranged between the laser unit 150 and the scanner unit 151. The shutter 156 is opened/closed by a solenoid clutch 157, as shown in FIG. 25B. More specifically, when the solenoid clutch 157 is energized, the shutter 156 is opened, and a laser beam from the laser unit 150 can be transmitted to the scanner unit 152. When the solenoid clutch 157 is deenergized, the shutter 156 is closed to shield the laser beam from the laser unit 150 so as not to transmit the laser beam to the scanner unit 152. The solenoid clutch 157 is controlled by an APC-RDY signal output from a CPU 1 through a driver IC 158. In this embodiment, when the APC-RDY signal is at TRUE level, the solenoid clutch 157 is energized to open the shutter 156. When the APC-RDY signal is at FALSE level, the shutter 156 is closed.

The method of raising the Laser APC in the laser beam printer with the above arrangement will be described below.

FIGS. 26A to 26I are flow charts showing a rise sequence of the Laser APC (excluding the APC-05 routine) in the eleventh embodiment.

As compared to the tenth embodiment, since the operation for raising the Laser APC is executed without using the UNBL signal, the interrupt routine shown in FIG. 3C is omitted as the feature of this embodiment.

When an APC-RESET signal is at TRUE level, an APC-RESET routine is executed in step T101 in the main routine. In this case, since the APC-RDY signal is set at FALSE level in step T406 in FIG. 26C, the shutter 156 is kept closed. When the APC-RESET signal from a controller goes to FALSE level, and an APC-START signal goes to TRUE level, a UNBL signal is changed to a continuous level signal until the BD signal is input, and at the same time, a video signal causes a continuous laser ON state in synchronism with the UNBL signal. Thus, the CPU 1 repetitively executes a loop of steps T103→T104→T105→T106→T100→T103, . . . in the main routine. Thus, an APC-TABLE is almost successively called (step T106).

Upon APC-TABLE call, the Laser APC control advances to the APC-01, APC-02, APC-03, and APC-04 to continuously raise a light intensity.

In the APC-01 routine, a light intensity is raised to 70% of a desired intensity. When this raising operation is completed, the control is transferred to the APC-02 routine, and then is transferred to the APC-03 routine. As a result, a data value of a rough adjustment D/A converter 3 is determined.

Then, when the control is transferred to the APC-04 routine, and a light intensity is raised to the desired intensity by a fine adjustment D/A converter 3, the APC-RDY signal goes to TRUE level. As a result, the shutter 156 is opened. In this manner, the laser beam is scanned by the scanner unit 151, the BD signal is output, and a laser OFF state is set. Thereafter, the Laser APC is executed in the APC-05 routine, as described above.

In the eleventh embodiment, the Laser APC is raised while the laser is kept ON. However, the laser beam is shielded by the shutter 156, and is not radiated on the photosensitive drum. The laser beam is kept shielded by the shutter 156 until the Laser APC rises. When the laser beam reaches the desired intensity, the shutter 156 is opened. Therefore, during the operation for raising the Laser APC, no laser beam is radiated on the photosensitive drum.

In the eleventh embodiment, the UNBL signal is unnecessary. However, since the UNBL signal is used in the APC-05 routine, a UNBL signal line is connected to the input port of the CPU 1. However, UNBL signal error processing during the operation for raising the Laser APC can be omitted. In addition, an interrupt routine by the UNBL signal is also omitted.

The detailed structure of the shutter 156 arranged in the eleventh embodiment is not particularly limited to the illustrated one. For example, the shutter may be arranged behind the f-$\theta$ lens 152. When the shutter is closed, a laser beam to the photosensitive drum 153 and the reflection mirror 154 can be shielded. The laser unit 150 may incorporate a shutter used in, e.g. , a camera.

In a laser beam printer having no shutter, when the Laser APC is raised in the sequence shown in FIGS. 26A to 26I, the APC-TABLE is successively called in the main routine until the UNBL signal is generated. After the UNBL signal is input, the APC-TABLE is called for UNBL cycles, and a laser intensity can be raised. However, in this case, data validity must be checked after A/D conversion like in the APC-05 routine. Since this operation is achieved for loop cycles, the APC-TABLE is not always called immediately after the UNBL signal goes to TRUE level. Therefore, the laser OFF state may be set during A/D conversion.

In the eleventh embodiment, if there is data obtained when the light intensity was previously raised like in the above embodiment, the raising operation may be performed based on the previous data without using the shutter.

The detailed application of the present invention is not limited to the above-mentioned embodiments, and various modifications may be made.

For example, the present invention may be applied to a system using not a single laser but a plurality of lasers or may be applied to light intensity control of, e.g., a recording apparatus, an optical communication apparatus, or the like using other light-emitting elements. The arrangements of the above embodiments may be combined.

TWELFTH EMBODIMENT

A modification of the above-mentioned overflow-underflow processing of the fine adjustment D/A converter 3 will be described below.

In the tenth embodiment, when a data value of the fine adjustment D/A converter 3 overflows/underflows during correction to a 100% convergence value by the Laser APC, the control immediately returns to the APC-02 routine while the present laser drive current $i_L$ is latched, and re-correction is executed by overflow/underflow processing. In the twelfth embodiment, when the data value of the fine adjustment D/A converter 3 overflows/underflows, the control waits until the next paper interval and then executes the overflow/underflow processing.

The twelfth embodiment will be described in detail below with reference to FIGS. 27 and 28.

Figure 27A:
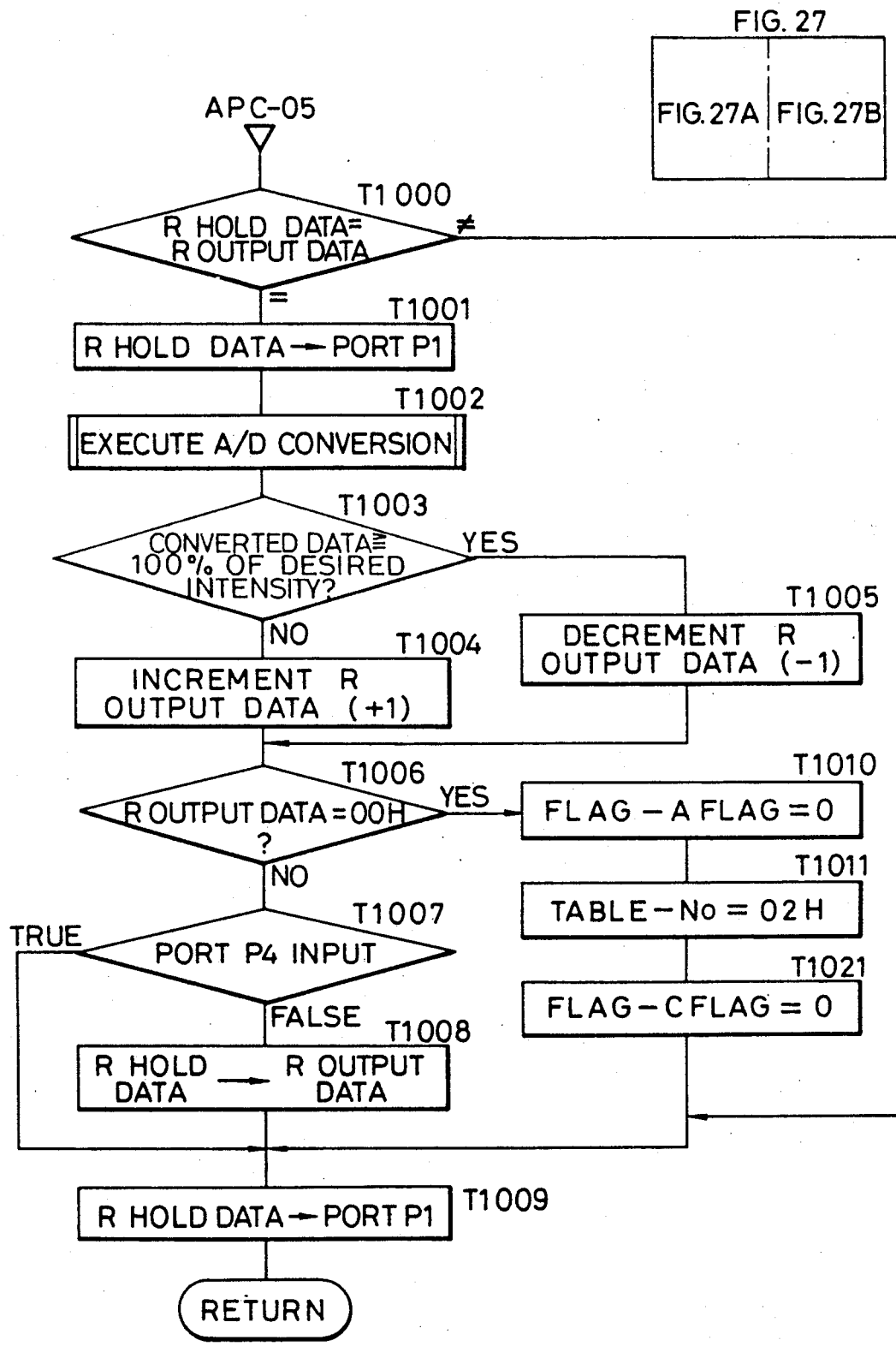
FIGS. 27A and 27B are a flow chart showing an APC-05 routine according to a twelfth embodiment of the present invention.
Figure 27B:
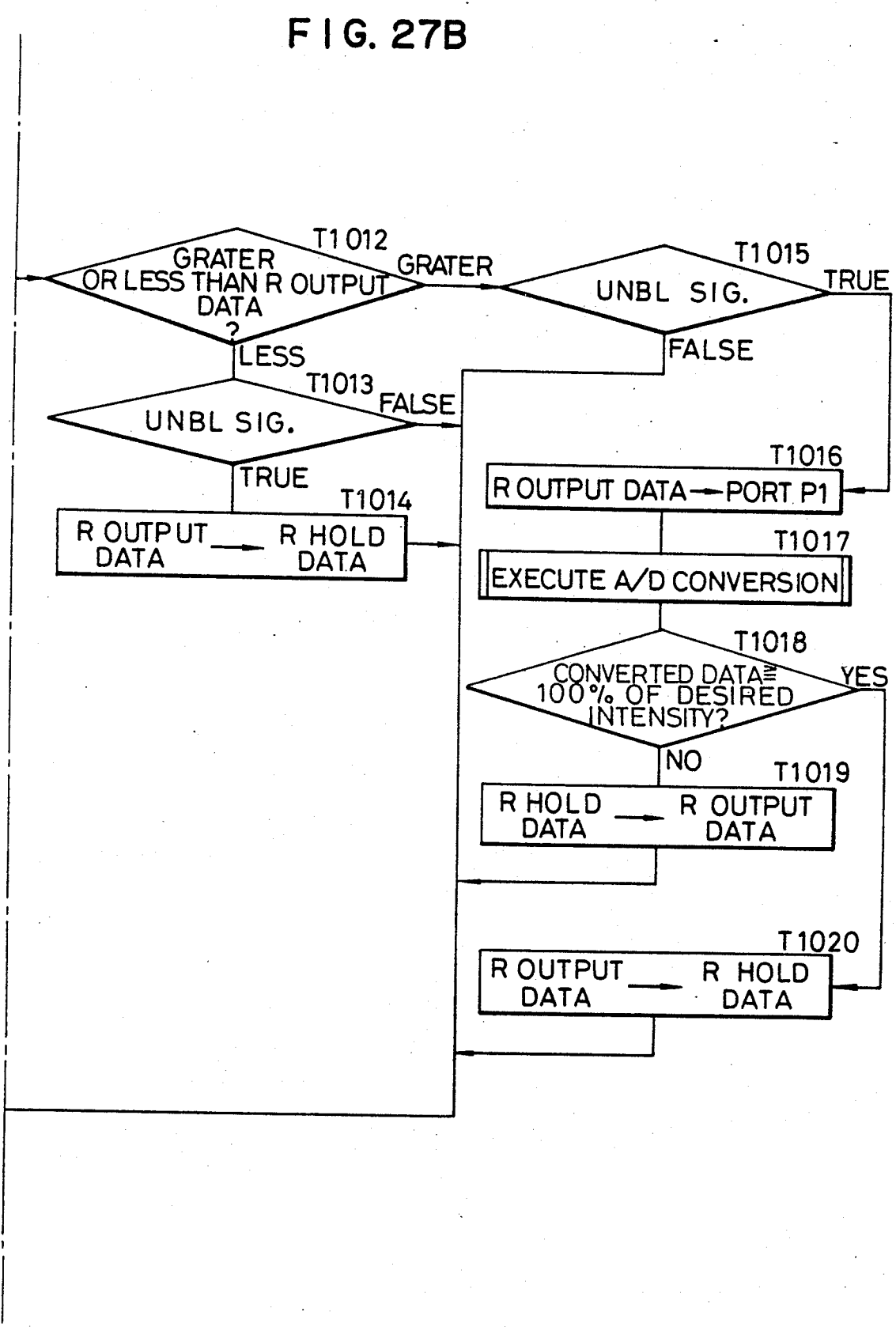
Figure 28:
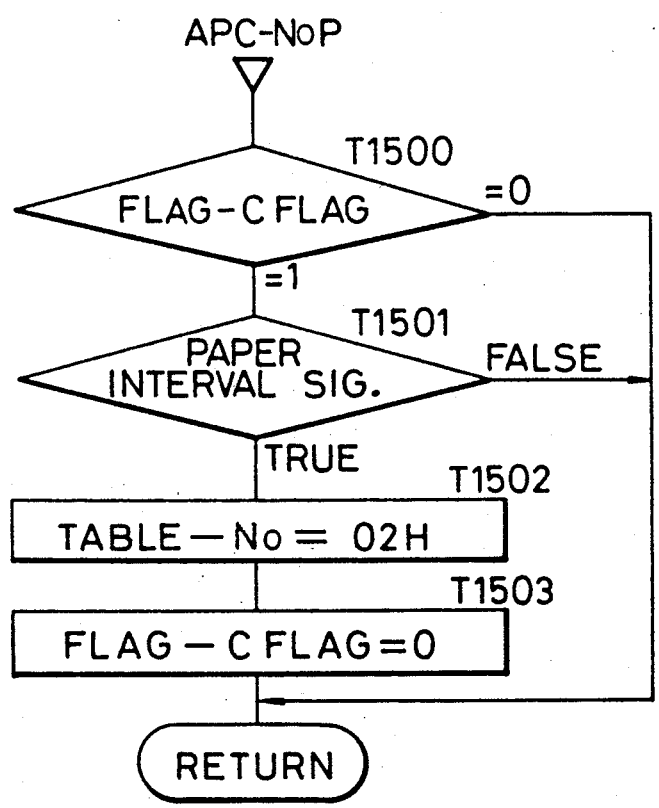
FIG. 28 is a flow chart of an APC-NOP routine of the twelfth embodiment.

Note that FIG. 27 corresponds to the APC-05 routine shown in FIG. 23, and FIG. 28 corresponds to the APC-NOP routine shown in FIG. 3F. Other flow charts are the same as those in the first embodiment.

When a laser light intensity has reached a desired intensity by the operation for raising the Laser APC, 100% convergence value correction is performed. When R output data as data of the fine adjustment D/A converter 3 overflows/underflows (step T1006), a FLAG-A flag is reset to "0" (step T1010). Thus, the APC-TABLE is called in only the interrupt routine by the UNBL signal. A TABLE-NO flag is set to be "00H"(to designate the APC-NOP routine) (step T1011), a FLAG-C flag is set to be "1", and the flow then returns (steps T1021 and T1009). With the above processing, if it is determined that data overflows/underflows, the control is transferred to the APC-NOP routine. Thus, the APC-NOP routine is called by the next APC-TABLE call. When the control enters the APC-NOP routine, the FLAG-C flag is checked (step T1500). Since this flag is set when data overflows/underflows, this routine normally terminates by only call-→return. When the APC-NOP routine is called by data overflow/underflow, since the FLAG-C flag is set, a paper interval signal is then checked (step T1501). That is, when data overflows/underflows during printing, data at that time is held in the APC-05 routine, and the APC-TABLE waits in the APC-NOP routine until the next paper interval. When the paper interval starts, the TABLE-NO flag is set to be "02H" to transfer the APC-TABLE to the APC-02 routine (step T1502), and the FLAG-C flag is cleared to "0" (step T1503). The flow then returns to the main routine. The control is transferred to the APC-02 routine by the APC-TABLE call of the interrupt routine by the UNBL signal, and the data values of the D/A converters are set again as in the tenth embodiment.

Therefore, in the twelfth embodiment, the overflow/underflow processing of the fine adjustment D/A converter 3 is executed in only the paper interval.

With the arrangement of each embodiment described above, even if data for the fine adjustment D/A converter overflows/underflows during the Laser APC, the overflow/underflow conversion processing of each D/A converter can be performed without immediately varying a laser light intensity. More specifically, for D/A converter 2 is "60H", and the data value of the fine adjustment D/A converter 3 becomes "FFH" and overflows, the data value is corrected while the following data is recorded and held:

$$(0.5\ mA/step \times 60H) + (0.05\ mA/step \times FFH) = 60.75\ mA$$

For example, when the data value of the rough adjustment D/A converter 2 is "70H", and the data value of the fine adjustment D/A converter 3 becomes "5FH", the laser drive current is:

$$(0.5\ mA/step \times 70H) + (0.05\ mA/step \times 5FH) = 60.75\ mA$$

Thus, the laser drive current is left unchanged, and correction of the Laser APC by the fine adjustment D/A converter 3 can be continued. In this manner, the overflow/underflow processing of the fine adjustment D/A converter 3 can be executed without forming a conspicuous image density nonuniformity, the Laser APC correction can be semipermanently executed without being disabled or interrupted.

The detailed application of the present invention is not limited to the above-mentioned embodiments, and various modifications may be made.

For example, the present invention may be applied to a system using not a single laser but a plurality of lasers or may be applied to light intensity control of, e.g., a recording apparatus, an optical communication apparatus, or the like using other light-emitting elements. The arrangements of the above embodiments may be combined.

THIRTEENTH EMBODIMENT

Figure 29:
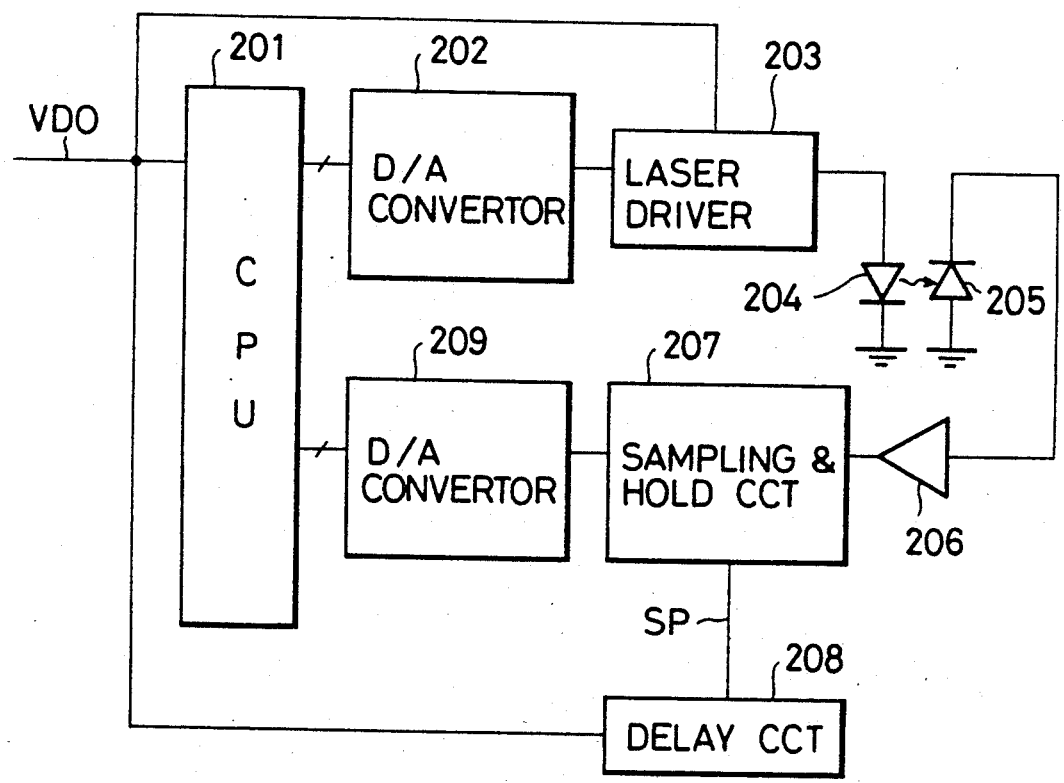
FIG. 29 is a block diagram for explaining an arrangement of an image recording apparatus according to a thirteenth embodiment of the present invention.
Figure 30:
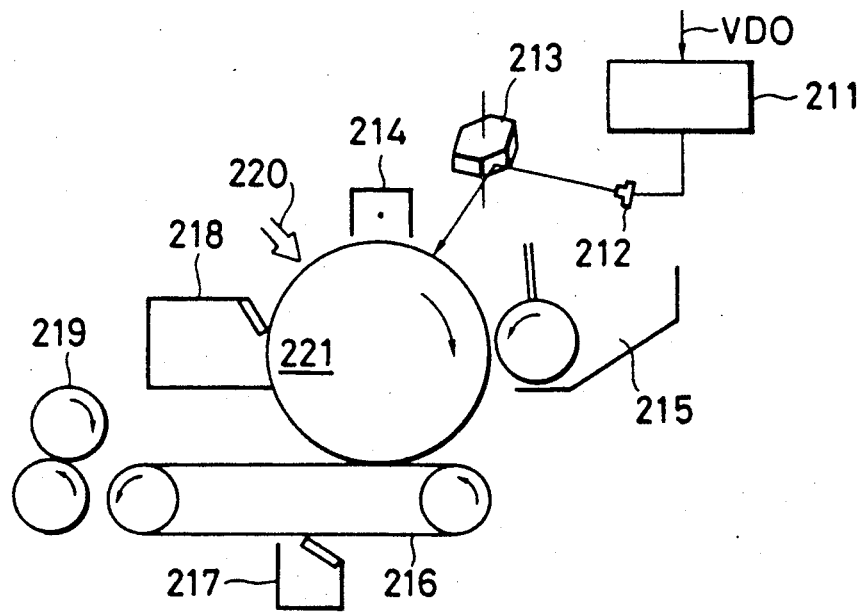
FIG. 30 is a schematic view showing a laser beam printer to which the present invention is applied.
Figure 31:
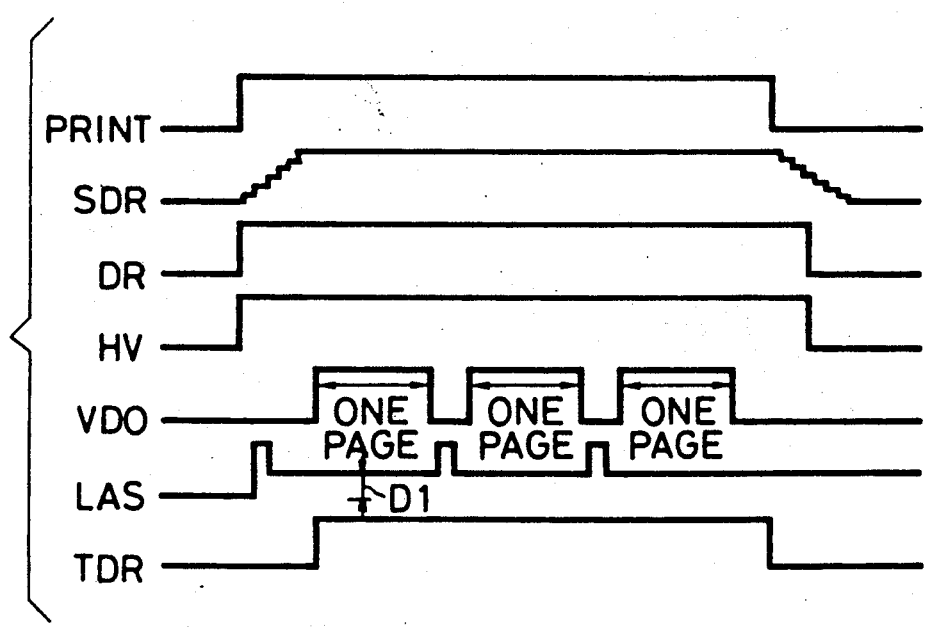

FIG. 29 is a block diagram for explaining an arrangement of an image recording apparatus according to a thirteenth embodiment of the present invention. A CPU 201 controls a laser driver 203 through a D/A converter 202 to perform image recording processing of input image data VDO on the basis of a control program stored in a ROM (not shown). A semiconductor laser 204 as a semiconductor light-emitting element focuses a laser beam which is ON/OFF-modulated on the basis of the input image data VDO on a photosensitive drum 221, as shown in FIG. 30.

A photodiode 205 as a light-receiving element receives a back beam of the laser beam emitted from the semiconductor laser 204, and outputs an analog light intensity signal according to the received light intensity to a sample-hold circuit 207 through an amplifier 206. Note that the sample-hold circuit 207 samples and holds the analog light intensity signal output from the amplifier 207 in synchronism with a sampling pulse SP delayed by a predetermined period of time by a delay circuit 208 after the image data VDO rises. Thus, a peak value of an emission intensity of the laser beam emitted from the semiconductor laser 204 at a recording pixel can be held.

An A/D converter 209 converts the emission intensity value during image recording, which is output from the sample-hold circuit 207, into a digital signal, and outputs a plurality of emission intensity values monitored during image recording to the CPU 201.

The components 201 to 209 constitute a light output adjusting circuit and a light intensity correction circuit.

the semiconductor laser 204 is adjusted to a predetermined intensity by the light output adjusting circuit. Thereafter, light intensity correction is performed in units of pages corresponding to image data. More specifically, the light intensity correction circuit corrects the emission intensity of a light beam (laser beam in this embodiment) in units of pages on the basis of the emission intensity values of the light beam detected by the photodiode 5 during image recording so that the emission intensity of the laser beam radiated from the semiconductor laser 204 becomes a predetermined intensity. For this reason, during continuous image recording, the Laser APC is not operated, and only correction processing of the emission intensity adjusted by the Laser APC is performed, thus limiting consumption of a developing agent (toner) and reducing a toner recovery load on a cleaner.

FIG. 30 shows an arrangement of a laser beam printer to which the present invention is applied. In FIG. 30, a controller unit 211 comprises the light intensity correction circuit and the light output adjusting circuit shown in FIG. 29. The controller unit 211 adjusts and corrects the emission intensity of a laser beam radiated from the laser unit 212, and ON/OFF-modulates the laser beam on the basis of the input image data VDO. A polygonal mirror 213 deflects the laser beam radiated from the laser unit 212, and forms an image on the photosensitive drum 221 which is rotated in the direction of an arrow in FIG. 30. A primary charger 214 uniformly charges the surface of the photosensitive drum 221 which is neutralized by a pre-exposure beam 220. A developing unit 215 drives a developing sleeve to cause toner as a developing agent to become attached to an electrostatic latent image (an exposed region corresponds to a developing target due to image exposure) on the photosensitive drum 221 in a non-contact manner, thus executing a developing operation.

The developed toner image is transferred onto a recording medium conveyed by a transfer belt 216. The transfer belt 216 conveys the recording medium to a fixing device 219 after image transfer. A belt cleaner 217 recovers a residual toner from the transfer belt 216. A cleaner 218 recovers a residual toner from the photosensitive drum 221.

Emission intensity adjustment and correction processing will be described below with reference to FIGS. 29 to 31.

Figure 31:
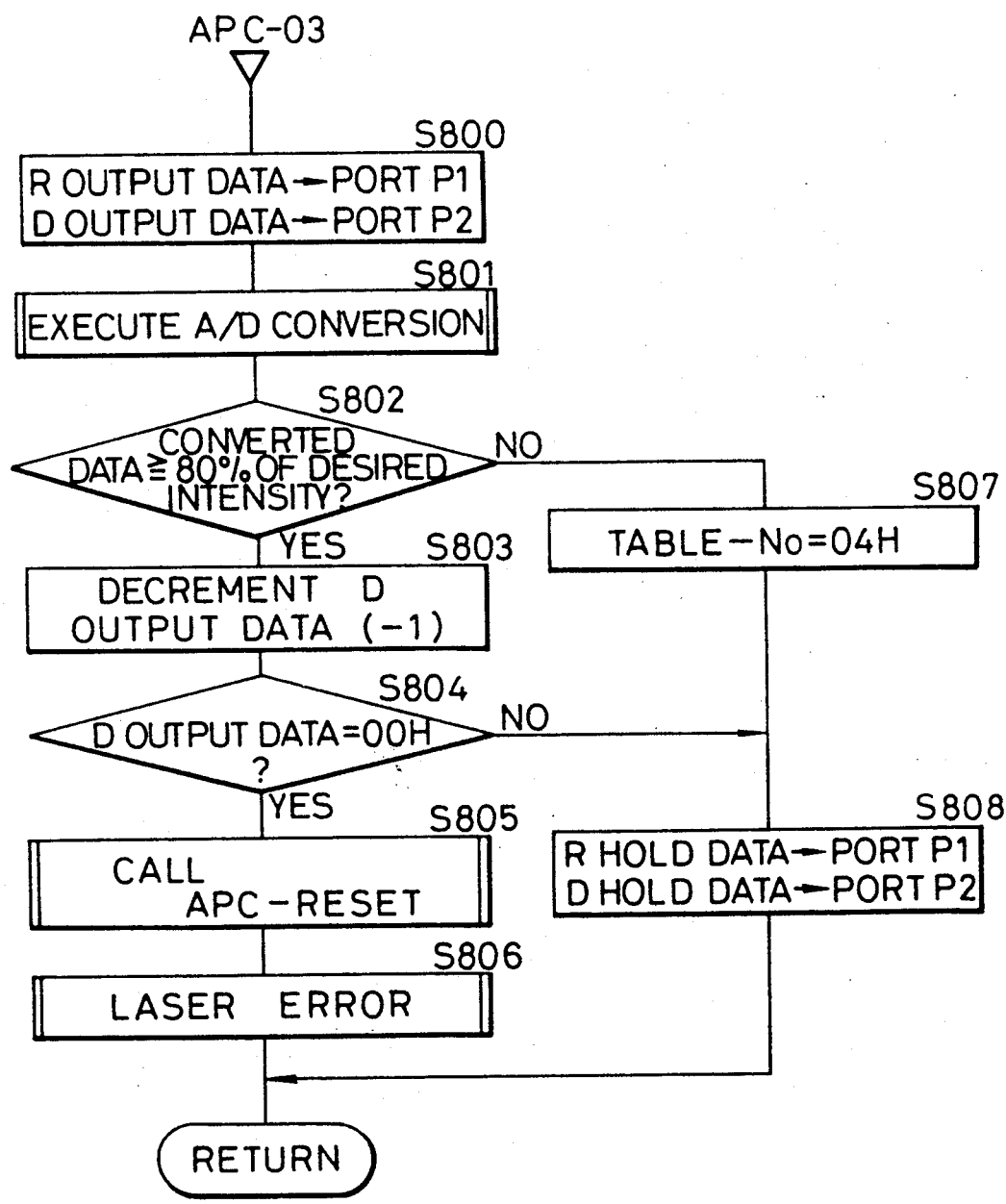
FIG. 31 is a timing chart for explaining operation timings of respective units shown in FIG. 29.

FIG. 31 is a timing chart for explaining operation timings of the respective units shown in FIG. 29. In FIG. 31, a print signal PRINT is output from a host computer (not shown). A scanner rotational speed signal SDR gradually rises, and then reaches a level corresponding to a predetermined rotational speed. In synchronism with a drum drive signal DR, rotation of the photosensitive drum 221 is started.

The primary charger 214 uniformly charges the photosensitive drum 221 on the basis of a high-voltage signal HV. An intensity correction signal LAS rises upon every division of image data VDO in units of pages, and performs light intensity control after the Laser APC described above. When a developing sleeve drive signal TDR rises, the rotation of the developing sleeve is started.

When the print signal PRINT is supplied to the controller unit 211 of the printer apparatus, the photosensitive drum 221 is started to be rotated in the direction of the arrow (see the drum drive signal DR). At this time, the surface potential of the drum is temporarily neutralized by the pre-exposure beam 220, and the drum is then uniformly charged to a predetermined potential by the primary charger 214 (in synchronism with the leading edge of the high-voltage signal HV). Parallel to these operations, although the rotation of the polygonal mirror 213 is started by a scanner motor (not shown), the mirror 213 cannot immediately reach a target rotational speed (see the scanner rotational speed signal SDR). This interval corresponds to an image formation preparation period, and the potential of the photosensitive drum 221 is not stabilized yet. In this state, even if an image signal is output, a normal image cannot be output. Therefore, the controller unit 211 does not accept the image data VDO (this period is a pre-rotation processing period).

During the pre-rotation processing, the rotation of the developing sleeve of the developing unit 215 is kept stopped, and no developing operation is made even if the laser beam is radiated. During this period, the semiconductor laser 204 is caused to emit light, and the back beam is recieved by the photodiode 205 to monitor its emission intensity. The laser drive current is controlled (i.e., so-called APC), and a light intensity is adjusted to obtain a given emission intensity. In particular, since the pre-rotation processing period has a time margin, this cycle (APC cycle) is repeated to improve convergence.

After the laser beam is adjusted to have a predetermined light output value by the APC, intermediate data D1 of the laser drive current (part of the intensity correction signal LAS shown in FIG. 31) is held until the next APC is performed. When the APC operation is completed, the sleeve of the developing unit 215 starts rotation to develop a latent image in a contact manner such as two-component development or in a non-contact manner such as jumping development.

When the pre-rotation processing is completed, the laser beam from the laser unit 212 is modulated by the image data VDO, and a latent image is formed on the photosensitive drum 221 (image exposure in which an exposed region corresponds to a developing region). The latent image is visualized by the developing unit 215.

A toner image on the photosensitive drum is transferred onto the recording medium conveyed on the transfer belt 216, and the recording medium is then conveyed to the fixing device 219. The toner image is fixed on the recording medium by heat and pressure, and the recording medium is then delivered outside a machine.

A residual toner on the photosensitive drum 221 is cleaned by the cleaner 218. A toner attached to the transfer belt 216 is cleaned by the belt cleaner 217.

Figure 32:
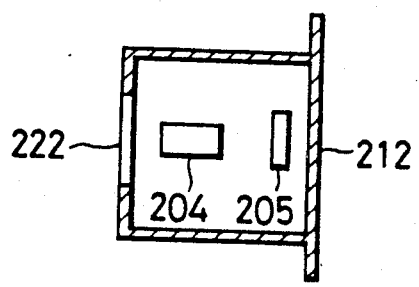
FIG. 32 is a schematic view of a laser unit shown in FIG. 30.

FIG. 32 shows a structure of the laser unit 212 shown in FIG. 30. A glass window 222 seals the semiconductor laser 204 and the photodiode 205. A front beam is radiated onto the photosensitive drum 221 through the glass window 222, and a back beam at that time is received by the photodiode 205.

The emission intensity correction processing will be described below with reference to FIG. 29.

A multi-bit light emission signal output from the CPU 201 is converted to an analog signal by the D/A converter 202. The laser driver 203 drives the semiconductor laser 204 at a constant current on the basis of the analog signal.

The semiconductor laser 204 emits a laser beam upon reception of the image data VDO. The emission intensity of the laser beam is monitored by the photodiode 205. The output from the photodiode 205 is sampled and held by the sample-hold circuit 207 through the amplifier 206, and the sample data is converted to a digital signal by the A/D converter 209. The digital signal is input the CPU 201. The CPU 201 averages some input emission intensity data to eliminate a data variation, and outputs correction data for the semiconductor laser 204 on the basis of a conversion table prestored in its internal memory. Note that the sampling timing of the sample-hold circuit 207 is synchronous with the sampling pulse SP shown in FIG. 33. More specifically, although the semiconductor laser 204 emits light on the basis of the image data VDO, light emission is delayed by several hundreds of nsec. This delay time is inherent one depending on the capacities of the laser driver 203 and the semiconductor laser 204.

The laser beam emitted from the semiconductor laser 204 rises within several nsec, and thereafter, keeps a substantially constant intensity while being slowly attenuated. When the laser beam falls, it has a trailing edge of several tens of nsec. Since the laser beam has such light emission characteristics, the sampling pulse SP is output from the delay circuit 208 at a timing when the emission intensity peak value can be sampled with a delay by a predetermined period of time. Thus, the control can quickly respond to the image data VDO of several tens of MHz, and sampling processing can be performed within a shorter period of time than the conventional Laser APC processing time (several msec).

Note that A/D conversion precision of sample-hold data is set to be higher by 2 bit than data of a laser drive current, thus eliminating a conversion quantization error of a light intensity-drive current conversion table.

Figure 33:
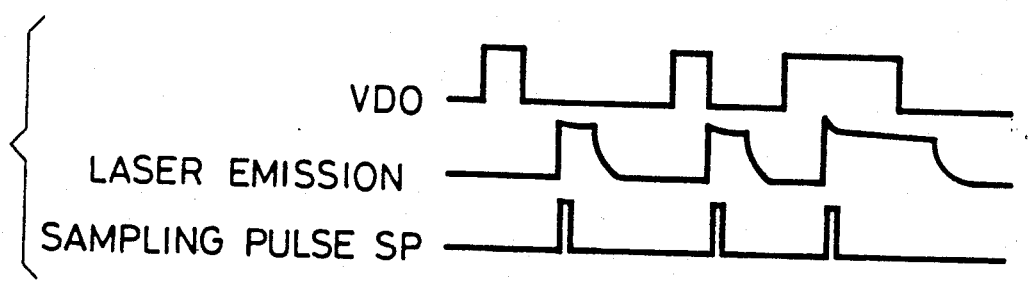
FIG. 33 is a timing chart showing sampling pulse output timings.

As shown in FIG. 33, in this embodiment, the emission intensity of the semiconductor laser 204 during image recording is monitored, the intensity correction signal LAS rises between two adjacent image data VDO in units of pages, as shown in FIG. 31, and light intensity correction processing based on intensity correction data is performed.

In this manner, the Laser APC in which the semiconductor laser 204 is driven in an interval of two adjacent images and a light intensity is adjusted need not be executed, and excessive toner consumption between images can be reduced. If intensity correction is performed during image recording, a line width or density is changed from a portion where the intensity correction is performed within a one-page image, and a density or line nonuniformity is formed, thus considerably degrading image quality. For this reason, the intensity correction is not performed during image recording. Since the intensity correction is performed between images, a change in image is not conspicuous even if the change is large. Note that a level to be changed at a time (change width of a correction value) is limited to minimize a considerable change in image density or line width.

In this embodiment, the present invention is applied to the laser beam printer which performs image recording on the bais of binary image data. The present invention can also be applied to a laser beam printer which performs multi-value image processing. This case will be described below with reference to FIGS. 34 and 35.

FOURTEENTH EMBODIMENT

Figure 34:
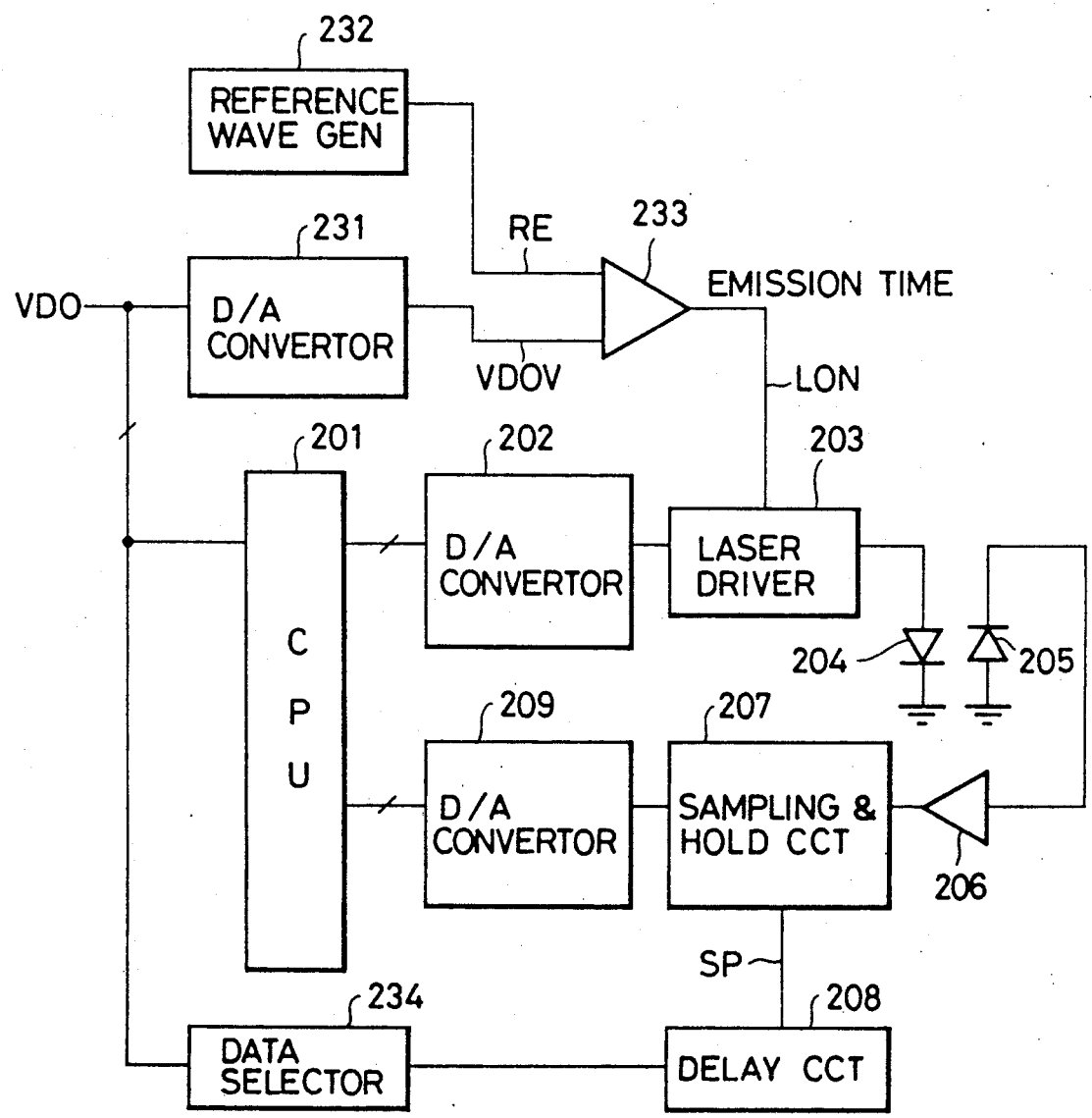
FIG. 34 is a block diagram for explaining an arrangement of an image recording apparatus according to a fourteenth embodiment of the present invention.

FIG. 34 is a block diagram for explaining an arrangement of an image recording apparatus according to a fourteenth embodiment of the present invention. The same reference numerals in FIG. 34 denote the same parts as in FIG. 29.

In FIG. 34, a D/A converter 231 converts input multi-value image data VDO into an analog signal of a predetermined level, and outputs a converted image potential signal VDOV to one terminal of a comparator 233. The other terminal of the comparator 233 receives a reference wave RE (FIG. 35) generated by a reference wave generator 232. The comparator 233 compares the reference wave RE and the image potential signal VDOV, converts the input signal into a laser drive pulse signal LON whose density data is modulated over time, and outputs the pulse signal LON to a laser driver 203. A data selector 234 limits and selects image data VDO to be sampled and held from input image data VDO.

Figure 35:
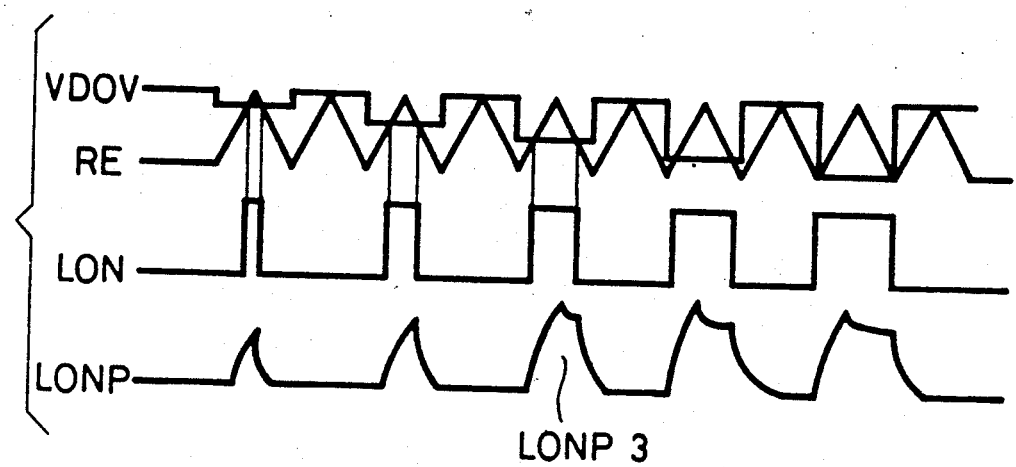
FIG. 35 is a chart showing light emission characteristics based on input image data VDO.

FIG. 35 is a chart showing light emission characteristics based on the image data VDO.

As can be seen from FIG. 35, of laser light intensities LONP, the emission intensity of a semiconductor laser 204 is raised to a peak value after the third laser light intensity LONP3. Note that a delay time in each laser light intensity LONP is ignored for the sake of descriptive convenience.

The semiconductor laser 204 is driven by pulse-width modulated image data (image signal) LON. In this case, the drive current of the semiconductor laser 204 is determined by a value obtained by converting the data from a CPU 201 into an analog signal by a D/A converter 202. Based on this analog signal, the laser driver 203 is driven at a constant current. A laser beam emitted from the semiconductor laser 204 during image recording is received by a photodiode 205, and the output of the photodiode 205 is amplified by an amplifier 206. The output from the amplifier 206 is sampled and held by a sample-hold circuit 207.

In this case, data to be sampled and held is selected by the data selector 234. Of the image data VDO, the data selector 234 selects image data VDO which have a given level or higher, and can form a completely raised waveform of the laser light intensity LONP.

Thus, monitoring of emission intensities of image data VDO which cannot be completely raised is stopped. Monitoring of emission intensities of image data VDO which can be completely raised is executed in synchronism with a sampling pulse SP which is delayed from the image data VDO by a predetermined period of time.

Sampled data are converted to digital signals by an A/D converter 209 and the digital signals are input to the CPU 201. Light intensity correction control (correction in a non-exposure state) is performed at divisions of images in units of pages to correct a laser drive current value after the APC.

In this embodiment, the laser beam printer utilizing the semiconductor laser 204 has been exemplified. However, the present invention can be applied to an LED printer apparatus utilizing an LED light-emitting element.

Figure 36:
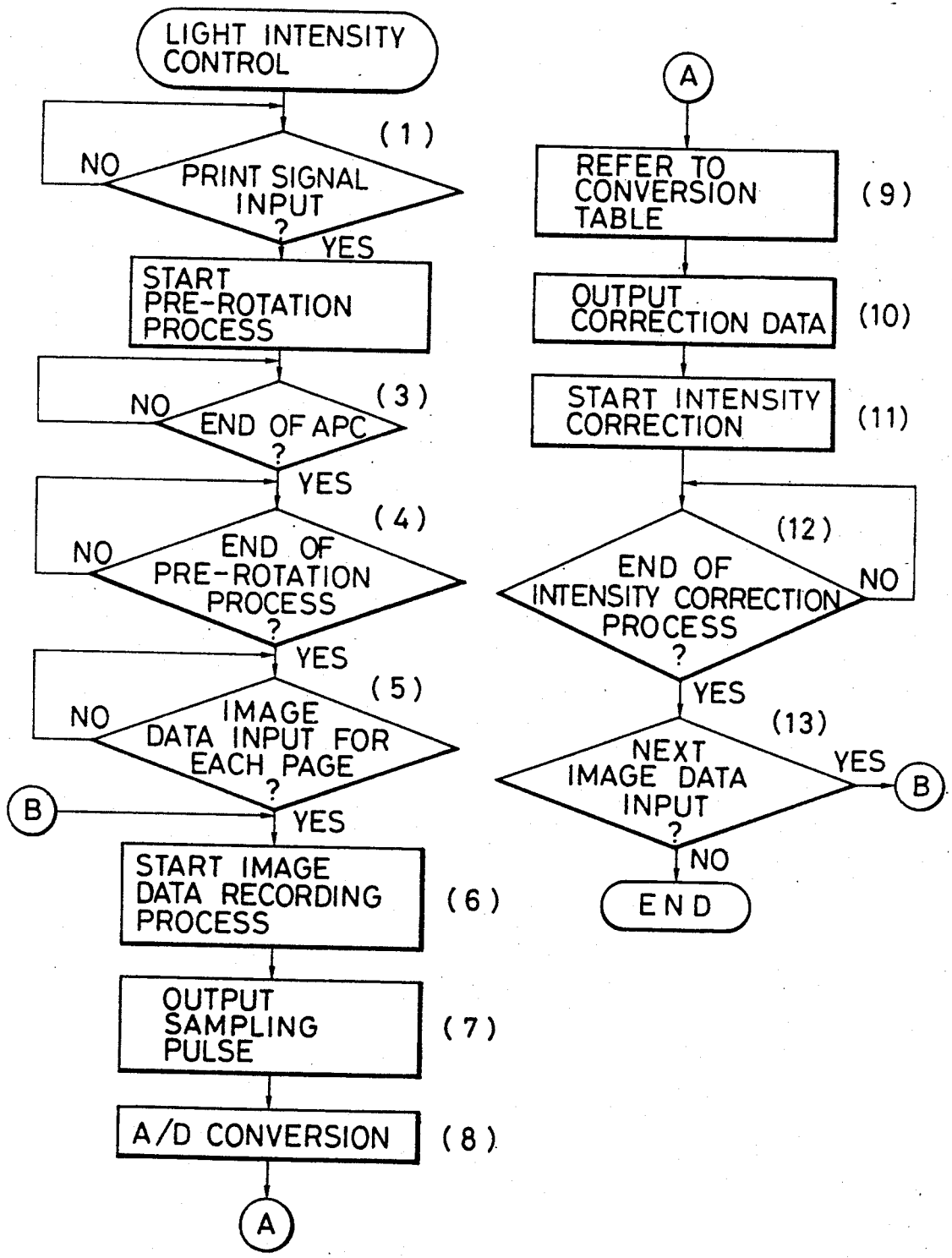
FIG. 36 is a flow chart for explaining light intensity correction processing.

FIG. 36 is a flow chart for explaining a light intensity correction processing sequence. In FIG. 36, (1) to (13) indicate steps.

The CPU 201 waits for inputting of the print signal PRINT from a host computer (not shown) (1). When the print signal PRINT is input, the CPU starts pre-rotation processing (2), and waits until the APC is completed (3). When the APC is completed, the CPU waits for completion of the pre-rotation processing (4). When the pre-rotation processing is completed, the CPU waits for inputting of image data VDO in units of pages (5). When the image data VDO is input in units of pages, the CPU starts recording processing of the image data VDO (6). The CPU causes the delay circuit 208 to output the sampling pulse SP to the sample-hold circuit 207 after the lapse of a predetermined period of time from inputting of the image data VDO (7).

An emission intensity value output from the sample-hold circuit 207 is A/D-converted to a digital signal (8), and the digital signal is input to the CPU 201. Upon completion of image recording processing of the image data VDO in units of pages, the CPU 201 refers to the conversion table in its internal memory on the basis of the input digital signal corresponding to the light intensity value (9), and outputs correction data to the D/A converter 202 (10). The CPU then starts emission intensity correction (11), and waits for completion of the emission intensity correction processing (12). When the correction processing is completed, the CPU checks if the next image data VDO is input (13). If YES in step (13), the flow advances to step (6); otherwise, the processing ends.

The present invention is not limited to the above embodiments, and various other changes and modifications may be made within the scope of the appended claims.

What is claimed is:

1. A light intensity control apparatus comprising:
beam generation means for generating a beam for image recording;
detection means for detecting a light intensity of the beam generated by said beam generation means; and
control means for controlling the light intensity of the beam generated by said beam generating means on the basis of the detection output from said detection means, said control means including a memory for storing a light intensity control value of the beam,
wherein said control means holds the light intensity control value constant while said control means causes said detection means to execute a monitor operation of the light intensity of the beam, said beam being generated by said beam generating means in accordance with the light intensity control value held in the memory, and
wherein said control means changes the light intensity control value on the basis of the light intensity monitored during a non-image recording period.

2. An apparatus according to claim 1, wherein said control means changes the light intensity control value of the beam for every page print operation, and the non-image recording period corresponds to a period between two adjacent page print operations.

3. An apparatus according to claim 1, further comprising: scan means for scanning the beam generated by said beam generation means to record an image on a photosensitive body, and
wherein said control means causes said detection means to execute the monitor operation of the beam when the beam scans a region other than an image recording region of said photosensitive body.

4. An apparatus according to claim 3, wherein said control means causes said detection means to execute the monitor operation of the beam during the image recording period and the non-image recording period.

5. A light intensity control apparatus comprising:
beam generation means for generating a beam;
detection means for detecting a light intensity of the beam generated by said beam generation means; and
control means for controlling the light intensity of the beam generated by said beam generating means on the basis of the detection output from said detection means,
wherein said control means includes a first memory for storing a light intensity control value of the beam and a second memory for storing data relative to the light intensity detected by said detection means, and
wherein said control means includes first and second operation periods, wherein said first operation period, a light intensity of the beam is monitored using said detection means, said beam is generated by said beam generation means in accordance with the light intensity control value stored in the first memory, and the data relative to the monitored light intensity is stored in the second memory, and said control means holds the light intensity control value of the first memory constant, and wherein in said second operation period the light intensity control value stored in the first memory is changed on the basis of the data stored in the second memory.

6. An apparatus according to claim 5, further comprising: scan means for scanning the beam generated by said beam generation means to record an image on a photosensitive body, and
wherein the first operation period corresponds to a period in which the beam scans a region other than an image recording region of said photosensitive body.

7. A light intensity control apparatus comprising:
beam generation means for generating a beam;
scan means for line-scanning the beam generated by said beam generation means to record an image on a photosensitive body;
detection means for detecting a light intensity of the beam generated by said beam generation means on the basis of the detection output from said detection means;
control means for controlling the light intensity of the beam generated by said beam generating means on the basis of the detection output from said detection means; and
correction means for correcting a light intensity control value of the beam,
wherein said control means determines a light intensity control value within a period of scanning one line of the beam on the basis of the detection output, generates the beam after image formation of said one line on the basis of the determined light intensity control value, and determines whether or not correction by said correction means is executed for image formation of a scan line immediately following said one line, on the basis of the detection output from said detection means.

8. A light intensity control apparatus according to claim 7, wherein said correction means executes the correction within a predetermined range in one correction operation.

9. A light intensity control apparatus comprising:
beam generation means for generating a beam;

scan means for line-scanning the beam generated by said beam generation means to record an image on a photosensitive body;

detection means for detecting a light intensity of the beam generated by said beam generation means;

control means for controlling the light intensity of the beam generated by said beam generating means on the basis of the detection output from said detection means; and beam position detection means for detecting the beam scanned by said scan means at a predetermined position, wherein said control means continuously drives said beam generation means during a period in which said control means gradually increases the light intensity of the beam, said period being completed when the intensity of the beam is such that said beam position detection means can detect the beam, and wherein after said period, said control means monitors the light intensity of the beam using said detection means and executes light intensity control when the beam scans a region other than an image recording region on said photosensitive body.

10. A light intensity control apparatus comprising:
beam generation means for generating a beam;
detection means for detecting a light intensity of the beam generated by said beam generation means; and
control means for controlling the light intensity of the beam generated by said beam generating means on the basis of the detection output from said detection means,
wherein said control means comprises first adjustment means for roughly adjusting the light intensity of the beam, second adjustment means for finely adjusting the light intensity of the beam, and means for detecting overflow or underflow of said second adjustment means.

11. An apparatus according to claim 10, wherein when the overflow or underflow is detected, said control means executes an image forming operation for a predetermined period based on the light intensity of the beam before the detection of the overflow or underflow, and thereafter controls the light intensity using said first and second adjusting means during a period between two adjacent page print operations.

12. An apparatus according to claim 1, wherein said control means changes the light intensity control value within a predetermined range at one time control operation.

13. An apparatus according to claim 5, wherein said control means changes the light intensity control value stored in the first memory within a predetermined range at one time of control operation.

14. A light intensity control apparatus comprising:
beam generation means for generating a beam modulated by an image signal;
detection means for detecting a light intensity of the beam generated by said beam generation means; and
control means for controlling the light intensity of the beam generated by said beam generating means on the basis of the detection output from said detection means,
wherein said control means monitors a light intensity of the beam using said detection means in synchronism with the image signal, and determines whether or not the monitored light intensity of the beam is valid in accordance with the image signal.

15. An apparatus according to claim 14, wherein said control means monitors the light intensity of the beam in synchronism with turn-on of said beam generating means based on the image signal, and determines that the monitored light intensity is valid when the ON state of said beam generating means goes on for a predetermined period or more.

16. An apparatus according to claim 14, wherein said detection means detects the detection operation while the beam scans a non-image area of said photosensitive body.

17. An apparatus according to claim 9, wherein sensitivity of said beam position detection means is higher than that of said photosensitive body.

* * * * *